US012570568B2

(12) United States Patent
Gross et al.

(10) Patent No.: US 12,570,568 B2
(45) **Date of Patent: \*Mar. 10, 2026**

(54) GLASSES AND GLASS-CERAMICS AND METHODS OF MAKING THEM

(71) Applicant: CORNING INCORPORATED, Corning, NY (US)

(72) Inventors: Timothy Michael Gross, Painted Post, NY (US); Alexandra Lai Ching Kao Andrews Mitchell, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 649 days.

This patent is subject to a terminal disclaimer.

(21) Appl. No.: 17/943,772

(22) Filed: Sep. 13, 2022

(65) Prior Publication Data

US 2023/0022287 A1    Jan. 26, 2023

Related U.S. Application Data

(63) Continuation of application No. PCT/US2021/053781, filed on Oct. 6, 2021, which is a continuation-in-part of application No. 17/384,085, filed on Jul. 23, 2021, now Pat. No. 11,319,239.

(60) Provisional application No. 63/225,049, filed on Jul. 23, 2021, provisional application No. 63/222,462, filed on Jul. 16, 2021, provisional application No. 63/088,525, filed on Oct. 7, 2020.

(51) Int. Cl.

| | |
|---|---|
| *C03C 3/062* | (2006.01) |
| *A01N 59/20* | (2006.01) |
| *A01P 1/00* | (2006.01) |
| *C03B 19/02* | (2006.01) |
| *C03B 25/02* | (2006.01) |
| *C03C 4/02* | (2006.01) |
| *C03C 10/00* | (2006.01) |

(52) U.S. Cl.
CPC .............. *C03C 3/062* (2013.01); *A01N 59/20* (2013.01); *A01P 1/00* (2021.08); *C03B 19/02* (2013.01); *C03B 25/02* (2013.01); *C03C 4/02* (2013.01); *C03C 10/00* (2013.01)

(58) Field of Classification Search
CPC ........ C03C 8/08; C03C 3/062; C03C 2204/02
See application file for complete search history.

(56) References Cited

U.S. PATENT DOCUMENTS

| | | | |
|---|---|---|---|
| 3,901,718 A | 8/1975 | Wu | |
| 4,226,628 A | 10/1980 | Bartholomew et al. | |
| 4,407,786 A | 10/1983 | Drake et al. | |
| 11,319,239 B2 | 5/2022 | Gross et al. | |
| 11,339,084 B2 | 5/2022 | Gross et al. | |
| 2006/0172877 A1* | 8/2006 | Fechner ................. | A01N 59/16 501/48 |
| 2013/0104980 A1 | 5/2013 | Sridharan et al. | |
| 2015/0321942 A1 | 11/2015 | Masuda et al. | |
| 2017/0036946 A1* | 2/2017 | Celikbilek Ersundu .. | C03C 3/23 |
| 2017/0349876 A1 | 12/2017 | Deng et al. | |
| 2018/0312424 A1* | 11/2018 | Schreder ................. | C03C 3/062 |
| 2021/0108077 A1 | 4/2021 | Berleue et al. | |
| 2021/0355021 A1 | 11/2021 | Mitchell et al. | |
| 2021/0371326 A1 | 12/2021 | Mitchell | |
| 2022/0184926 A1 | 6/2022 | Cleary et al. | |

FOREIGN PATENT DOCUMENTS

| | | |
|---|---|---|
| CN | 101058478 A | 10/2007 |
| CN | 102939271 A | 2/2013 |
| CN | 106536435 A | 3/2017 |
| CN | 109195927 A | 1/2019 |
| JP | 2001-064036 A | 3/2001 |
| JP | 2001-064524 A | 3/2001 |
| JP | 2001-199740 A | 7/2001 |
| JP | 2019-151539 A | 9/2019 |
| WO | 94/19415 A1 | 9/1994 |
| WO | 2021/211284 A1 | 10/2021 |
| WO | 2022/125422 A1 | 6/2022 |
| WO | 2022/155028 A1 | 7/2022 |
| WO | 2022/177797 A1 | 8/2022 |

OTHER PUBLICATIONS

Bae et al., "Chemical Durability of Copper Phosphate Glasses", Glass Technology, Society of Glass Technology, vol. 35, No. 2, Apr. 1, 1994, pp. 83-88.

Chen et al. Porous glass-ceramics derived from MgO—CuO—TiO2—P2O5 glasses with different additions of Fe2O3. Ceramics International 46 (2020) 6560-6566.

(Continued)

*Primary Examiner* — Kyle A Purdy

(74) *Attorney, Agent, or Firm* — Russell S. Magaziner

(57) ABSTRACT

A glass includes from 42 mol % to 47 mol % $P_2O_5$, from 42 mol % to 48 mol % CuO, and from greater than 0 mol % to 15 mol % $Fe_2O_3$. The glass is an amorphous, single-phase glass. Methods of making a glass article include heating batch materials to a melting temperature from 900° C. to 1350° C. In aspects, methods include pouring the molten glass in an inert gaseous environment, and cooling the molten glass in the inter gaseous environment. In aspects, methods include cooling the molten glass to form the glass article and annealing the glass article without growing crystals in or on the glass article during the cooling or the annealing.

9 Claims, 37 Drawing Sheets

(Continued)

(56) References Cited

OTHER PUBLICATIONS

Doweidar et al., "CuO—B2O3 glasses: Properties and formation conditions", European Journal of Glass Science and Technology Part B Physics and Chemistry of Glasses, vol. 57, No. 2, 2016, pp. 77-84.

Elbashar et al., "Optical spectroscopic analysis of Fe2O3doped CuO containing phosphate glass", Optical and Quantum Electronics, vol. 49, No. 9, 2017, pp. 1-13.

Gabrovski Kh., Obretenov Ts., Glass forming area of some ternary phosphate, boron-phosphate, and molybdenum borate systems (in Russian), God.Vissh.Khim.Tekhnol.Inst., Burgas, 1977, vol. 12, No. 1, p. 199-205.

Invitation to Pay Additional Fees; PCT/US2021/053781; dated Jan. 31, 2022; 10 pages; European Patent Office.

Shih et al., "Thermal and corrosion behavior of P"2O"5—Na"2O—CuO glasses", Journal of Non-Crystalline Solids, vol. 224, No. 2, Mar. 1, 1998, pp. 143-152.

Chinese Patent Application No. 202180005934.2, Office Action dated Jan. 13, 2023, 10 pages (5 pages of English Translation and 5 pages of Original Document), Chinese Patent Office.

\* cited by examiner

BHE

10 µm

BHB

BHE

Burnt Orange Coloring

Black Coloring

Ex. 2.5

10 µm

Ex. 2.5

400 nm

Ex. A

Ex. B

25 µm

Ex. C

MTS131572-1-905BIP - Polished

250 µm

Ex. D

Ex. D

Ex. I

MTS131572-1-905BIV ~ Polished

25 µm

Example L

Ex. L

100nm

Example M

Ex. M

100nm

Example N

Ex. N

100nm

Comparative Ex. 1

XX B

Comparative Ex. 1

1000μm

Comparative Ex. 2

BMS1

BMS1

BLF

BLF

BLN

BLN

BLT

BLT

BLO

Smooth, fractured surface → no weathering

Rough, saw cut surface → weathering

BLN 5          20

10          15

90 grit SiC, psi labelled

BLN 5          20

10          15

90 grit SiC, psi labelled

GLASSES AND GLASS-CERAMICS AND METHODS OF MAKING THEM

PRIORITY

This Application is a continuation of and claims the benefit of priority under 35 § 120 of PCT Application No. PCT/US2021/053781, filed Oct. 6, 2021, which claims the benefit of priority of U.S. Provisional Applications Nos. 63/088,525 filed Oct. 7, 2020, 63/222,462 filed Jul. 16, 2021, and 63/225,049 filed Jul. 23, 2021, and is a continuation-in-part of and claims the benefit of priority under 35 U.S.C. § 120 of U.S. application Ser. No. 17/384,085 filed Jul. 23, 2021, now U.S. Pat. No. 11,319,239, issued May 3, 2022, which claims the benefit of priority of U.S. Provisional Applications Nos. 63/088,525 filed Oct. 7, 2020 and 63/222,462 filed Jul. 16, 2021, each of which is incorporated by reference herein in its entirety.

BACKGROUND

Aspects of the present disclosure generally relate to unique glass and glass-ceramic compositions that have antimicrobial properties or other beneficial attributes. Other aspects include materials that include such glasses and glass-ceramics as well as unique products including such glasses and glass-ceramics. Still other aspects include method of making such glasses, glass-ceramics, materials, and products.

Antimicrobial glass-ceramics can be integrated in products, such as architectural articles, such as panels, plates, buttons, and other articles to help control transmission of illness or for other reasons. In other products, such glass-ceramics may be ground into fine particles or frit and added to composite mixtures, such as exterior paints, to control growth of mildew or other microbes that may degrade coloring. Applicants believe that conventional antimicrobial glass-ceramics typically include cuprite crystals, which may inhibit microbes, but may be difficult to machine and/or may have a burnt orange color that limits use of the glass-ceramics in mixtures or arrangements of desired colors that are incompatible with burnt orange. Applicants believe a need exists for unique materials, such as glasses and glass-ceramics that have antimicrobial properties and/or are convenient to machine into products and/or allow unique mixtures or arrangements of antimicrobial materials and products in new or desired colors.

SUMMARY

Applicants discovered unique compositions and uses of glass-ceramics, which optionally include antimicrobial properties. Further, Applicants discovered compositions and uses of amorphous glasses, optionally single-phase glasses, and optionally with antimicrobial properties. The glasses may be easier to machine than conventional antimicrobial glass-ceramics. Furthermore, glasses and glass-ceramics are optionally not burnt orange in color, allowing for use of the glasses and glass-ceramics in different products, such as new colored antimicrobial paints and architectural articles, such as push-plates.

Aspects of the disclosure include material comprising, in terms of constituent components over 30 mol % $P_2O_5$, at least 25 mol % CuO, and a positive amount of $Fe_2O_3$ up to 35 mol %. Other aspects include material comprising a positive amount of $P_2O_5$ up to 70 mol %, over 30 mol % CuO, and a positive amount of $Fe_2O_3$ up to 35 mol %. Still other aspects include a phosphate glass comprising copper and/or iron, wherein $P_2O_5$, $Fe_2O_3$, and CuO constituents in combination with one another make up over 50 mol % of the phosphate glass, and where the phosphate glass is fully amorphous and single phase. The phosphate glass may exhibit a positive percent kill as measured by the United States Environmental Protection Agency (EPA) Test Method for Efficacy of Copper Alloy Surfaces as a Sanitizer test disclosed herein and/or has a CIELAB L* value below 35, CIELAB a* and b* values within 5 of zero. Further aspects include a method of making a product including melting a batch mixture comprising 40 to 55 mol % CuO, 5 to 10 mol % $Fe_2O_3$, and 35 to 50 mol % $P_2O_5$, fining the mixture; and cooling below 200° C. In further aspects, the batch mixture comprises 42 to 47 mol % $P_2O_5$, 7 to 12 mol % $Fe_3O_3$, and 42 to 48 mol % CuO.

An aspect (A) of the innovative technology includes a method of manufacturing a glass article comprising steps of (i) heating batch materials to a melting temperature to form a molten glass, wherein the melting temperature is in a range from 900° C. to 1350° C., wherein the batch materials comprise >30 mol % $P_2O_5$, >30 mol % CuO, and $Fe_2O_3$; (ii) pouring the molten glass in an inert gaseous environment; and (iii) cooling the molten glass in the inert gaseous environment for form the glass article.

An aspect (B) includes the aspect (A) wherein the batch materials comprise, in terms of as-batched constituents: 42 mol % ≤ $P_2O_5$ ≤ 47 mol %; 42 mol % ≤ CuO ≤ 48 mol %; and 7 mol % ≤ $Fe_2O_3$ ≤ 12 mol %.

An aspect (C) includes either aspect (A) or (B) further comprising preheating a mold or surface to a temperature in a range from 200° C. to 300° C. before the step of pouring the molten glass composition, and pouring the molten glass into the mold or onto the surface.

An aspect (D) includes any one of aspects (A) to (C) further comprising heating the batch materials to a temperature in a range from 250° C. to 300° C. for at least 12 hours before heating the batch materials to the melting temperature.

An aspect (E) includes any one of aspects (A) to (D) further comprising heating the batch materials to 850° C. for at least one hour before heating the batch materials to the melting temperature.

An aspect (F) includes a method of manufacturing a glass article, comprising steps of (i) heating batch materials to a melting temperature of the batch materials to form a molten glass, wherein the batch materials in terms of as-batched constituents comprise 42 mol % ≤ $P_2O_5$ ≤ 47 mol %, 42 mol % ≤ CuO ≤ 48 mol %, and 7 mol % ≤ $Fe_2O_3$ ≤ 12 mol %, and wherein the melting temperature is in a range from 900° C. to 1350° C.; (ii) cooling the molten glass to form the glass article without growing crystals in or on the glass article during the cooling; and (iii) annealing the glass article without growing crystals in or on the glass article.

As aspect (G) includes the aspect (F) wherein the annealing occurs after the molten glass composition reaches 25° C.

An aspect (H) includes either aspect (F) or (G), further comprising heating the batch materials to a first temperature less than the melting temperature and maintaining the first temperature for at least an hour; and heating the batch materials to a second temperature higher than the first temperature and less than the melting temperature and maintaining the second temperature for at least an hour.

An aspect (I) includes the aspect (H) wherein the first temperature is at least 200° C. and the second temperature is at least 650° C. An aspect (J) includes the aspect (I) wherein the batch materials are maintained at the first temperature for at least 12. And an aspect (K) includes the aspect (J) wherein the batch materials are maintained at the melting temperature for at least 30 minutes.

An aspect (L) includes a glass, in terms of as-analyzed constituent components, comprising 42 mol $\% \leq P_2O_5 \leq 47$ mol %; 42 mol $\% \leq CuO \leq 48$ mol %; and $0 \leq Fe_2O_3 \leq 15$ mol %, wherein the glass is an amorphous, single-phase glass.

An aspect (M) includes the aspect (L) wherein $SiO_2 \leq 5$ mol %.

An aspect (N) includes either the aspect (L) or (M) wherein the glass has a greater amount of $Cu^+$ ions than $Cu^{2+}$ ions.

An aspect (O) includes any one of aspects (L) to (N) wherein 7 mol $\% \leq Fe_2O_3 \leq 12$ mol %.

An aspect (P) includes the aspect (O) wherein 7.5 mol $\% \leq Fe_2O_3 \leq 12$ mol %, and 42 mol % $CuO \leq 47.5$ mol %. And, an aspect (Q) includes the aspect (P) wherein 8 mol $\% \leq Fe_2O_3 \leq 12$ mol %, and 42 mol % $CuO \leq 47$ mol %.

An aspect (1) of the innovative technology disclosed herein includes a material, in terms of as-analyzed constituent components, comprising 30 mol $\% \leq P_2O_5 \leq 70$ mol %; 25 mol $\% \leq CuO \leq 55$ mol %; and 2.5 mol $\% \leq Fe_2O_3 \leq 25$ mol %, wherein the material is an amorphous, single-phase glass.

An aspect (2) includes the material of aspect (1), wherein 5 mol $\% \leq Fe_2O_3 \leq 15$ mol.

An aspect (3) includes the material of either aspect (1) or (2), wherein 40 mol $\% \leq P_2O_5 \leq 70$ mol %.

An aspect (4) includes the material of any one of aspects (1) to (3), wherein 40 mol $\% \leq CuO \leq 55$ mol %.

An aspect (4) includes the material of any one of aspects (1) to (3), further comprising $0 < SiO_2 \leq 35$ mol %.

An aspect (6) includes the material of aspect (5), wherein $SiO_2 \leq P_2O_5$.

An aspect (7) includes the material of any one of aspects (1) to (6), wherein the glass is annealed.

An aspect (8) includes the material of any one of aspects (1) to (7), exhibiting a percent kill of at least 75 as measured by United States EPA Test Method for Efficacy of Copper Alloy Surfaces as a Sanitizer.

An aspect (9) includes the material of any one of aspects (1) to (8), exhibiting a CIELAB L* value below 35.

An aspect (10) includes the material of aspect (9), exhibiting a CIELAB a* value is within 5 of zero.

An aspect (11) includes the material of aspect (10), exhibiting a CIELAB b* value is within 5 of zero.

An aspect (12) includes the material of any one of aspects (1) to (8), exhibiting a black color.

An aspect (13) includes glass frit (or powder) comprising material of any one of aspects (1) to (12).

An aspect (14) includes surface of an article, the surface comprising material any one of aspects (1) to (12).

An aspect (15) includes an amorphous, single-phase phosphate glass exhibiting a percent kill of at least 75 as measured by United States EPA Test Method for Efficacy of Copper Alloy Surfaces as a Sanitizer, a CIELAB L* value below 35, CIELAB a* value is within 5 of zero, and CIELAB b* value is within 5 of zero.

An aspect (16) includes a material, in terms of as-analyzed constituent components, comprising: 30 mol $\% \leq P_2O_5 \leq 65$ mol %; 25 mol $\% \leq CuO \leq 55$ mol %; and 3 mol $\% \leq X \leq 15$ mol %, where X is one or more constituents selected from the group consisting of $Fe_2O_3$, MgO, ZnO, CaO, SrO, BaO, $Li_2O$, $Na_2O$, $K_2O$, $TiO_2$, NiO, $MnO_2$, and $Al_2O_3$; wherein the material exhibits a percent kill of at least 75 as measured by United States EPA Test Method for Efficacy of Copper Alloy Surfaces as a Sanitizer.

An aspect (17) includes the material of aspect (16), further comprising $0 < SiO_2 \leq 35$ mol %.

An aspect (18) includes the material of either aspect (16) or (17), wherein X is $Fe_2O_3$.

An aspect (19) includes a method of making a material, the method comprising: melting a batch mixture comprising: 30 mol $\% \leq P_2O_5 \leq 65$ mol %, and 25 mol $\% \leq CuO \leq 55$ mol %; mixing the melt; cooling the mixture to form a glass, and annealing the glass without growing crystals in the glass such that the annealed glass is amorphous, single-phase.

An aspect (20) includes the aspect (19) further comprising machining the glass in open air at atmospheric pressure and at temperature within 50 degrees of 0° C.

Additional features and advantages are set forth in the Detailed Description that follows, and in part will be readily apparent to those skilled in the art from the description or recognized by practicing the innovation as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE FIGURES

The accompanying Figures are included to provide a further understanding and are incorporated in and constitute a part of this specification. The drawings illustrate one or more aspects of the innovation, and together with the Detailed Description explain principles and operations of the innovation. As such, the disclosure will become more fully understood from the following Detailed Description, taken in conjunction with the accompanying Figures, in which.

DETAILED DESCRIPTION

Before turning to the following Detailed Description and Figures, which illustrate aspects in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1:
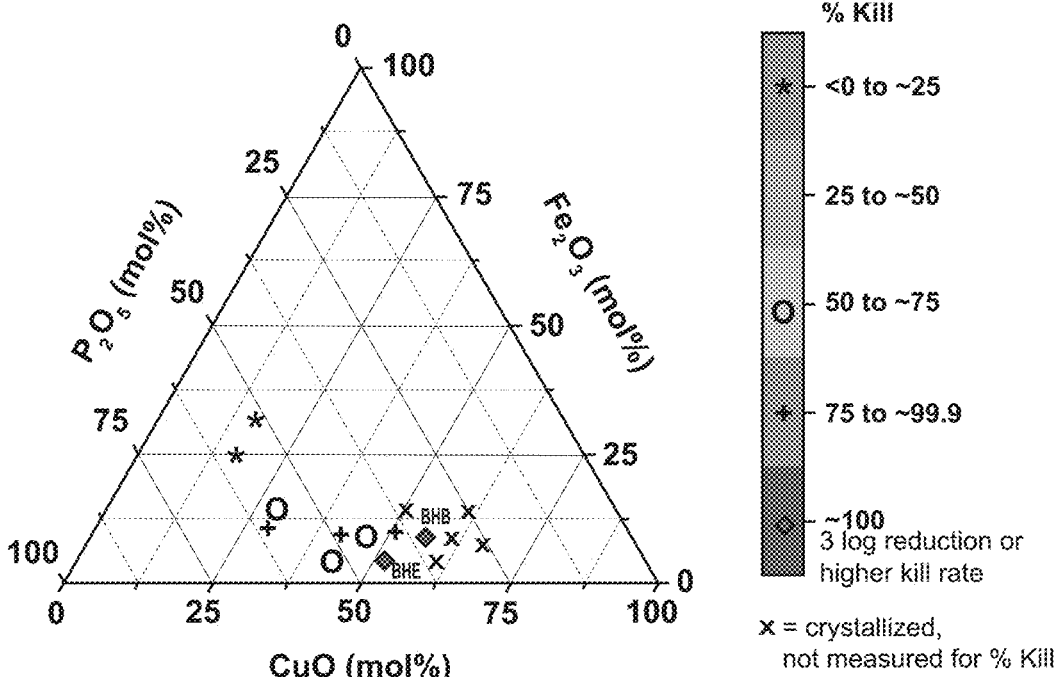
FIG. 1 is ternary diagram including data according to an exemplary aspect of the innovation disclosed herein.

Referring to FIG. 1, constituents in the $P_2O_5$—$Fe_2O_3$—CuO ternary space may be mixed together, melted, fined, cooled, annealed, and otherwise processed (e.g., formed into sheets by float or fusion) to form materials, such as glasses, glass-ceramics, and conceivably ceramics or crystals. Notably materials of FIGS. 2-5 are present in the diagram in FIG. 1. In embodiments, the materials may have other constituents, such as contaminants or additives to facilitate manufacturing. According to an exemplary aspect, the materials are or include phosphate glasses, where the glass-forming substrate is $P_2O_5$, as opposed to silicate glasses, but in embodiments the materials may optionally include at least some silica. The materials may be crystalline in embodiments, such as over 90% crystalline, or may be amorphous glass. The materials may be dense in embodiments, such as over 90% dense, or may be porous.

Figure 2:
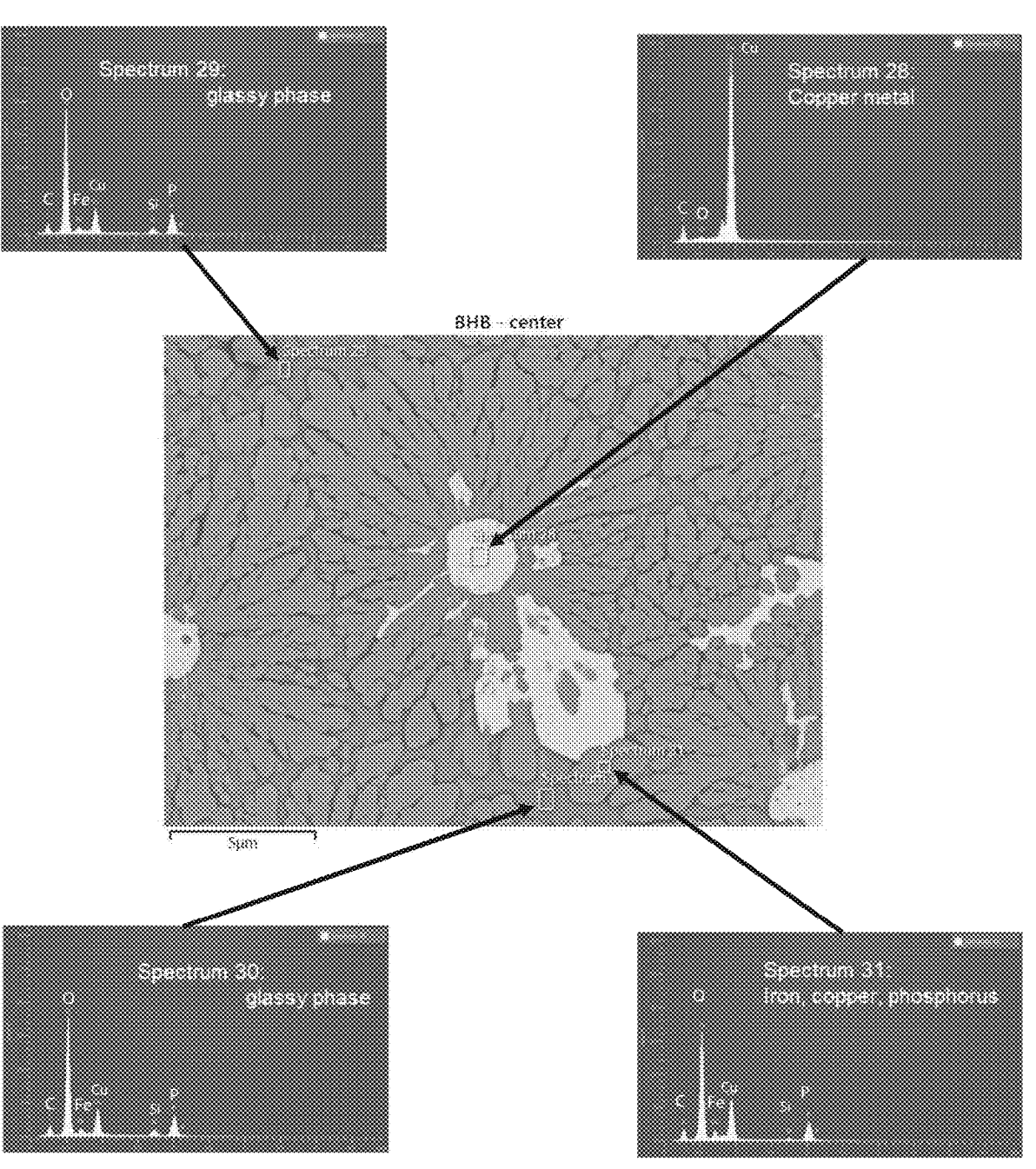
FIG. 2 is a scanning electron microscope image of a material surface surrounded by x-ray diffraction diagrams for locations on the image according to an exemplary aspect.

More specifically, according to an exemplary aspect the materials are or include phosphate glasses, where constituents in percentage of total moles (mol %) include at least 10 mol % $P_2O_5$, such as at least 15 mol %, and preferably in embodiments at least 25 mol % such as for improved antimicrobial properties, such as at least 30 mol %, such as at least 35 mol %, and/or no more than 75 mol %, such as no more than 63 mol %, and preferably in embodiments no more than 50 mol % $P_2O_5$ such as for improved antimicrobial properties. In embodiments, phosphorus is present in the material as identified by x-ray diffraction, such as is shown in FIG. 2 for example. Materials as disclosed herein may optionally have less than 15 mol % $P_2O_5$, such as none, or more than 75 mol %.

For clarity, mol % ranges herein refer to mol % as batch constituents, as analyzed such as by inductively coupled plasma mass spectroscopy, and as analyzed with silica normalized out (see Table 1 below for example) unless specified otherwise, but the mol % ranges claimed herein by default are as analyzed unless otherwise specified. Also all ranges disclosed herein as closed sets (e.g., at least X, no more than Y) also include and may be rewritten as open sets (e.g., more than X, less than Y), where boundary values are excluded in the range, or mixed sets where either boundary value is or is not included in the range.

According to an exemplary aspect, constituents in percentage of total moles (mol %) include at least some $Fe_2O_3$, such as at least more than trace amounts, such as at least 1 mol %, at least 2 mol %, at least 2.5 mol %, and preferably in embodiments at least 5 mol % such as for improved antimicrobial properties, and/or no more than 50 mol %, such as no more than 38 mol %, and preferably in embodiments no more than 25 mol % $Fe_2O_3$ such as for improved antimicrobial properties, such as no more than 15 mol %, such as no more than 13 mol %, such as no more than 10 mol %. In embodiments, iron is optionally present in the material as identified by x-ray diffraction, such as is shown in FIG. 2 for example. In embodiments, materials as disclosed herein may have no $Fe_2O_3$ or more than 50 mol %.

According to an exemplary aspect, constituents in percentage of total moles (mol %) include at least 15 mol % CuO, such as at least 25 mol %, at least 30 mol %, at least 33 mol %, and preferably in embodiments at least 40 mol % such as for improved antimicrobial properties, and/or no more than 88 mol %, such as no more than 80 mol %, and preferably in embodiments no more than 75 mol % such as for improved antimicrobial properties, such as no more than 70 mol %, such as no more than 60 mol %, such as no more than 55 mol %. In embodiments, copper is present in the material as identified by x-ray diffraction, such as is shown in FIG. 2 for example. In embodiments, materials may optionally have less than 15 mol % CuO, such as none, or more than 88 mol %.

According to an exemplary aspect, materials are or are mostly ternary in that the $P_2O_5$, $Fe_2O_3$, and CuO constituents in combination with one another make up the majority of the mixture (e.g., batch mixture, or as analyzed), such as more than 50 mol %, such as at least 75 mol %, at least 85%, at least 90%, but in embodiments the $P_2O_5$, $Fe_2O_3$, and CuO constituents in combination may optionally comprise less than 50 mol % and/or up to 100 mol %.

In embodiments, the materials are antimicrobial, where the material, or a surface of the material will kill or inhibit growth of microbes including bacteria, viruses, and/or fungi, but not necessarily that the material or the surface of the material will kill or inhibit the growth of all species microbes within such families (e.g., *Staphylococcus aureus, Enterobacter aerogenes*, and *Pseudomonas aeruginosa*), but that it will kill or inhibit the growth or one or more species of microbes from such families. Further, the data in FIG. 1 indicates kill rates that may be expressed as "log reduction" i.e. $\log (C_a/C_0)$, where $C_a$ is the colony form unit (CFU) number of the antimicrobial surface and $C_0$ is the CFU of the control surface that is not an antimicrobial surface.

Embodiments of materials, glass, glass-ceramics, and products disclosed herein exhibit a kill rate of greater than 0, such as 25% or more, such as 50% or more, such as 75% or more, such as at least 99.9% (or a log reduction of 3 or greater) within 2 hours of exposure to *Staphylococcus aureus* under U.S. EPA Test Method for Efficacy of Copper Alloy as a Sanitizer testing conditions (see https://archive.epa.gov/pesticides/oppad001/web/pdf/copper-copper-alloy-surface-protocol.pdf, incorporated by reference) as implemented below.

Bactericidal efficacy tests including study controls were performed as described in the EPA test for efficacy of copper alloy surfaces as a sanitizer. The test material (e.g. glass) coupons were prepared as 25 mm×25 mm×1 mm coupons with polished surfaces. A 7 mil (0.007 inch, 0.1778 mm) wet film thickness drawdown bar was used to form films onto Leneta Scrub Charts (P121-10N). The films were dried for 2 days at ambient lab temperature (approximately 25° C.) before the antimicrobial test was conducted. Dry film thickness was around 80 μm. Stainless steel carriers, used as reference, were cleaned and sterilized by immersion in a 75% ethanol solution followed by rinsing with deionized water. Vials containing *Staphylococcus aureus* (ATCC 6538) bacterial stock culture were stored at −80° C. until use. 20 μL aliquots of thawed bacterial cultures were added to 10 mL of Tryptic Soy Broth (Teknova). These bacterial suspensions were serially incubated 3 times at 36° C. for 18-24 hours in an orbital shaker (New Brunswick Scientific), and then 1 time in polypropylene snap tubes (Fisher Healthcare) for 48 hours. Cultures were subsequently mixed on a vortex mixer (VWR Scientific) and allowed to settle. The upper two thirds of suspension from each tube was aspirated and OD600 was measured (Smart Spec Spectrophotometer 3000, Bio-Rad) to estimate bacterial density. The culture was diluted with phosphate buffer saline (Gibco Life Technologies) to achieve a bacterial inoculum concentration near a target value of $1.0×10^7$ CFU/mL. 0.25 mL of 5% fetal bovine serum (Gibco Life Technologies) and 0.05 mL Triton X-100 (Amresco Pro Pure) were added to 4.70 mL bacterial suspension to aid in spreading the inoculum. Each test coupon was inoculated with 20 μL of the bacterial test culture. The inoculum volume was spread evenly using bent sterile pipette tips (Mettler-Toledo) to ensure full and even coverage, spreading as close to the edge of the coupon as possible. Coupons were then incubated in a controlled environment set at 42% relative humidity and 23° C. for a period of 120 min. Following the 120-minute exposure period, coupons were neutralized in Letheen broth (Gen Lab). Ten-fold serial dilutions of the neutralized solutions were plated using standard spread plate technique on Tryptic Soy Agar plates and incubated for 24 hours at 36° C. to yield countable numbers of survivors (approximately 20-200 colonies per plate). Log and percentage of reductions for bactericidal efficacy tests measure differences in CFUs between stainless steel and test material (e.g., glass) containing coupons. For the surface to be considered a sanitizer, a greater than or equal to 99.9% reduction (at least 3 log reduction) must be demonstrated.

According to an exemplary aspect, both glass and glass-ceramic materials disclosed herein were sanitizers. As an example, a 3 log reduction equals about 99.9% of the microbes killed, shown as a diamond in the ternary diagram of FIG. 1 and identified as "BHB" and "BHE." Other samples in the ternary had antimicrobial properties, with kill rates above zero and less than 25% (asterisk in FIG. 1) kill rates between 50 and 75% (letter "0" in FIG. 1), and between 75 and 99.9% (plus symbol in FIG. 1). Put another way, compositions in the $Fe_2O_3$—$CuO$—$P_2O_5$ ternary system are disclosed herein that display a range of antimicrobial behavior from virtually no effect to full kill. In embodiments, the materials can be fully amorphous and/or single-phase materials, or phase-separated and/or partially crystalline. Compositions with particularly effective antimicrobial properties (e.g., 3 log reduction or better) are shown in the ternary and include, in terms of % mol constituents, 40 to 55 CuO, 5 to 10 $Fe_2O_3$, and 35 to 50 $P_2O_5$, some of which are fully amorphous, single-phase glass and others of which are phase separated glass and/or glass-ceramic.

Amorphous microstructure may be advantageous for applications that require bulk parts because machining may be much easier than for compositions that are surface-nucleated glass-ceramics. Such bulk parts may include architectural products, such as push plates on doors and other high-touch areas in hospitals, schools, and office buildings. Furthermore, compositions of the ternary of FIG. 1 are black, though some are burnt orange. Black color may be an advantage for applications that require bulk parts. Still further, compositions disclosed herein, such as those of the ternary of FIG. 1 are phosphate glasses, but surprisingly Applicants have discovered the materials can be machined under normal atmospheric conditions (e.g., room temperature, 25° C. temperature, within 50° C. of 0° C., atmospheric pressure, 101,325 pascals pressure, 50% relative humidity, open air). Manufacturing methods include forming the materials at such conditions.

Figure 3:
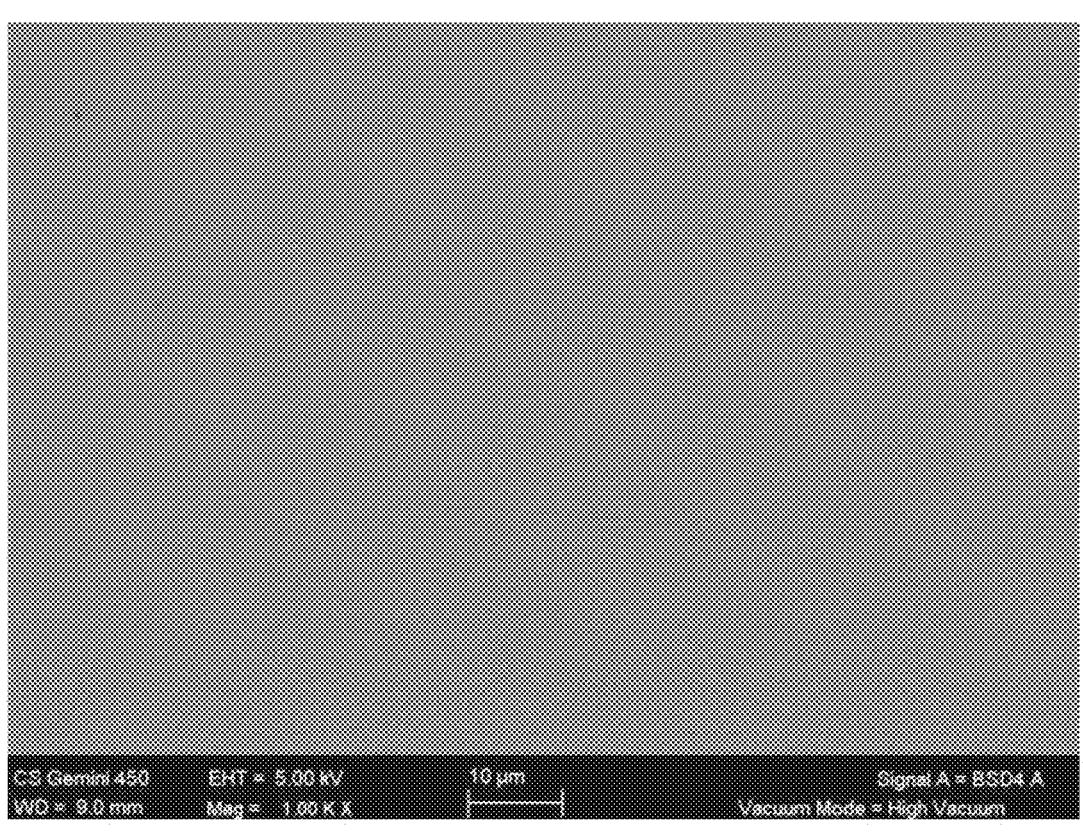
FIG. 3 is a scanning electron microscope image of a material surface according to an exemplary aspect.

FIGS. 2 and 3 show microstructure of BHB (see Table 1 below), a glass-ceramic material, and BHE (see Table 1 below), a single-phase glass, respectively. The lack of phase separation in BHE in concert with the full kill result is notable because conventional glass-ceramic materials with antimicrobial properties are typically or exclusively phase-separated and contain $Cu^{1+}$ as cuprite crystals, and are glass-ceramics, as opposed to amorphous glass and/or single-phase amorphous glass.

Figure 4:
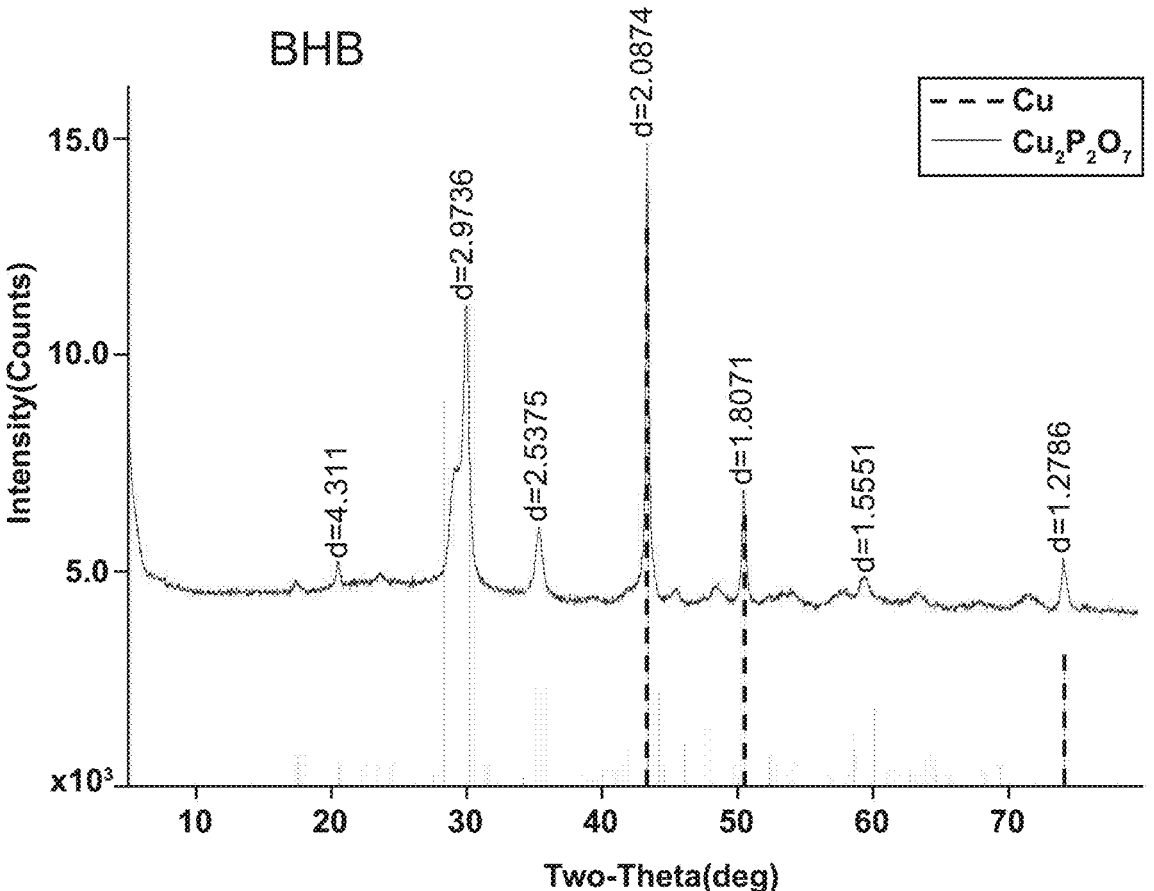
FIG. 4 is an x-ray diffraction diagram of the material of FIG. 2.
Figure 5:
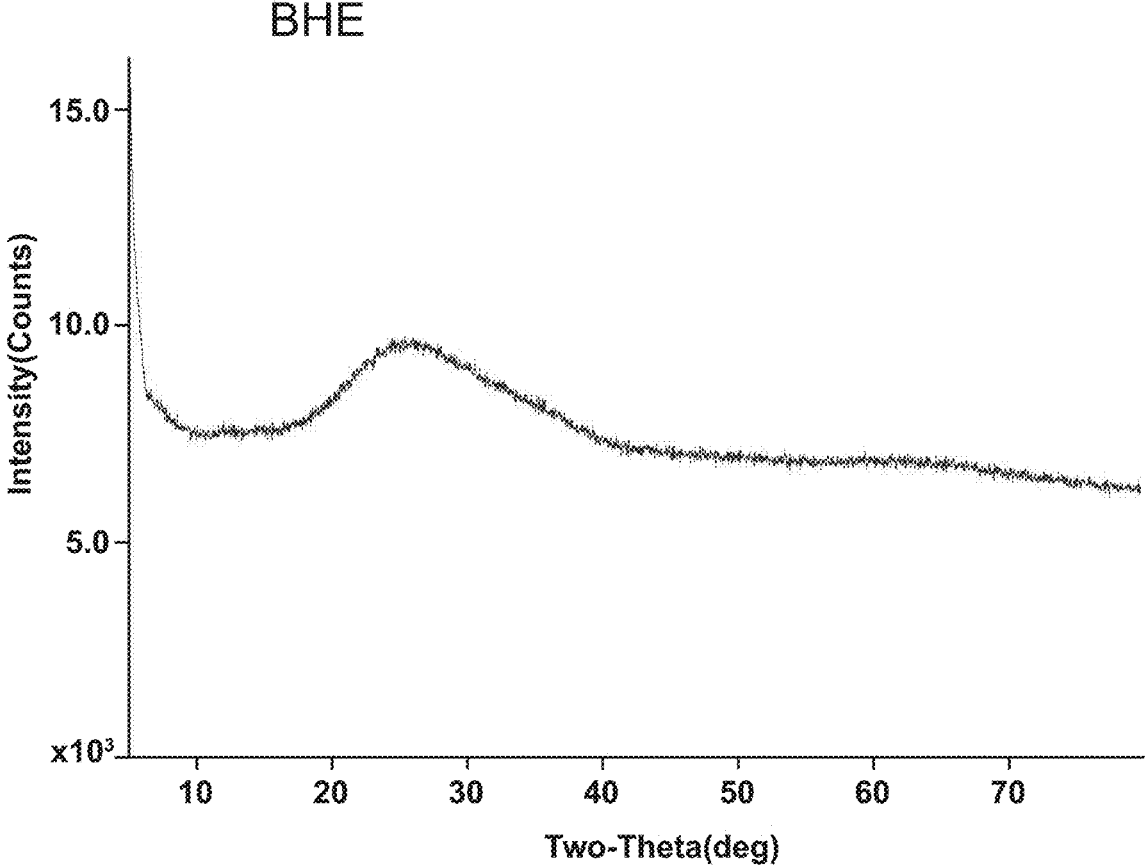
FIG. 5 is an x-ray diffraction diagram of the material of FIG. 3.
Figure 6:
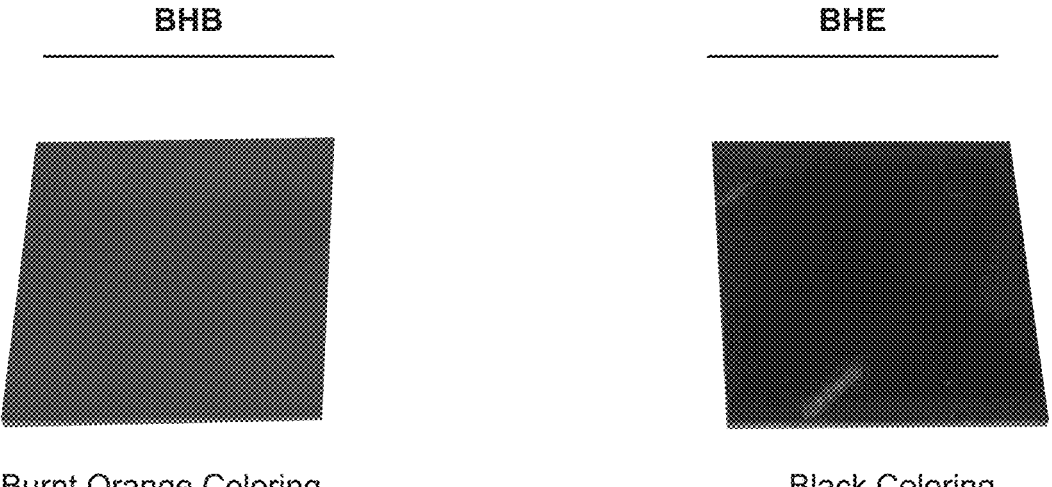
FIG. 6 is a digital image of the material of FIG. 2 on the left and the material of FIG. 3 on the right.

Referring to FIGS. 1-2 and 4 compositions disclosed herein include phosphate glass-ceramics and phase-separated phosphate glasses. Referring specifically to the sample BHB shown in FIG. 2, scanning electron microscopy shows distinct phase separation, with a glassy phase, copper metal, and crystalline phases. X-ray diffraction shows the compositions for the different phases differ from one another. For example, the copper metal of spectrum 28 is far different from the glassy phase of spectrums 29 and 30, as well as the spectrum 31 phase. Notably the glassy phase is a phosphate glass, as disclosed herein, but still includes silica, possibly due to contamination from crucible melting. FIGS. 4-5 are x-ray diffraction measurements from a powdered 1-inch by 1-inch polished coupon of BHB (FIG. 6 left) and BHE (FIG. 6 right), and represent interior of the respective patty. Accordingly, FIG. 4 shows BHB contains copper metal and crystalline copper phosphate phase (potentially with iron), while FIG. 5 shows BHE is amorphous.

Referring to FIGS. 3 and 5, surprisingly Applicants discovered that subtle differences in constituents of the ternary of FIG. 1 compared to those of BHB led to fully amorphous glass disclosed herein, such as example BHE. FIG. 5 shows BHE to be amorphous. Compare the scanning electron microscope and x-ray diffraction of FIGS. 2 and 4 versus FIGS. 3 and 5. The latter results are indicative of single-phase, fully amorphous glass. Applicants believe fully amorphous glass in this system and/or with the antimicrobial properties shown is particularly unique and surprising because conventional antimicrobial glass-ceramics rely on cuprite crystals to inhibit microbes and a fully amorphous glass, especially of single phase, may not be expected to function to inhibit microbes as disclosed herein. Without being bound to any theory, one possible explanation for antimicrobial efficacy of single-phase, fully amorphous glasses disclosed herein could be formation of a thin surface layer of copper oxide that kills or inhibits microbes. Such a layer may be particularly thin, such as less than 10 μm in embodiments, and may form by exposure of the glass to open atmosphere or may be facilitated, such as by heating in oxygen.

The melt and coupon (FIG. 6 left 1-inch by 1-inch square coupon) of sample BHB show phase separation (see FIG. 2). Phases of copper metal, crystalline phases of iron, copper phosphate and glass were observed. The surface of BHB melt has a thin copper oxide layer. The melt and coupon (FIG. 6 right 1-inch by 1-inch square coupon) of sample BHE did not show any phases or apparent phase separation under any of the analysis conditions (polished, fractured or ion milled) (see FIG. 3). The surface of BHE melt has a thin copper oxide layer.

The following Table 1 includes compositions measured using the United States EPA Test Method for Efficacy of Copper Alloy Surfaces as a Sanitizer test disclosed above, compositions were measured with inductively coupled plasma mass spectroscopy. "StDev" refers to standard deviation. Additional compositions were melted and yet not tested.

TABLE 1

|  | BFS | BFW | BGF | BGG | BGW | BGZ |
|---|---|---|---|---|---|---|
| Batched (mol %) | | | | | | |
| CuO | 15 | 15 | 25 | 25 | 40 | 45 |
| Fe₂O₃ | 25.5 | 34 | 15 | 10 | 10 | 10 |
| P₂O₅ | 59.5 | 51 | 60 | 65 | 50 | 45 |
| Analyzed (mol %) | | | | | | |
| CuO | 16.8 | 16.4 | 28.6 | 29.1 | 38.8 | 41.3 |
| Fe₂O₃ | 24.7 | 31.7 | 14.4 | 9.8 | 7.9 | 8.2 |
| P₂O₅ | 58.5 | 52.0 | 57.0 | 61.2 | 45.7 | 39.9 |
| SiO₂ | | | | | 7.5 | 10.6 |
| Analyzed (mol %)-silica normalized out | | | | | | |
| CuO | 16.8 | 16.4 | 28.6 | 29.1 | 42.0 | 46.2 |
| Fe₂O₃ | 24.7 | 31.7 | 14.4 | 9.8 | 8.6 | 9.2 |
| P₂O₅ | 58.5 | 52.0 | 57.0 | 61.2 | 49.4 | 44.6 |
| Sum | 100.0 | 100.0 | 100.0 | 100.0 | 100.0 | 100.0 |
| Log Kill | 0.05 | −0.09 | 0.44 | 0.84 | 1.37 | 0.42 |
| StDev | 0.12 | −0.15 | 0.02 | 0.12 | 0.04 | 0.08 |
| % Kill | 9 | −31 | 64 | 85 | 96 | 62 |
| StDev | 25 | 12 | 2 | 4 | 0.4 | 7 |

|  | BHA | BHB | BGQ | BHE | Copper metal |
|---|---|---|---|---|---|
| Batched (mol %) | | | | | |
| CuO | 50 | 55 | 40 | 50 | |
| Fe2O3 | 10 | 10 | 5 | 5 | |
| P2O5 | 40 | 35 | 55 | 45 | |
| Analyzed (mol %) | | | | | |
| CuO | 47.2 | 52.9 | 40.3 | 48.3 | |
| Fe2O3 | 8.3 | 8.5 | 4.2 | 4.1 | |
| P2O5 | 37.2 | 32.7 | 49.5 | 41.1 | |
| SiO2 | 7.2 | 5.9 | 6.1 | 6.5 | |
| Analyzed (mol %)-silica normalized out | | | | | |
| CuO | 50.9 | 56.3 | 42.9 | 51.7 | |
| Fe2O3 | 9.0 | 9.0 | 4.4 | 4.3 | |
| P2O5 | 40.1 | 34.7 | 52.7 | 44.0 | |
| Sum | 100.0 | 100.0 | 100.0 | 100.0 | |
| Log Kill | 1.19 | 4.3 | 0.43 | 4.3 | 5.2 |
| StDev | 0.02 | | 0.02 | | |
| % Kill | 94 | 100 | 63 | 100 | 100 |
| StDev | 0.2 | | 1 | | |

According to an exemplary aspect, material disclosed herein has a CIELAB L* value below 35 on the scale of 0 black to 100 white, such as below 30, a CIELAB a* value within 5 of zero on a scale of ±100, such as within 3 of zero, such as within 1 of zero, and/or a CIELAB b* value within 5 of zero on a scale of ±100, such as within 3 of zero, such as within 1 of zero. In embodiments the material is black. In embodiments, the CIELAB L* value may be at least 35, absolute value of a* may be greater than 5, and absolute value of b* may be greater than 5, and/or some or all the CIELAB values are at least 10 away from burnt orange (50 L*, 44 a*, and 61 b*). In embodiments, the material is otherwise colored. In embodiments, the material is optionally burnt orange in color. The following Table 1A includes color coordinates for the BHB and BHE materials where L* is the index that goes from black at 0 to white at 100, a* goes from green (−) to red (+), and b* goes from blue (−) to yellow (+), with measurement conditions: D65-10, % R MAV SCI UVC Color i7.

TABLE 1A

|  |  | L* | a* | b* |
|---|---|---|---|---|
| BHB | Average | 37.61 | 8.47 | 6.39 |
|  | Stdev | 0.11 | 0.46 | 0.37 |
| BHE | Average | 28.77 | −0.04 | −0.35 |
|  | Stdev | 0.35 | 0.02 | 0.12 |

According to an exemplary aspect, materials disclosed herein may have copper and iron oxidation state distributions as described below. Determination of copper and iron oxidation state distribution: in embodiments, the samples may be dissolved in the presence of a known amount of $Cr^{+6}$, in the form of $K_2Cr_2O_7$, which is in small excess of what is consumed by the reaction:

$$3Cu^{+1} + Cr^{+6} \rightarrow 3Cu^{+2} + Cr^{+3}$$

The remaining $Cr^{+6}$ is determined by titration with $Fe^{+2}$. The resulting value from the test is the total reducing power, i.e. $Fe^{+2}$ and $Cu^{+1}$. This result is compared to the total possible reducing power, R, based on the supplied estimated composition. The value of R can vary freely from 0 to 1, with zero meaning no reduced species present and 1 meaning no oxidized species present. As such the larger the value, the more reduced is the glass. Materials disclosed herein may have an R value of over 0.5, such as for materials having sanitizer and antimicrobial properties disclosed herein, such as over 0.55, over 0.6, over 0.65. The R value may optionally be 0.55 or less, such as 0.45 to 0.55, or over 0.65, such as at least 0.7, at least 0.8, at least 0.9.

As indicated above, in embodiments, the $P_2O_5$—$Fe_2O_3$—CuO materials may have other constituents, such as contaminants or additives to facilitate manufacturing. The materials optionally include at least some silica, such as examples BGW and BGZ in Table 1 above, which include 7.5 mol % and 10.6 mol % $SiO_2$ respectively when analyzed, possibly due to contamination from melting at high temperatures (e.g., 1350° C. for 5 hours) in quartz crucible. Other examples in Table 1 included $SiO_2$ as a constituent. Accordingly, Applicants discovered that $SiO_2$ may be added to the $P_2O_5$—$Fe_2O_3$—CuO materials, where resulting glasses and/or glass-ceramics still provide antimicrobial properties, as evidenced by Table 1 above. While such materials may be described as "mostly ternary" as disclosed above, as $SiO_2$ is purposely added and in greater amounts, resulting materials may also be described as part of a $P_2O_5$—$Fe_2O_3$—CuO—$SiO_2$ system.

Embodiments in the $P_2O_5$—$Fe_2O_3$—CuO—$SiO_2$ system are all black, and fall within ranges of CIELAB parameters disclosed above. Embodiments in the $P_2O_5$—$Fe_2O_3$—CuO—$SiO_2$ system may be processed (e.g., batched, melted, mixed, fined, drawn, annealed, etc.) to single-phase glasses and glass articles (e.g., push plates, frit), such as where the glasses are fully amorphous, such as through a bulk of the glass while possibly excluding a thin surface film as disclosed above. Embodiments in the $P_2O_5$—$Fe_2O_3$—CuO—$SiO_2$ system exhibit full kill by the U.S. EPA dry test. Surprisingly, glasses in the $P_2O_5$—$Fe_2O_3$—CuO—$SiO_2$ system, as disclosed herein, may be formed under normal atmospheric conditions, reducing complexity of manufacturing and environmental controls. Further, such glasses may be machined under normal conditions with regularly used solutions (e.g., diamond saw, laser cutting, controlled fracture after scribing, etc.).

According to an exemplary aspect, glasses in the $P_2O_5$—$Fe_2O_3$—CuO—$SiO_2$ system disclosed herein may still be characterized as "phosphate glasses," where in such aspects of the innovation the mol % of $P_2O_5$ is equal to or greater than $SiO_2$ and/or such that $P_2O_5$ is a primary or main network former of the glass. As disclosed above, composition constituents in percentage of total moles (mol %) include at least 10 mol % $P_2O_5$, such as at least 15 mol %, and preferably in embodiments at least 25 mol % such as for improved antimicrobial properties, such as at least 30 mol %, such as at least 35 mol %, and/or no more than 75 mol %, such as no more than 63 mol %, and preferably in embodiments no more than 50 mol % $P_2O_5$ such as for improved antimicrobial properties.

However, as evidenced by examples BGW and BGZ in Table 1 above, Applicants have discovered that in embodiments, an amount of $P_2O_5$ can be offset or reduced by inclusion of some $SiO_2$ as a constituent. Applicants have found $SiO_2$ content can be used to control dissolution behavior of glass. For example, $P_2O_5$—$Fe_2O_3$—CuO—$SiO_2$ system glasses with higher $SiO_2$ contents may exhibit lower chemical durability, which could be an advantage for applications such as paint additives where faster dissolution may be beneficial. As $SiO_2$ may be more readily available, substitution of $SiO_2$ for $P_2O_5$ may have efficiency and cost advantages. Furthermore, as evidenced by examples BGW and BGZ, Applicants find $SiO_2$ in the glass expands options of equipment that can be used to process (e.g., melt and deliver) the glasses to include quartz and quartz-lined equipment.

As a constituent in glasses and glass-ceramics as disclosed herein, $SiO_2$ may be non-zero, such as a positive amount of $SiO_2$, such as at least 1 mol %, such as at least 5 mol % as shown in Examples of Table 1, such as at least 10 mol % as shown by example BGZ of Table 1, such as at least 15 mol % as shown by examples Ex2.2, Ex2.3, Ex2.4, and Ex2.5 in Table 2, such as at least 20 mol % as shown by examples Ex2.3, Ex2.4, and Ex2.5 in Table 2, such as at least 25 mol % as shown by examples Ex2.4, and Ex2.5 in Table 2, such as at least 30 mol % as shown by example Ex2.5 in Table 2, and/or the amount of constituent $SiO_2$ may be less than 50 mol %, such as less than 40 mol %, such as less than 35 mol %, such as less than 33 mol %. Applicants found that compositions with $SiO_2$ contents greater than about 30 mol % may not melt well and or be easily poured into glasses, however glasses may optionally have greater than 50 mol % $SiO_2$.

The following Table 2 includes sample phosphate glass compositions with $SiO_2$ contents, according to an exemplary aspect, which have been measured for antimicrobial efficacy. The examples in the table may be described as mostly ternary, as defined above, or may be characterized as compositions in the $P_2O_5$—$Fe_2O_3$—CuO—$SiO_2$ quaternary space. Notably, the examples of Table 2 exhibit full kill.

TABLE 2

| Analyzed (mol %) | Ex2.1 | Ex2.2 | Ex2.3 | Ex2.4 | Ex2.5 |
|---|---|---|---|---|---|
| $P_2O_5$ | 40.8 | 36.7 | 34.0 | 31.9 | 30.9 |
| $Fe_2O_3$ | 4.0 | 3.5 | 3.3 | 3.1 | 3.0 |
| CuO | 46.1 | 41.6 | 38.5 | 36.1 | 35.2 |
| $SiO_2$ | 9.1 | 18.3 | 24.2 | 29.0 | 30.9 |
| Log Kill | 4.332 | 4.332 | 4.332 | 4.332 | 4.332 |
| StDev | 0 | 0 | 0 | 0 | 0 |
| % Kill | 100.0 | 100.0 | 100.0 | 100.0 | 100.0 |
| StDev | 0.0 | 0.0 | 0.0 | 0.0 | 0.0 |

Compositions of Table 2 were measured using inductively coupled plasma mass spectrometry are "as-analyzed" amounts are provided in mol %. Note that each of the above examples in Table 2 have a log kill performance of at least 3, such as greater than 3. Log kill and % kill of Table 2 correspond to the EPA characterization disclosed above.

Figure 7A:
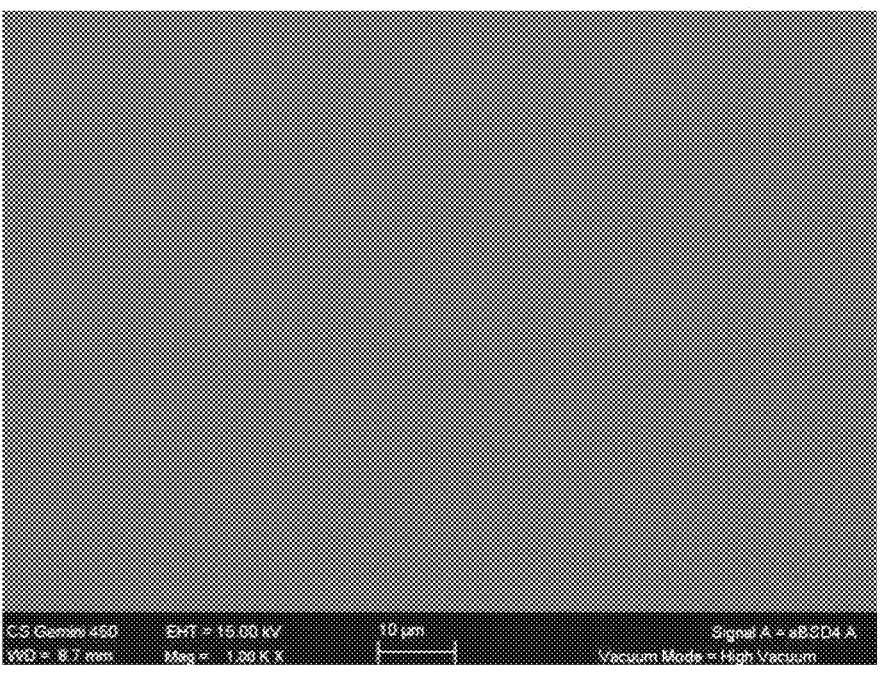
FIG. 7A is a scanning electron microscope image of a material surface according to an exemplary aspect.
Figure 7B:
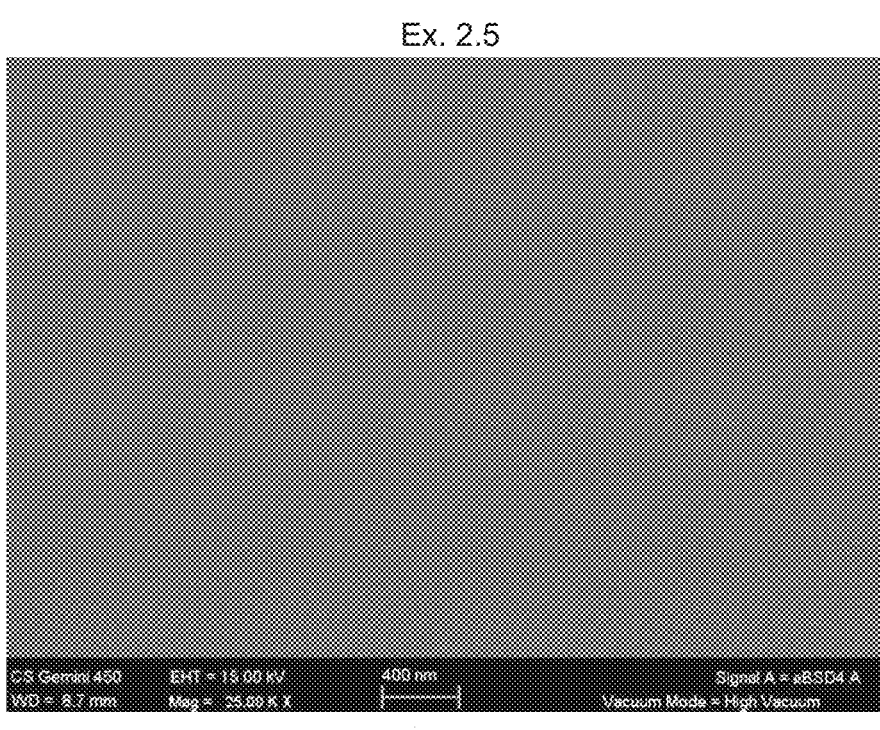
FIG. 7B is a scanning electron microscope image of the material surface of FIG. 7A, but at higher magnification.
Figure 7C:
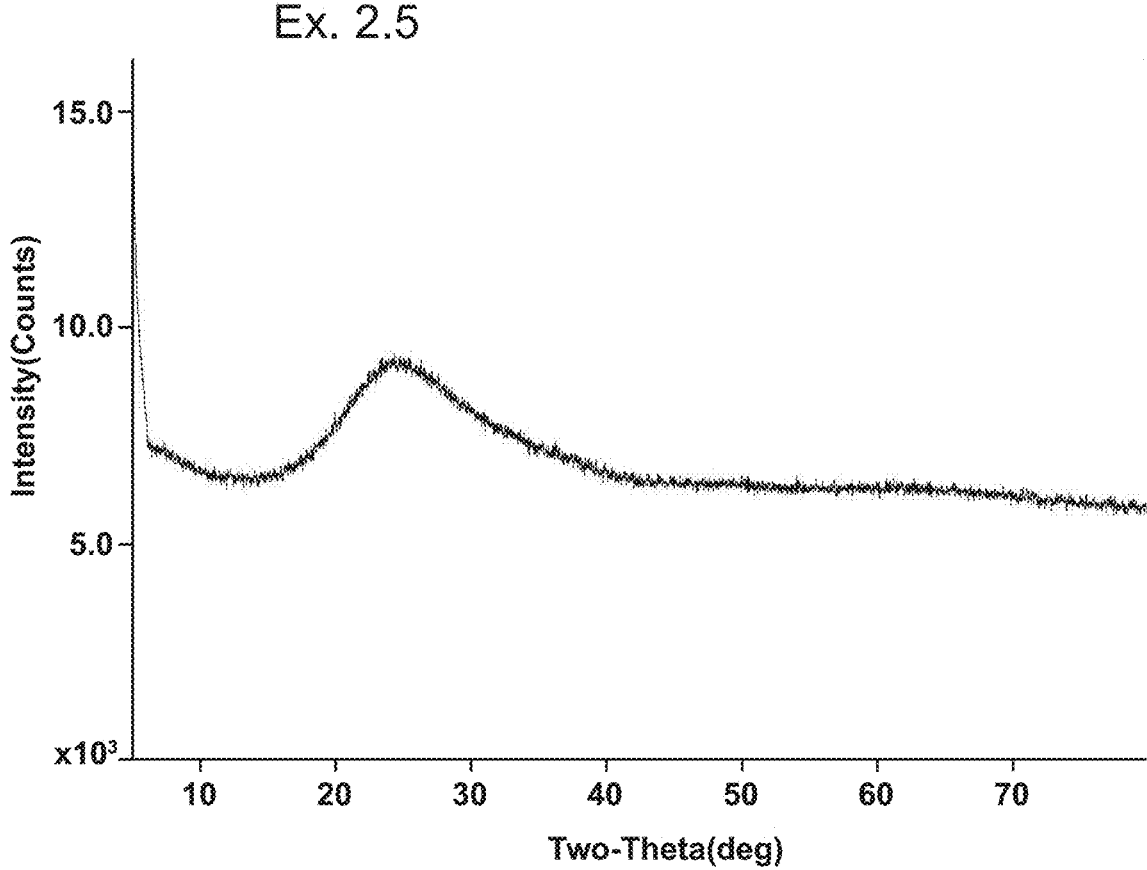
FIG. 7C is an x-ray diffraction diagram of the material of FIGS. 7A and 7B.

Referring to FIGS. 7A, 7B, and 7C, scanning electron microscope images (FIGS. 7A and 7B) and x-ray diffraction (FIG. 7C) correspond to glass of Ex2.5 from Table 2. Notably, the glass of Ex2.5 has the highest concentration of $SiO_2$ from the examples of Table 2, essentially equal parts $SiO_2$ and $P_2O_5$, where either or both constituents were less than the molar percentage of CuO as analyzed. While FIGS. 7A and 7B are SEM micrographs, the images appear generally featureless, similar to the micrograph of FIG. 3. Also, the micrograph of FIG. 7B is about 25 times the magnification of the micrographs of FIGS. 7A and 3, and FIG. 7B still shows no phase separation of the glass, precipitates, metal, or crystals (compare to FIG. 2). Accordingly, materials disclosed herein may be processed to be fully amorphous, at least through their bulk as discussed above, and may be characterized as single-phase glass that is not phase-separated. This structure may be surprising or counterintuitive given the antimicrobial performance of the materials, which may have been previously expected to have been related to presence of copper-containing crystals or metal precipitates in a material. Similar to the x-ray diffraction of FIG. 5, x-ray diffraction of FIG. 7C shows that the glass of Ex2.5 is single phase, amorphous.

In furtherance of the disclosure above and as evidenced by examples disclosed, material (e.g., glass, glass-ceramic) may include, in terms of as-analyzed and/or as-batched, constituent components: a non-zero amount of $P_2O_5$ or other oxide or compound containing phosphorus, such as at least 5 mol %, at least 10 mol %, at least 20 mol %, at least 30 mol %, at least 35 mol %, at least 40 mol %, at least 50% and/or no more than 80 mol %, such as no more than 70 mol %, no more than 65 mol %, no more than 60 mol %, no more than 55 mol %, no more than 50 mol %, no more than 40 mol %, no more than 30 mol %, no more than 20 mol %, or no more than 10 mol % in contemplated embodiments; and a non-zero amount of CuO or other oxide or compound containing copper, such as at least 15 mol %, at least 20 mol %, at least 25 mol %, at least 30 mol %, at least 35 mol %, at least 40 mol %, at least 50% and/or no more than 65 mol %, such as no more than 60 mol %, no more than 55 mol %, no more than 50 mol %, no more than 45 mol %, no more than 40 mol % in contemplated embodiments.

In terms of as-analyzed and/or as-batched constituent components of the material, the sum of CuO and $P_2O_5$ may be at least 50 mol % of the composition, such as at least 60 mol %, such as at least 70 mol %, and/or less than 95 mol %, such as less than 90 mol %, such as less than 80 mol % in embodiments. Further, amounts of CuO and $P_2O_5$ may be comparable to one another, such as where a difference (in absolute value) of constituent contribution therebetween in as-analyzed and/or as-batched quantities may be less than 30 mol %, such as less than 25 mol %, such as less than 20 mol %, such as less than 15 mol %, such as less than 10 mol %.

As disclosed above and as evidenced by examples disclosed, the material (e.g., glass, glass-ceramic) may further include additional constituents, either as-batched or as-analyzed, such as at least one additional constituent (e.g., an oxide of iron, such as $Fe_2O_3$, an oxide of silicon, such as $SiO_2$) having a non-zero mol %, such as at least 0.01 mol %, at least 0.1 mol %, at least 1 mol %, at least 3 mol %, at least 5 mol %, at least 10 mol %, at least 20 mol %, at least 30 mol %, at least 35 mol %, at least 40 mol %, at least 50% and/or no more than 80 mol %, such as no more than 70 mol %, no more than 65 mol %, no more than 60 mol %, no more than 55 mol %, no more than 50 mol %, no more than 40 mol %, no more than 30 mol %, no more than 20 mol %, no more than 10 mol % in contemplated embodiments for the at least one additional constituent.

Furthermore, the material may include at least two additional constituents beyond $P_2O_5$ and CuO, such as $SiO_2$ and $Fe_2O_3$, where either or any of the at least two additional constituents have a non-zero mol %, such as at least 0.01 mol %, at least 0.1 mol %, at least 1 mol %, at least 3 mol %, at least 5 mol %, at least 10 mol %, at least 20% or more and/or no more than 80 mol %, such as no more than 70 mol %, no more than 65 mol %, no more than 60 mol %, no more than 50 mol %, no more than 35 mol %, no more than 30 mol %, no more than 25 mol %, no more than 20 mol %, no more than 15 mol %, no more than 10 mol %, no more than 8 mol % in contemplated embodiments, or any combination of such ranges for the additional constituents such as 1 mol %≤$Fe_2O_3$≤15 mol % and 0≤$SiO_{2≤35}$ mol %, for example.

The constituents of $P_2O_5$, CuO, $Fe_2O_3$, and $SiO_2$ in sum with one another may make up a majority of the material, in terms of as-batched or as-analyzed mol %, such as where ($P_2O_5$+CuO+$Fe_2O_3$+$SiO_2$) is at least 60 mol %, at least 70 mol %, at least 80 mol %, at least 90 mol %, and/or but clearly not more than 100 mol %, such as not more than 99 mol % in contemplated embodiments, such as not more than 95 mol %, not more than 90 mol %, or not more than 80 mol %, such as where additional constituents may be added to the composition. The amount of $SiO_2$ may be more than $Fe_2O_3$; and/or constituents of $P_2O_5$, CuO, and $SiO_2$ in sum with one another may make up a majority of the material, in terms of as-batched or as-analyzed mol %, such as where ($P_2O_5$+CuO+$SiO_2$) is at least 65 mol %, at least 75 mol %, at least 80 mol %, at least 90 mol %, and/or but clearly not more than 100 mol %, such as not more than 99 mol % in embodiments, such as not more than 95 mol %, not more than 90 mol %, or not more than 80 mol %.

As disclosed above and as evidenced by examples disclosed, the material (e.g., glass, glass-ceramic) may be characterized as a phosphate glass and accordingly may have a substantial phosphorus component. For example, as-batched or as analyzed $SiO_2$ may be less than $P_2O_5$ as a constituent, such as by at least 1 mol %, such as at least 3 mol %, at least 5 mol %, at least 10 mol %, at least 15 mol %, at least 20 mol %, at least 30 mol % and/or not, such as where $SiO_2$ and $P_2O_5$ are about the same (e.g., within 1 mol %). In contemplated embodiments, $SiO_2$ is greater than $P_2O_5$ as a constituent component of the material composition, such as by at least 1 mol %, such as at least 3 mol %, at least 5 mol %, at least 10 mol %, at least 15 mol %, at least 20 mol %, at least 30 mol %. Similarly, as-batched or as analyzed $SiO_2$ may be less than CuO as a constituent, such as by at least 1 mol %, such as at least 3 mol %, at least 5 mol %, at least 10 mol %, at least 15 mol %, at least 20 mol %, at least 30 mol % and/or not, such as where $SiO_2$ and CuO are about the same (e.g., within 1 mol %), or where $SiO_2$ is greater than CuO in contemplated embodiments, such as by at least 1 mol %, such as at least 3 mol %, at least 5 mol %, at least 10 mol %, at least 15 mol %, at least 20 mol %, at least 30 mol %. As indicated, Applicants find use of some $SiO_2$ to have benefits, but too much $SiO_2$ in phosphate glasses and glass-ceramics as disclosed herein can be difficult to process.

In furtherance of disclosure above and as evidenced by examples disclosed, material (e.g., glass, glass-ceramic) may include, in terms of as-analyzed and/or as-batched, constituent components $P_2O_5$ or other oxide or compound containing phosphorus in amounts as disclosed above and CuO or other oxide or compound containing copper in amounts as disclosed above. The sum of CuO and $P_2O_5$ (i.e. CuO+$P_2O_5$ in mol %) may be substantial in the material, such as at least 50 mol % of the composition or other amounts as disclosed above.

Further, the material may include additional constituents, either as-batched or as-analyzed, such as at least one additional constituent (e.g., an oxide of iron, such as $Fe_2O_3$, an oxide of silicon, such as $SiO_2$) having a non-zero mol %, such as in amounts disclosed above. As indicated above, constituents of $P_2O_5$, CuO, and $SiO_2$ in sum with one another (i.e. $P_2O_5$+CuO+$SiO_2$ in mol %) may make up a majority of the material, in terms of as-batched or as-analyzed mol % and in amounts as disclosed above. With that said, the constituent(s) may be a constituent other than $SiO_2$, as disclosed above, such as $Fe_2O_3$ and/or different modifiers and other constituents such as MgO, ZnO, CaO, SrO, BaO, $Li_2O$, $Na_2O$, $K_2O$, $TiO_2$, NiO, $MnO_2$, and $Al_2O_3$ or combinations thereof. And, in at least some such instances as disclosed above, the material may include at least two additional constituents beyond $P_2O_5$ and CuO, such as $SiO_2$ and $Fe_2O_3$, such as in amounts disclosed above.

The following Table 3 includes additional example of materials (e.g., glass, glass-ceramics) according to an exemplary aspect.

TABLE 3

| Analyzed (mol %) | Ex. A | Ex. B | Ex. C | Ex. D | Ex. E | Ex. F | Ex. G |
|---|---|---|---|---|---|---|---|
| $P_2O_5$ | 40.4 | 41 | 39.8 | 39.4 | 38.1 | 40.1 | 41.4 |
| $Fe_2O_3$ | | | | | | | |
| CuO | 47.7 | 48.8 | 47.9 | 48.2 | 47.3 | 46.3 | 47.8 |
| $SiO_2$ | 7.1 | 5.4 | 7 | 7.8 | 9.9 | 8.8 | 6.1 |
| MgO | 4.8 | | | | | | |
| ZnO | | 4.8 | | | | | |
| CaO | | | 5.4 | | | | |
| SrO | | | | 4.7 | | | |
| BaO | | | | | 4.7 | | |
| $Li_2O$ | | | | | | 4.8 | |
| $Na_2O$ | | | | | | | 4.8 |
| $K_2O$ | | | | | | | |
| $TiO_2$ | | | | | | | |
| $Al_2O_3$ | | | | | | | |
| NiO | | | | | | | |
| $MnO_2$ | | | | | | | |
| Single Phase Glass | | X | X | X | | | X |
| Crystalline Cu present (phase-separated) | X | | | | X | X | |
| Log Kill | 5.06 | 5.06 | 5.06 | 5.06 | 5.06 | 5.06 | 5.06 |
| StDev | 0.00 | 0.00 | 0.00 | 0.00 | 0.00 | 0.00 | 0.00 |
| % Kill | 100.0 | 100.0 | 100.0 | 100.0 | 100.0 | 100.0 | 100.0 |
| StDev | 0.0 | 0.0 | 0.0 | 0.0 | 0.0 | 0.0 | 0.0 |

| Analyzed (mol %) | Ex. H | Ex. I | Ex. J | Ex. K | Ex. L | Ex. M | Ex. N |
|---|---|---|---|---|---|---|---|
| $P_2O_5$ | 40 | 40.4 | 48.3 | 47.1 | 44.8 | 44.2 | 43.7 |
| $Fe_2O_3$ | | | | | | | |
| CuO | 47.3 | 48.4 | 45.7 | 48.0 | 49.4 | 50.0 | 50.5 |
| $SiO_2$ | 8 | 6.4 | 6.1 | 4.9 | 0.8 | 1.0 | 1.3 |
| MgO | | | | | | | |
| ZnO | | | | | | | |
| CaO | | | | | | | |
| SrO | | | | | | | |
| BaO | | | | | | | |
| $Li_2O$ | | | | | | | |
| $Na_2O$ | | | | | | | |
| $K_2O$ | 4.8 | | | | | | |
| $TiO_2$ | | 4.8 | | | | | |
| $Al_2O_3$ | | | | | 5.1 | | |
| NiO | | | | | | 4.8 | |
| $MnO_2$ | | | | | | | 4.6 |
| Single Phase Glass | X | X | X | X | X | X | X |
| Crystalline Cu present (phase-separated) | | | | | | | |
| Log Kill | 5.06 | 1.77 | 0.97 | 1.18 | 1.57 | 5.477 | 5.477 |
| StDev | 0.00 | 0.31 | 0.03 | 0.00 | 0.29 | 0.00 | 0.00 |
| % Kill | 100.0 | 98.1 | 89.2 | 93.4 | 97.0 | 100.0 | 100.0 |
| StDev | 0.0 | 1.3 | 0.9 | 0.1 | 1.9 | 0.0 | 0.0 |

Compositions of Table 3 were measured using inductively coupled plasma mass spectrometry and are in "as-analyzed" amounts provided in mol % corresponding representative oxides of elemental components. Note that many of the above examples in Table 3 have a log kill performance of at least 3, such as greater than 3. "Log kill" and "% kill" of Table 3 correspond to the EPA characterization disclosed above. "X" in the category of "single phase glass" corresponds to the sample being fully amorphous and single-phase, while "X" in the "crystalline Cu present (phase-separated)" category corresponds to the example being a glass-ceramic with copper-containing crystals.

As demonstrated by examples in Table 3, among other disclosure herein, the material may comprise CuO and $P_2O_5$ in above disclosed amounts, plus an additional constituent, such as $SiO_2$, $Fe_2O_3$, MgO, ZnO, CaO, SrO, BaO, $Li_2O$, $Na_2O$, $K_2O$, $TiO_2$, NiO, $MnO_2$, and/or $Al_2O_3$, where the corresponding material may display antimicrobial behavior, such as from fairly ineffective antimicrobial behavior to full kill by the U.S. EPA dry test. Interestingly, Applicants found binary CuO and $P_2O_5$ compositions (i.e. without additional constituents) in a similar composition range may not exhibit full kill, so at least one additional constituent (e.g., modifier component) may help facilitate antimicrobial behavior of the material.

Such materials may be fully amorphous, single phase materials, such as where the additional constituent includes ZnO, CaO, SrO, $Na_2O$, and $K_2O$-containing materials, or phase-separated and partially crystalline, such as where the additional constituent includes MgO, BaO, and $Li_2O$-containing materials. As indicated above, microstructure of amorphous compositions may be advantageous for uses that include bulk parts, such as door push plates and elevator buttons for architectural applications. Single phase amorphous materials may be black, within the color ranges disclosed above, and the phase-separated materials appear mottled orange and black. Such materials could be used for applications that use antimicrobial powders or frit, such as additives for paint. Further, compositions of Table 3 are phosphate glasses, but these phosphate glasses may be formed and machined under normal atmospheric conditions (e.g., under 50° C. (exterior to the forming equipment, such as furnace), atmospheric pressure, zero humidity, open air).

Applicants have found $Fe_2O_3$ may be difficult for some melting and/or forming processes as $Fe_2O_3$ may easily alloy with metals used in manufacturing processes. Using other modifier cations can be advantageous for manufacturing. For example, some or all of $Fe_2O_3$ may be substituted with $R_2O$ as a modifier, where R is an alkali metal, such as Li, Na, and/or K. In other examples, some or all of the $Fe_2O_3$ may be substituted with R'O as a modifier, where R' is an alkaline earth metal or zinc, such as Mg, Zn, Ca, Sr, Ba, for example. Still, in embodiments, some or all of $Fe_2O_3$ may be substituted with Ti, Ni, Mn, and/or Al, such as in the form of respective oxides thereof, such as $TiO_2$, NiO, $MnO_2$, and/or $Al_2O_3$.

In embodiments, a material, such as an amorphous glass, may include $P_2O_5$ in amounts as disclosed above (e.g., >30 mol %), CuO in amounts as disclosed above (e.g., >30%), and a non-zero amount of alkali metal oxide, such as at least 0.1 mol % (as-analyzed or as-batched), at least 0.2 mol %, at least 0.5 mol %, at least 1 mol %, at least 2 mol %, at least 3 mol %, at least 4 mol %, at least 4.5 mol % and/or no more than 25 mol %, such as no more than 20 mol %, no more than 15 mol %, no more than 12.5 mol %, no more than 10 mol %, no more than 8 mol %, no more than 6 mol %, or no more than 5 mol %, where the alkali metal oxide may be $Li_2O$, as shown by Example F of Table 3, $Na_2O$ as shown by Example G, $K_2O$ as shown by Example H, or another alkali metal oxide or another amount thereof (e.g., none or more than 25 mol %). In contemplated embodiments, the modifier may include more than one alkali metal oxide where the sum of the alkali metal oxides is in such a range.

The alkali metal oxide, as evidenced by Examples F, G, and H of Table 3, may be combined with $SiO_2$ in embodiments, or may conceivably be in materials that include $P_2O_5$ and CuO, but without $SiO_2$. For example, materials as disclosed herein may include $P_2O_5$ and CuO, in amounts as disclosed above, one or more alkali metal oxide constituents, such as $Li_2O$, $Na_2O$, $K_2O$ in amounts as disclosed above, and oxides of iron (denoted $Fe_2O_3$ for convenience) in ranges as disclosed above. For embodiments with an alkali metal oxide modifier, Applicants contemplate that ion-exchange strengthening of the glass family is possible.

Figure 12C:
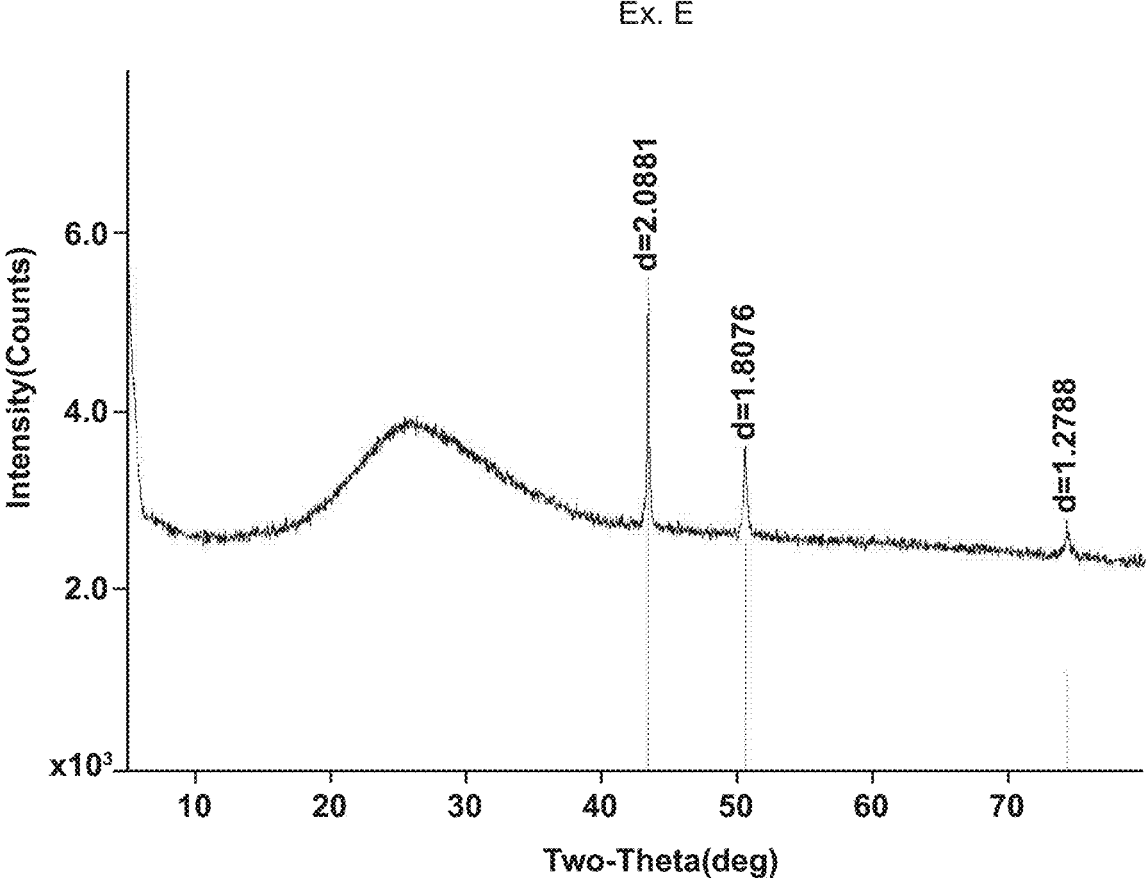
FIG. 12C is an x-ray diffraction diagram of the material of FIGS. 12A and 12B.
Figure 13A:
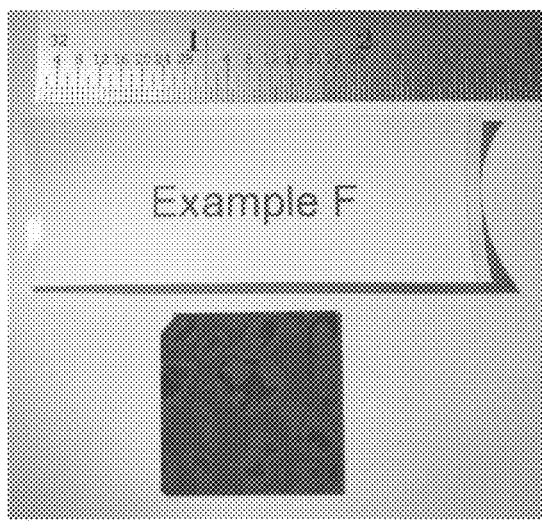
FIG. 13A is a digital image of a sample of material, corresponding to Sample F of Table 3 below, according to an exemplary aspect.
Figure 13B:
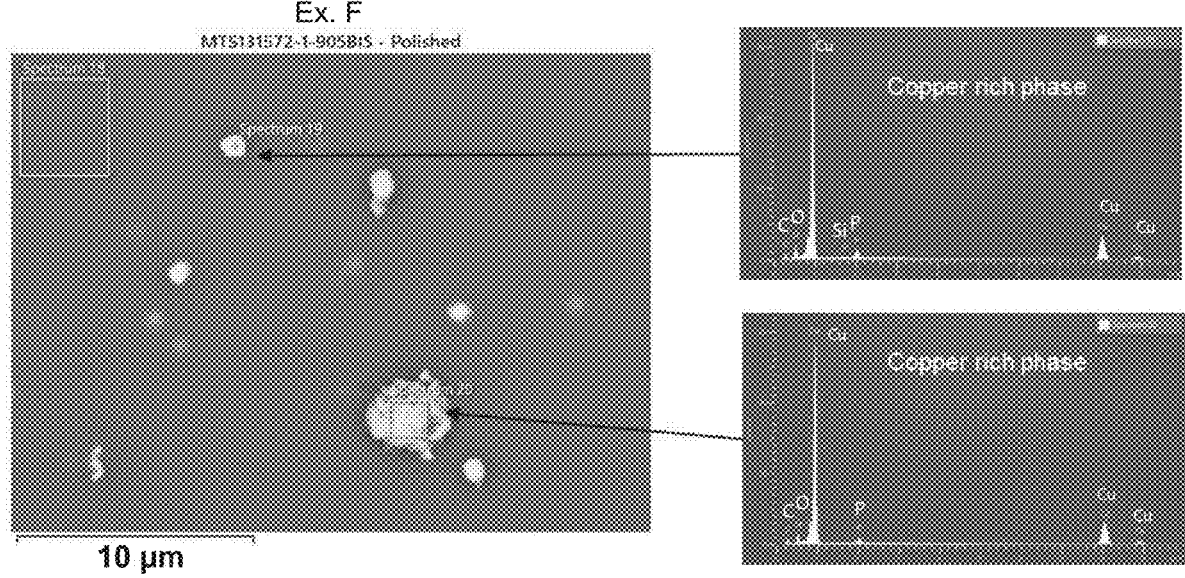
FIG. 13B is a scanning electron microscope micrograph of the sample of FIG. 13A surrounded by x-ray diffraction diagrams for locations on the image.
Figure 13C:
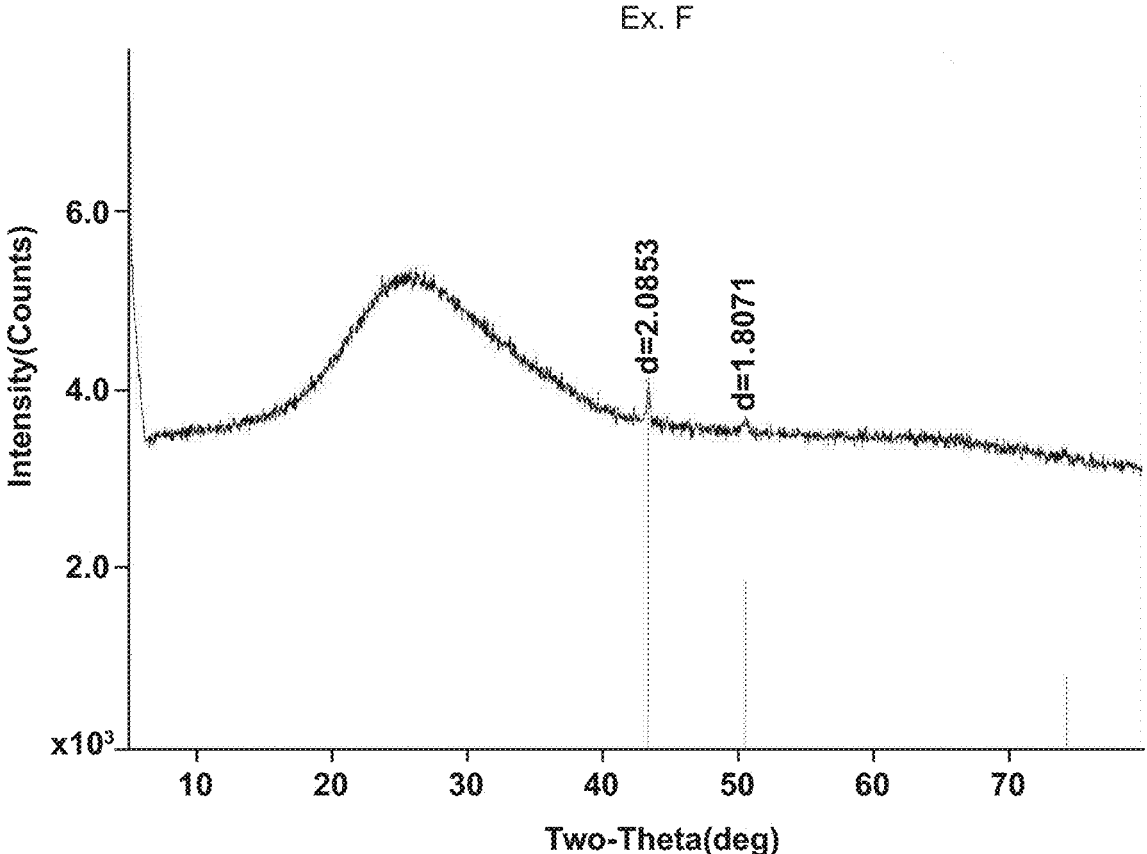
FIG. 13C is an x-ray diffraction diagram of the material of FIGS. 13A and 13B.

FIGS. 13A, 13B, and 13C, show material of Example F of Table 3, which was batched as 5 mol % $Li_2O$, 45 mol % $P_2O_5$, and 50 mol % CuO. As can be seen in the digital image of FIG. 13A, the material had a mottled coloring, such as a mix of burnt orange and black coloring. As shown in the micrograph of FIG. 13B, the material included crystals or precipitates of copper-rich phase. At least some, such as most of the crystals have a cross-sectional dimension less than 10 μm, such as less than 7 μm, and/or at least 100 nm, such as at least 0.5 μm. At least some, such as most of the crystals are located within at least 100 μm of another of the crystals, such as within 50 μm, such as within 10 μm, and/or no more than 100 nm, such as no more than 0.5 μm from the nearest other crystal. The crystals may be present throughout a bulk of such material, as opposed on only on the surface, or may be grown on the surface through surface heat treatments, or on certain regions, but not others, such as with regions with crystals removed by laser bleaching. As shown in FIG. 13C, x-ray diffraction evidences glass-ceramic, crystalline and glassy phases. The plot shows identifiable spikes (i.e. beyond noise) corresponding to crystals, such as at least one, at least two, and/or such as a spike where Two-Theta is about 2.0853 deg, a spike where Two-Theta is about 1.8071 deg, and/or a spike where Two-Theta is about 1.2788 deg (see also FIG. 12C), such as where "about" may be within 0.05 deg, such as within 0.025 deg.

Figure 14A:
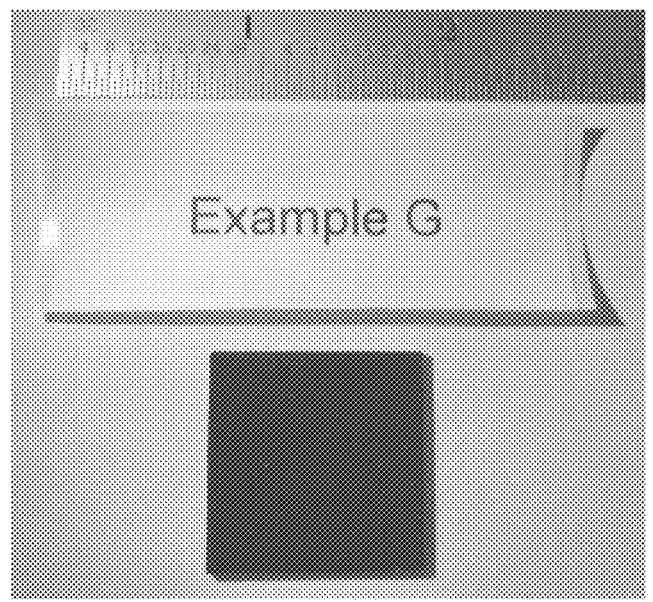
FIG. 14A is a digital image of a sample of material, corresponding to Sample G of Table 3 below, according to an exemplary aspect.
Figure 14B:
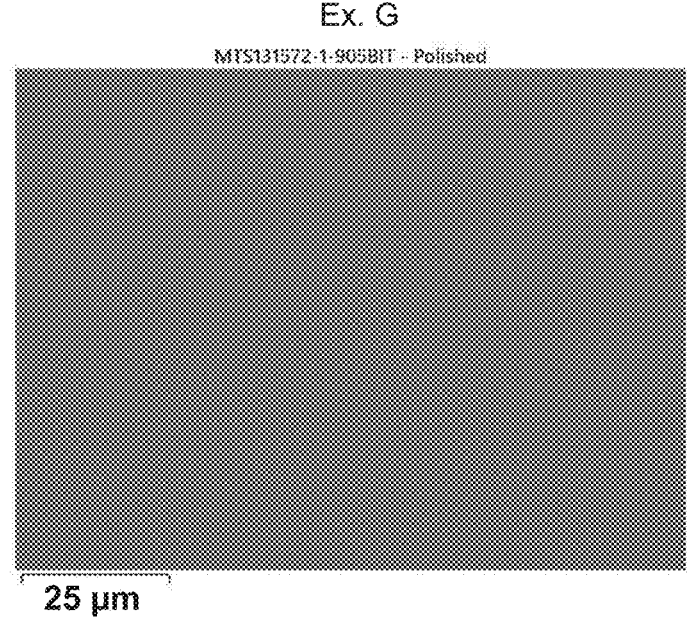
FIG. 14B is a scanning electron microscope micrograph of the sample of FIG. 14A.
Figure 14C:
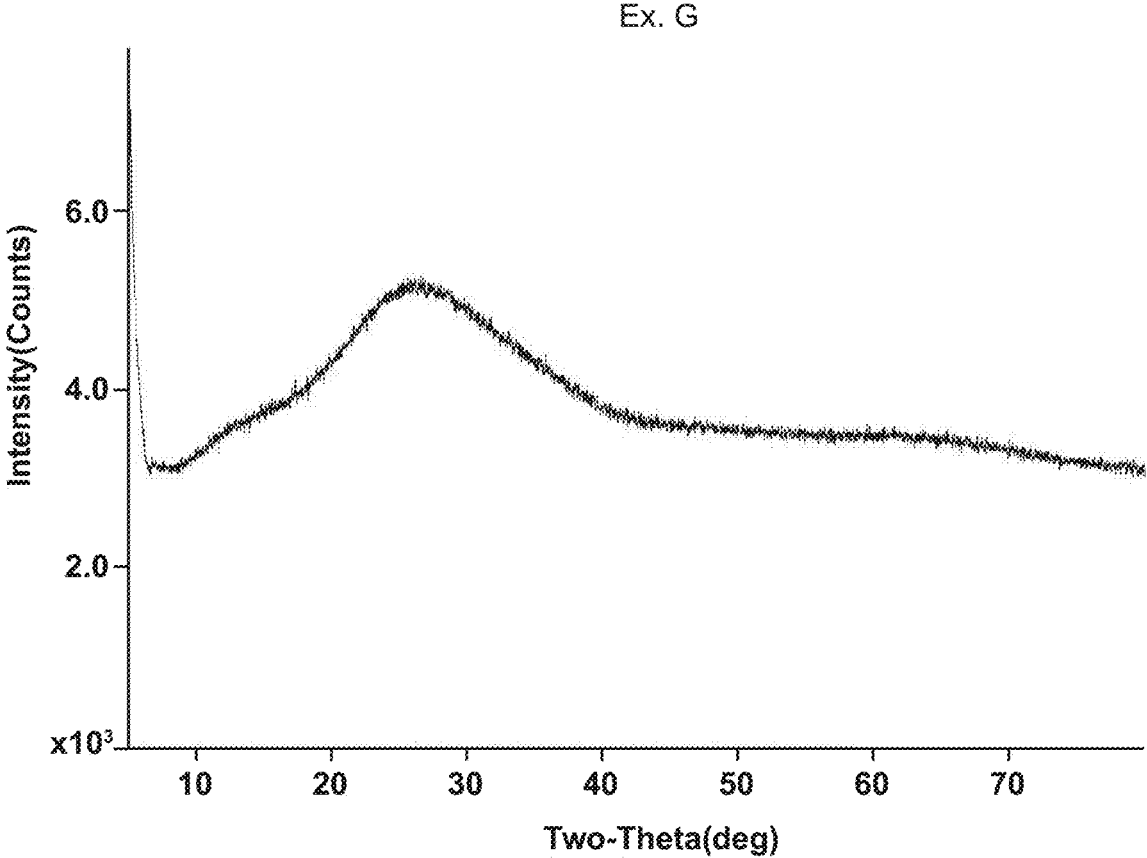
FIG. 14C is an x-ray diffraction diagram of the material of FIGS. 14A and 14B.

By contrast, FIGS. 14A, 14B, and 14C show material of Example G, which was batched as 5 mol % $Na_2O$, 45 mol % $P_2O_5$, 50 mol % CuO. The digital image of FIG. 14A shows a uniformly colored sample, such as a black sample within the CIELab color ranges disclosed above. Further, the micrograph of FIG. 14B and the x-ray diffraction information in FIG. 14C show the material of Example G can be formed as a single-phase amorphous glass.

Figure 15A:
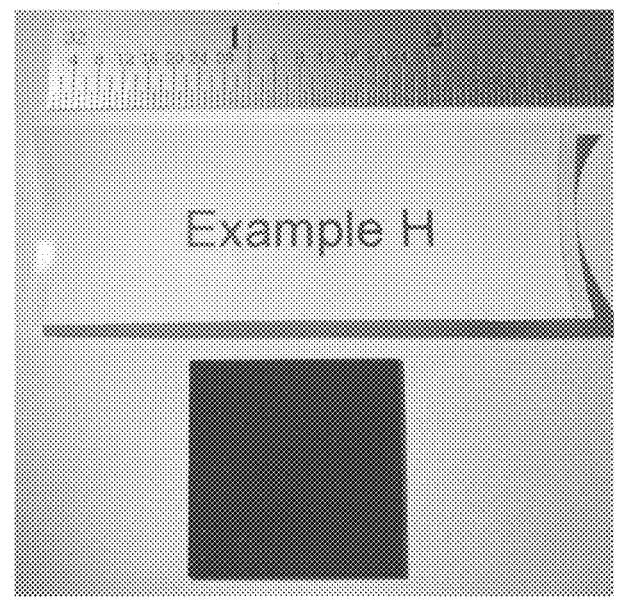
FIG. 15A is a digital image of a sample of material, corresponding to Sample H of Table 3 below, according to an exemplary aspect.
Figure 15B:
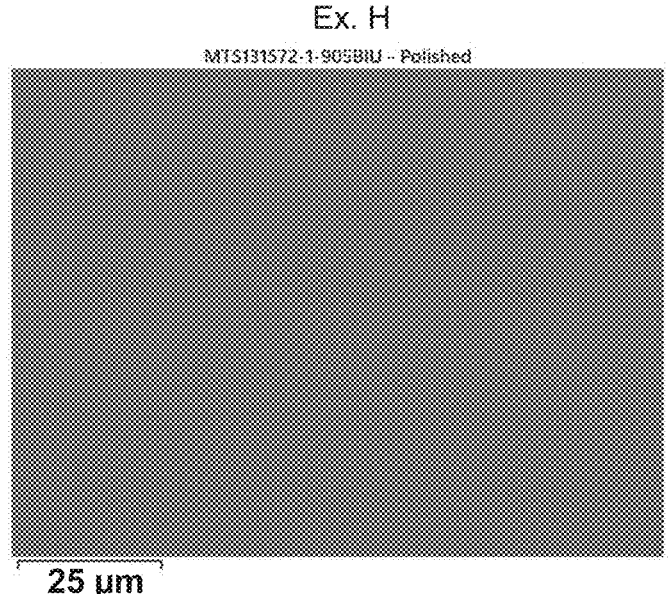
FIG. 15B is a scanning electron microscope micrograph of the sample of FIG. 15A.
Figure 15C:
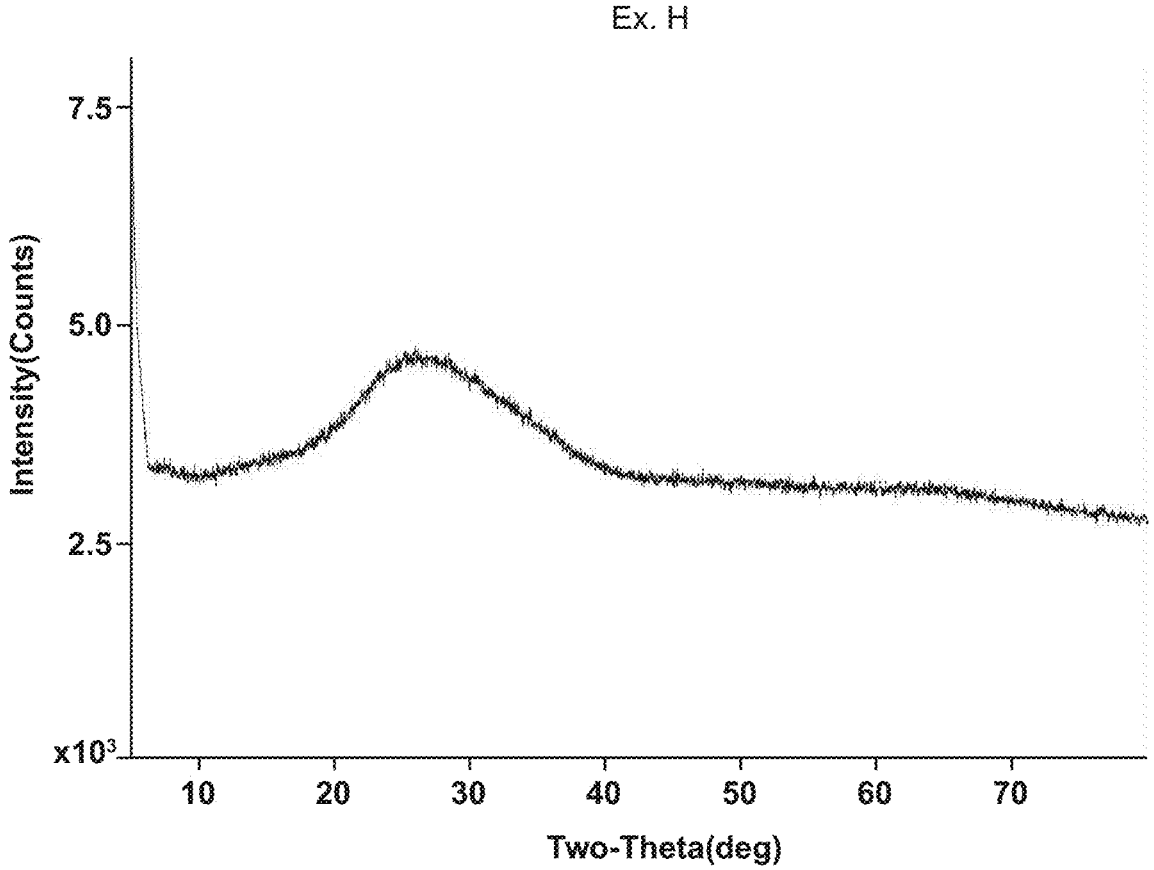
FIG. 15C is an x-ray diffraction diagram of the material of FIGS. 15A and 15B.

FIGS. 15A, 15B, and 15C show material of Example H, which was batched as 5 mol % $K_2O$, 45 mol % $P_2O_5$, 50 mol % CuO. The digital image of FIG. 15A shows a uniformly colored sample, such as a black sample within the CIELab color ranges disclosed above. Further, the micrograph of FIG. 15B and the x-ray diffraction information in FIG. 15C show the material of Example H, similar to the material of Example G, can be formed as a single-phase amorphous glass.

In embodiments, a material, such as an amorphous glass may include $P_2O_5$ in amounts as disclosed above (e.g., >30 mol %), CuO in amounts as disclosed above (e.g., >30%), and a non-zero amount of alkaline earth metal oxide and/or zinc oxide, such as at least 0.1 mol % (as-analyzed or as-batched), at least 0.2 mol %, at least 0.5 mol %, at least 1 mol %, at least 2 mol %, at least 3 mol %, at least 4 mol %, at least 4.5 mol % and/or no more than 25 mol %, such as no more than 20 mol %, no more than 15 mol %, no more than 12.5 mol %, no more than 10 mol %, no more than 8 mol %, no more than 6 mol %, or no more than 5 mol %, where the alkaline earth metal oxide may be CaO, as shown by Example C of Table 3, MgO as shown by Example A, SrO as shown by Example D, BaO as shown by Example E, ZnO as shown in Example B, or another alkaline earth metal oxide or another amount thereof (e.g., none or more than 25 mol %). In contemplated embodiments, the modifier may include more than one alkaline earth metal oxides where the sum of the alkaline earth metal oxides is in such a range.

The alkaline earth metal oxide, as evidenced by Examples A, C, D, E, and B (for zinc oxide) of Table 3, may be combined with $SiO_2$ in embodiments, or may be in materials that include MgO, ZnO, CaO, SrO, BaO, but without $SiO_2$. For example, materials as disclosed herein may include $P_2O_5$ and CuO, in amounts as disclosed above, one or more alkaline earth metal oxide constituents, such as MgO, CaO, SrO, BaO, or ZnO, in amounts as disclosed above, and $Fe_2O_3$ in ranges as disclosed above.

Figure 8A:
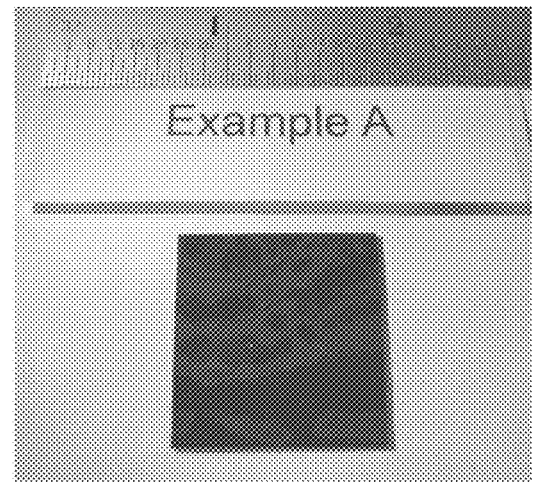
FIG. 8A is a digital image of a sample of material, corresponding to Sample A of Table 3 below, according to an exemplary aspect.
Figure 8B:
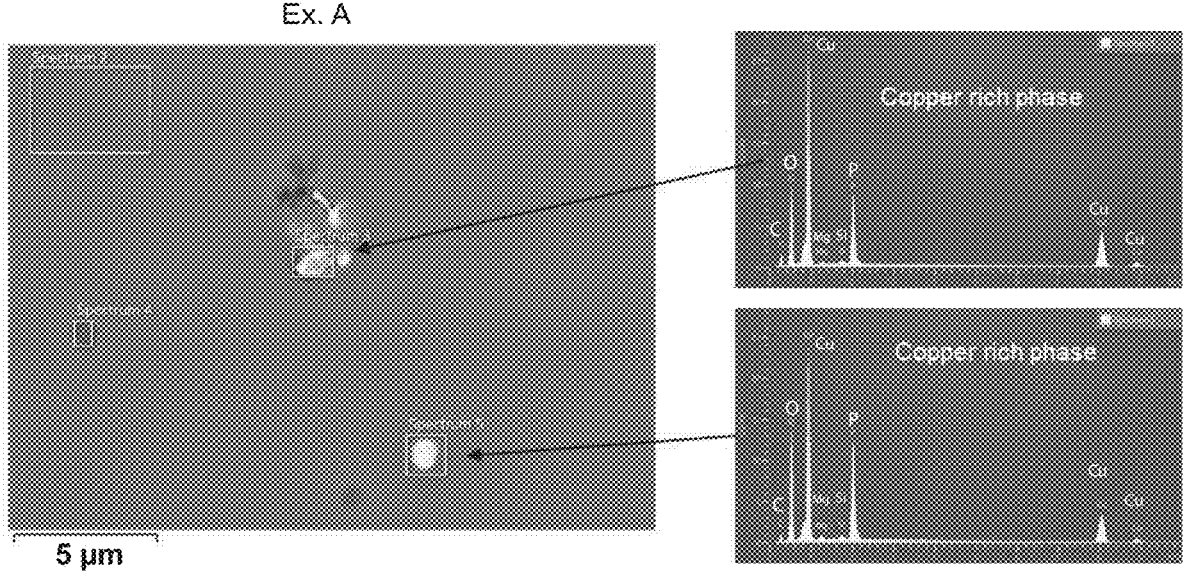
FIG. 8B is a scanning electron microscope micrograph of the sample of FIG. 8A surrounded by x-ray diffraction diagrams for locations on the image.
Figure 8C:
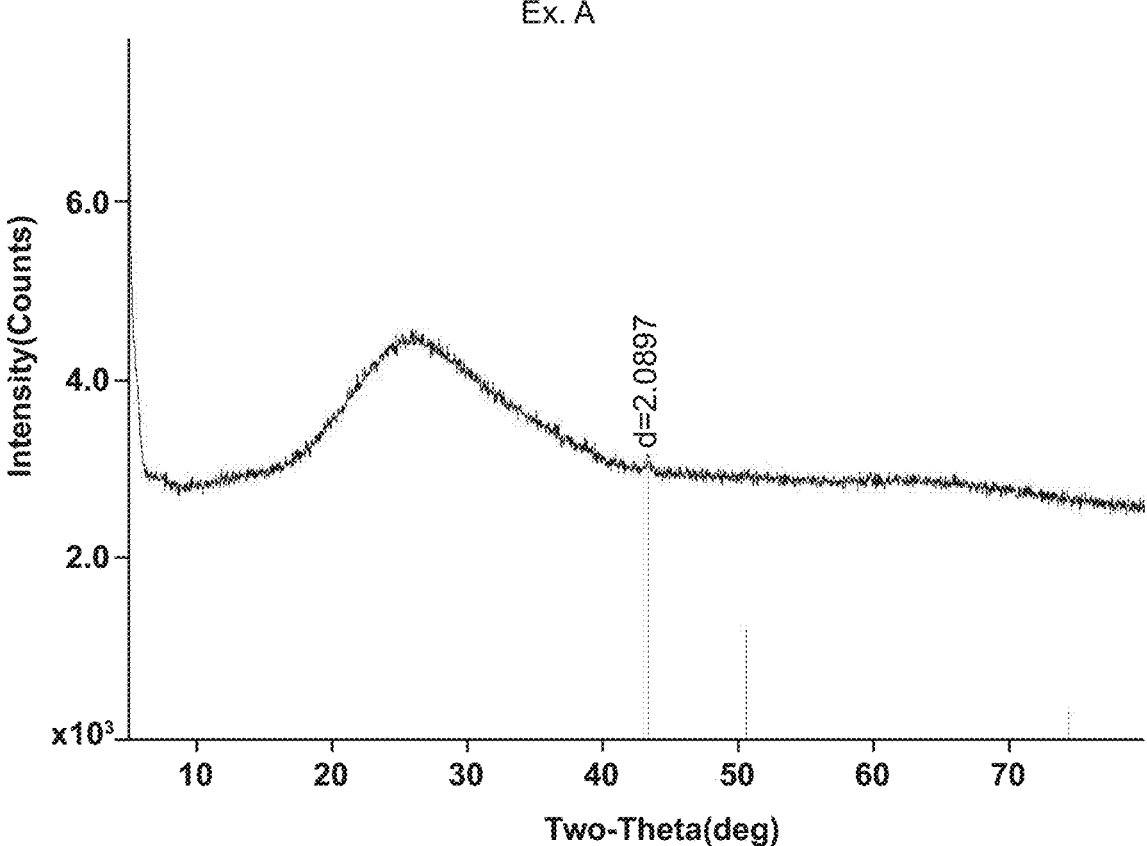
FIG. 8C is an x-ray diffraction diagram of the material of FIGS. 8A and 8B.

FIGS. 8A, 8B, and 8C, show material of Example A of Table 3, which was batched as 5 mol % MgO, 45 mol % $P_2O_5$, and 50 mol % CuO. As can be seen in the digital image of FIG. 8A, the material had a mottled coloring, such as a mix of burnt orange and black coloring. As shown in the micrograph of FIG. 8B, the material included crystals or precipitates of copper-rich phase. As shown in FIG. 8C, x-ray diffraction evidences that the material of FIG. 8A is a glass-ceramic, including crystalline and glassy phases.

Figure 9A:
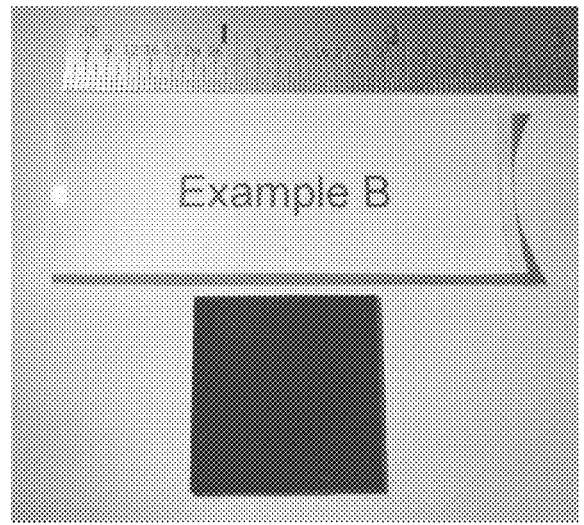
FIG. 9A is a digital image of a sample of material, corresponding to Sample B of Table 3 below, according to an exemplary aspect.
Figure 9B:
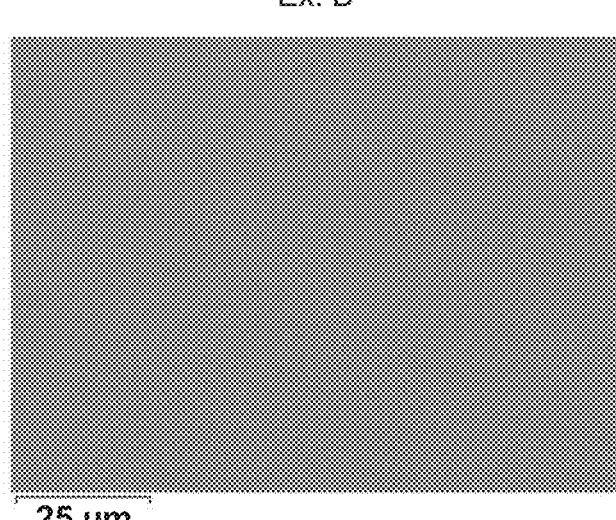
FIG. 9B is a scanning electron microscope micrograph of the sample of FIG. 9A.
Figure 9C:
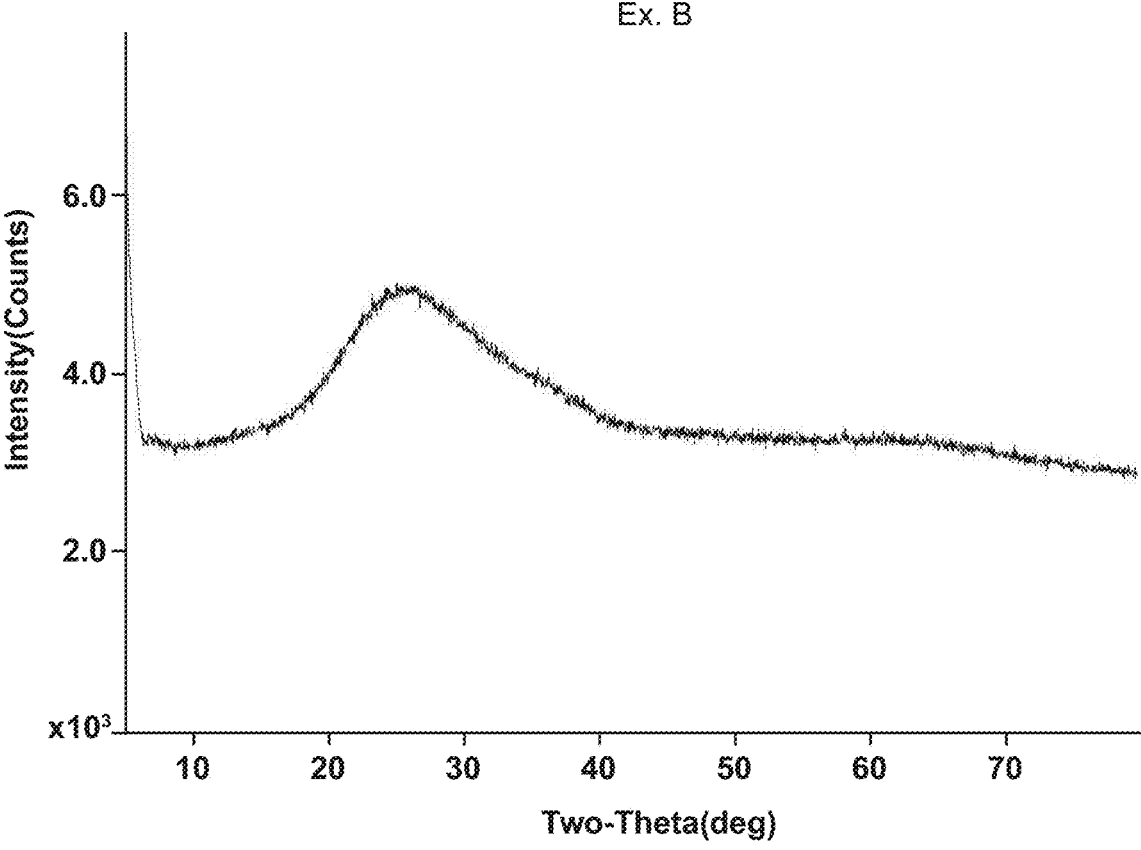
FIG. 9C is an x-ray diffraction diagram of the material of FIGS. 9A and 9B.

FIGS. 9A, 9B, and 9C show material of Example B, which was batched as 5 mol % ZnO, 45 mol % $P_2O_5$, 50 mol % CuO. The digital image of FIG. 9A shows a uniformly colored sample, such as a black sample within the CIELab color ranges disclosed above. Further, the micrograph of FIG. 9B and the x-ray diffraction information in FIG. 9C show the material of Example B can be formed as a single-phase amorphous glass.

Figure 10A:
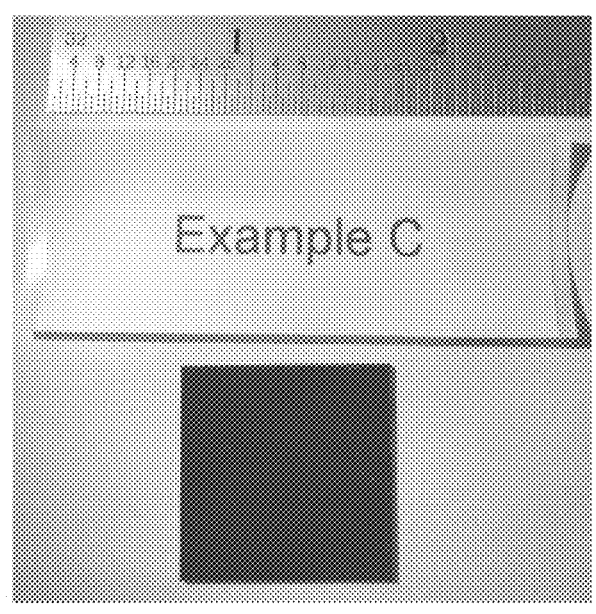
FIG. 10A is a digital image of a sample of material, corresponding to Sample C of Table 3 below, according to an exemplary aspect.
Figure 10B:
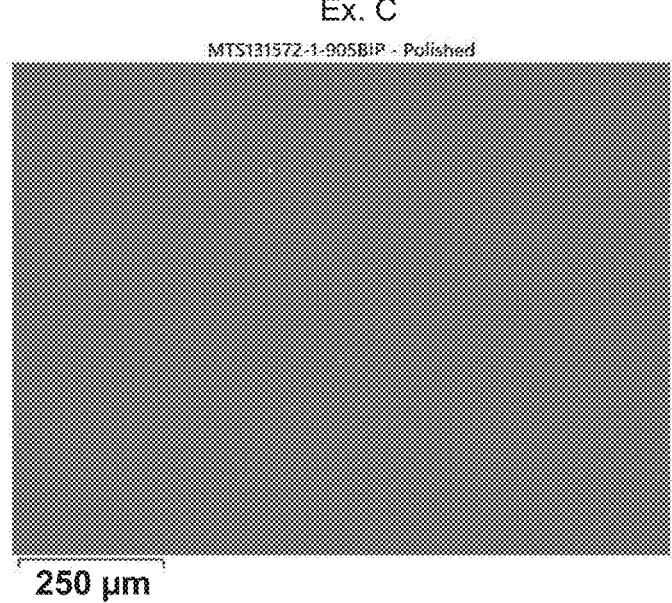
FIG. 10B is a scanning electron microscope micrograph of the sample of FIG. 10A.
Figure 10C:
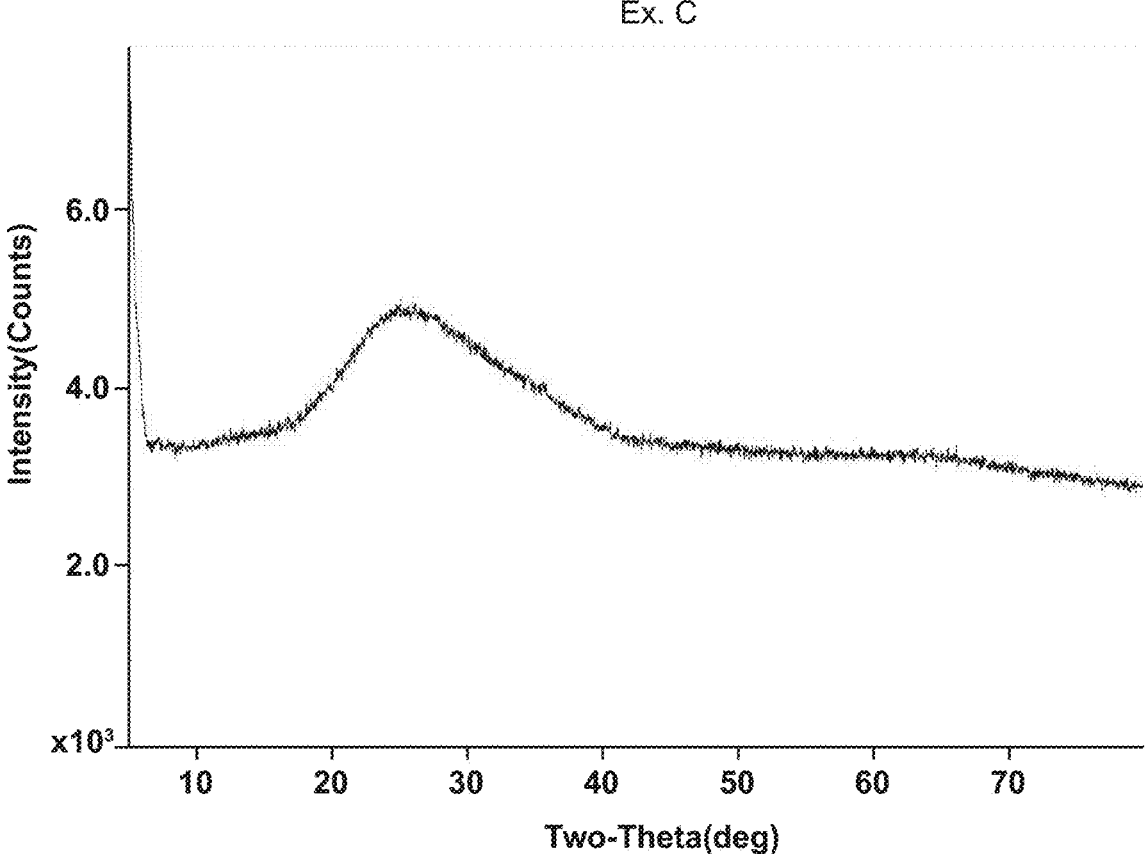
FIG. 10C is an x-ray diffraction diagram of the material of FIGS. 10A and 10B.

FIGS. 10A, 10B, and 10C show material of Example C, which was batched as 5 mol % CaO, 45 mol % $P_2O_5$, 50 mol % CuO. The digital image of FIG. 10A shows a uniformly colored sample, such as a black sample within the CIELab color ranges disclosed above. Further, the micrograph of FIG. 10B and the x-ray diffraction information in FIG. 10C show the material of Example C can be formed as a single-phase amorphous glass.

Figure 11A:
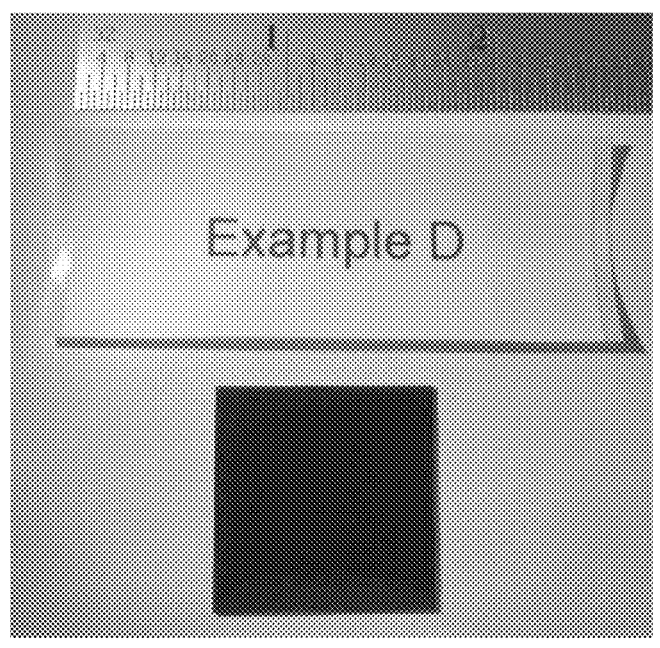
FIG. 11A is a digital image of a sample of material, corresponding to Sample D of Table 3 below, according to an exemplary aspect.
Figure 11B:
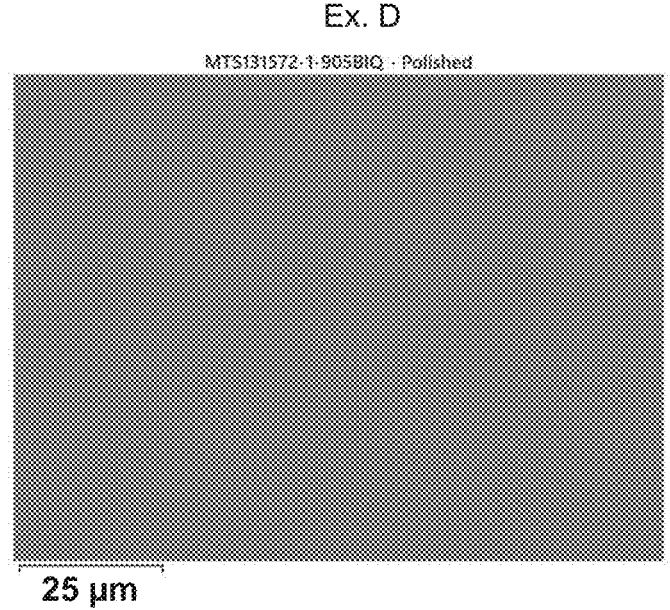
FIG. 11B is a scanning electron microscope micrograph of the sample of FIG. 11A.
Figure 11C:
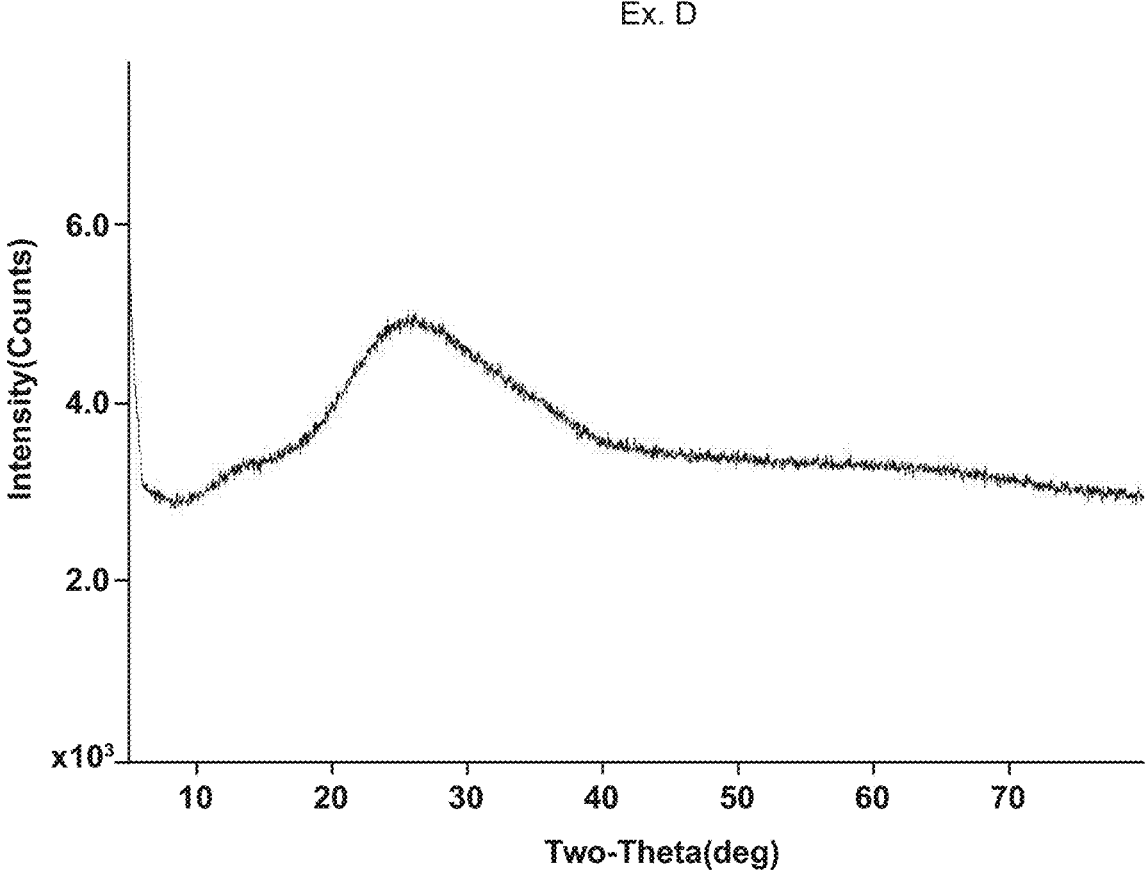
FIG. 11C is an x-ray diffraction diagram of the material of FIGS. 11A and 11B.

FIGS. 11A, 11B, and 11C show material of Example D, which was batched as 5 mol % SrO, 45 mol % $P_2O_5$, 50 mol % CuO. The digital image of FIG. 11A shows a uniformly colored sample, such as a black sample within the CIELab color ranges disclosed above. Further, the micrograph of FIG. 11B and the x-ray diffraction information in FIG. 11C show the material of Example D can be formed as a single-phase amorphous glass.

Figure 12A:
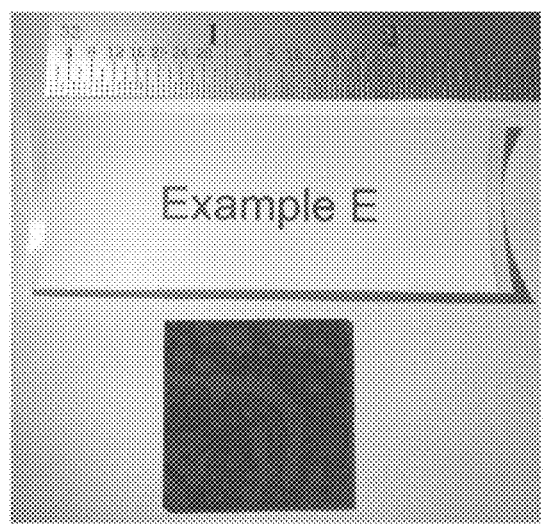
FIG. 12A is a digital image of a sample of material, corresponding to Sample E of Table 3 below, according to an exemplary aspect.
Figure 12B:
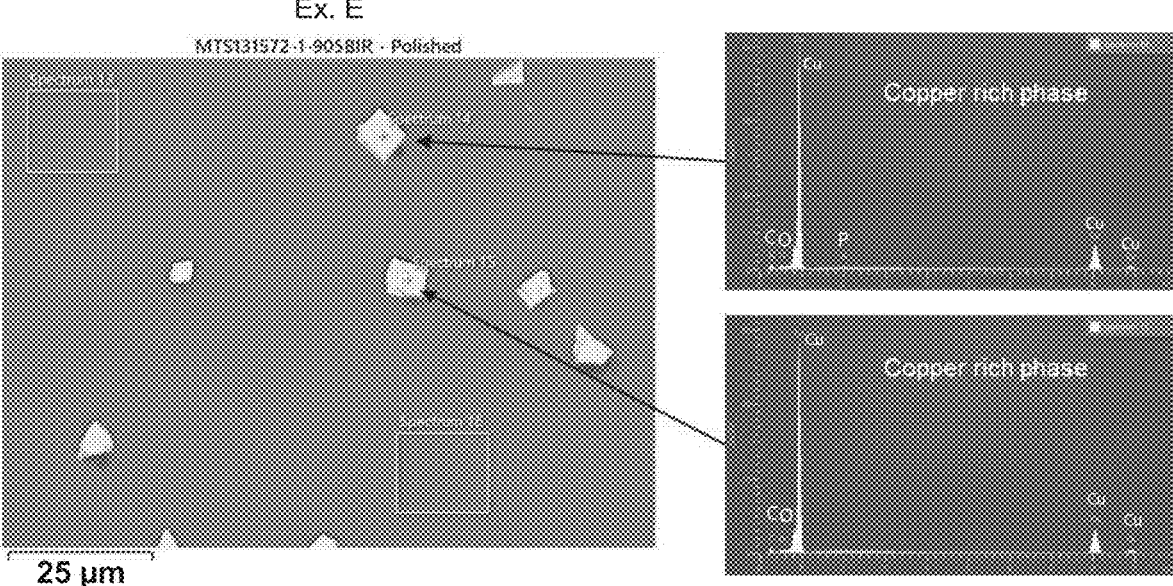
FIG. 12B is a scanning electron microscope micrograph of the sample of FIG. 12A surrounded by x-ray diffraction diagrams for locations on the image.

FIGS. 12A, 12B, and 12C, show material of Example E of Table 3, which was batched as 5 mol % BaO, 45 mol % $P_2O_5$, and 50 mol % CuO. As can be seen in the digital image of FIG. 12A, the material had a mottled coloring, such as a mix of burnt orange and black coloring. As shown in the micograph of FIG. 12B, the material included crystals or precipitates of copper-rich phase. As shown in FIG. 12C, x-ray diffraction evidences that the material of FIG. 12A is a glass-ceramic, including crystalline and glassy phases.

In embodiments, a material, such as an amorphous glass may include $P_2O_5$ in amounts as disclosed above (e.g., >30 mol %), CuO in amounts as disclosed above (e.g., >30%), and a non-zero amount of modifier oxides, such as metal oxides, such as at least 0.1 mol % (as-analyzed or as-batched) of any such oxide, at least 0.2 mol %, at least 0.5 mol %, at least 1 mol %, at least 2 mol %, at least 3 mol %, at least 4 mol %, at least 4.5 mol % and/or no more than 25 mol %, such as no more than 20 mol %, no more than 15 mol %, no more than 12.5 mol %, no more than 10 mol %, no more than 8 mol %, no more than 6 mol %, or no more than 5 mol %, such as modifier oxides may be titanium (e.g., $TiO_2$) as shown by Example I, aluminum (e.g., $Al_2O_3$, alumina) as shown by Example L, nickel (e.g., NiO) as shown by Example M, manganese (e.g., $MnO_2$) as shown by Example N, or another modifier oxide, such as another metal oxide or another amount thereof (e.g., none or more than 25 mol %). In contemplated embodiments, the composition may include more than one such oxide where the sum of the modifier oxides is in such a range.

Figure 16A:
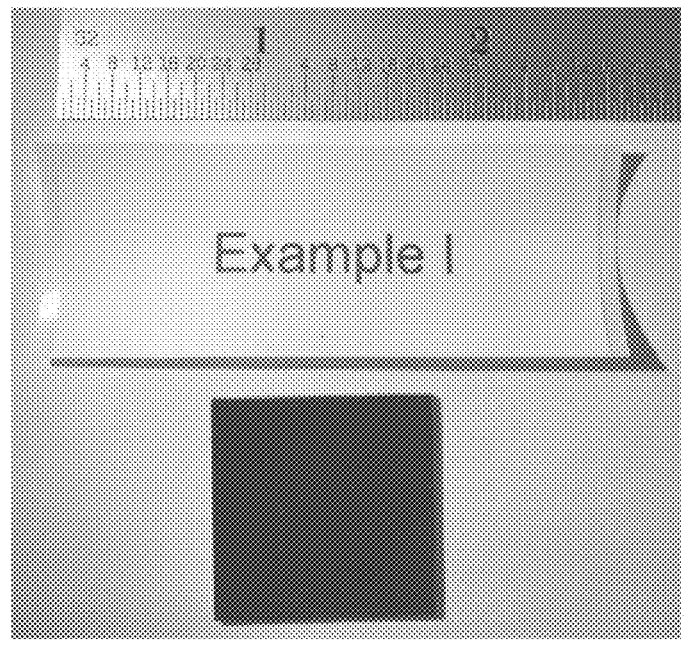
FIG. 16A is a digital image of a sample of material, corresponding to Sample I of Table 3 below, according to an exemplary aspect.
Figure 16B:
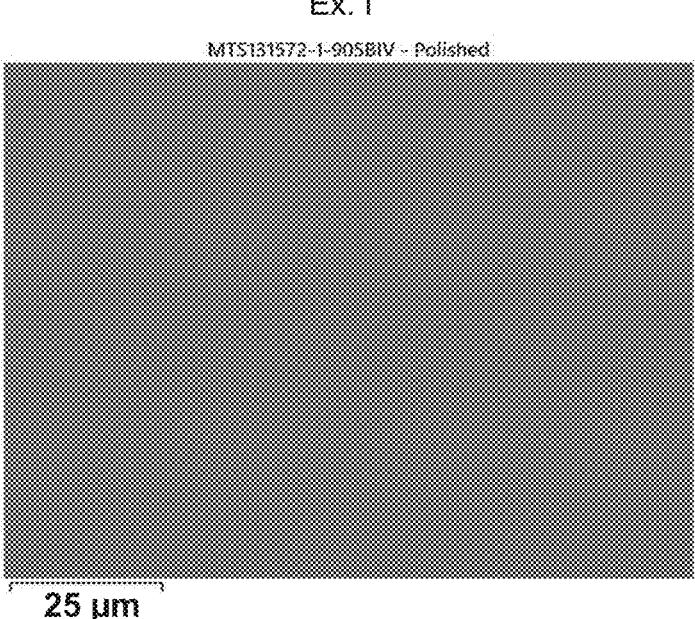
FIG. 16B is a scanning electron microscope micrograph of the sample of FIG. 16A.
Figure 16C:
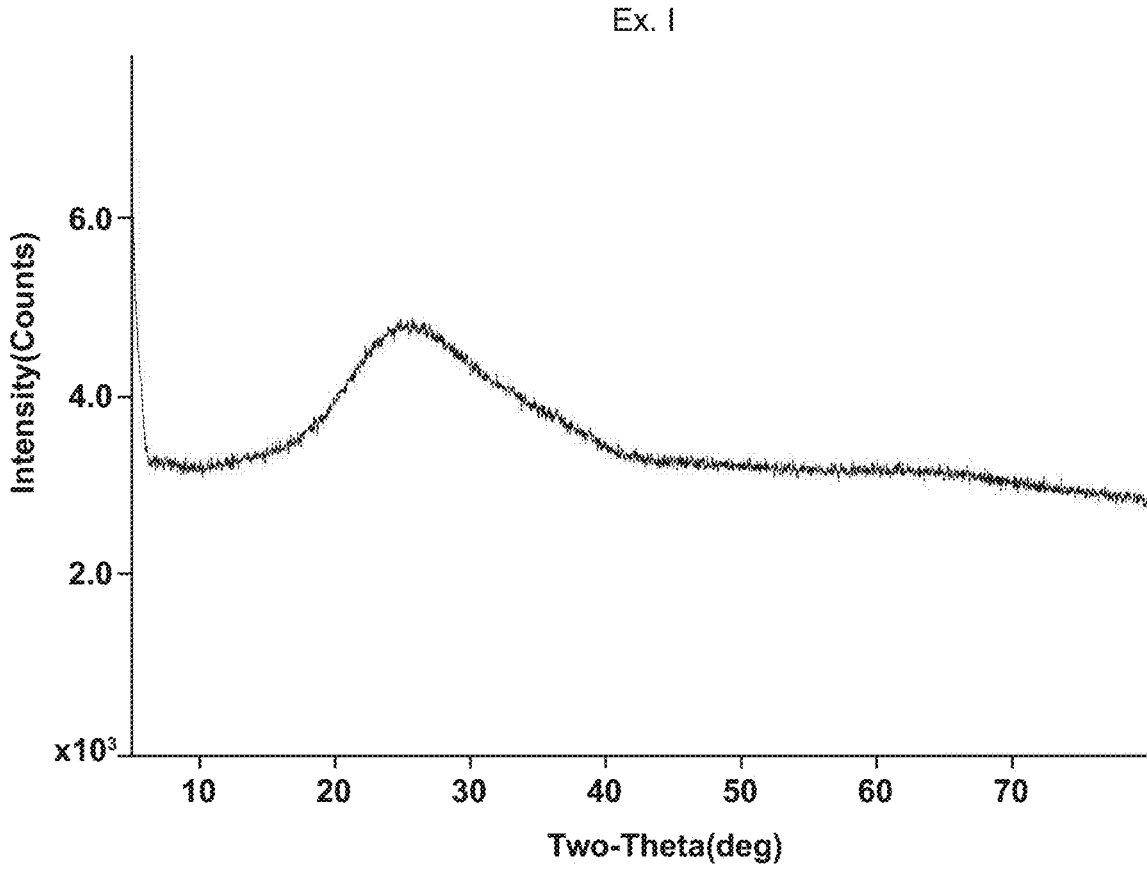
FIG. 16C is an x-ray diffraction diagram of the material of FIGS. 16A and 16B.

FIGS. 16A, 16B, and 16C show material of Example I, which was batched as 5 mol % $TiO_2$, 45 mol % $P_2O_5$, 50 mol % CuO. The digital image of FIG. 16A shows a uniformly colored sample, such as a black sample within the CIELab color ranges disclosed above. Further, the micrograph of FIG. 16B and the x-ray diffraction information in FIG. 16C show the material of Example I can be formed as a single-phase amorphous glass.

Figure 17A:
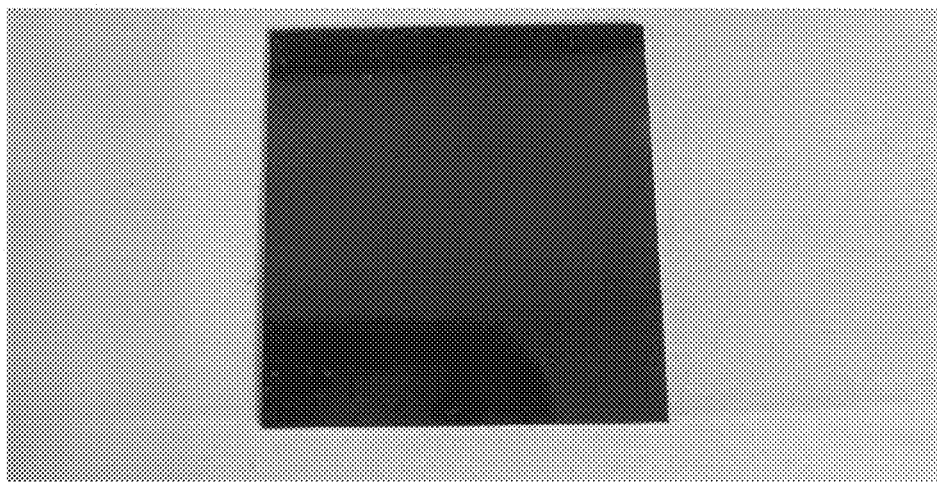
FIG. 17A is a digital image of a sample of material, corresponding to Sample L of Table 3 below, according to an exemplary aspect.
Figure 17B:
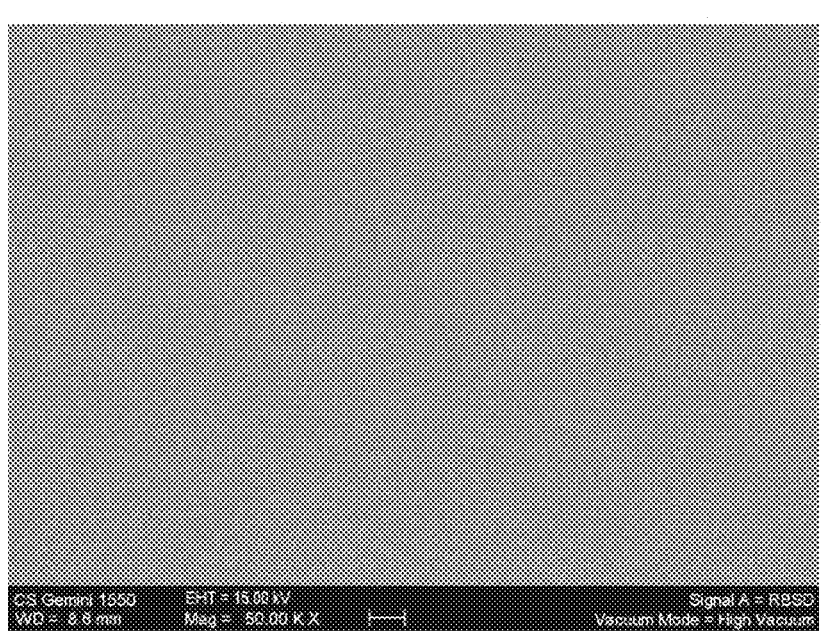
FIG. 17B is a scanning electron microscope micrograph of the sample of FIG. 17A.
Figure 17C:
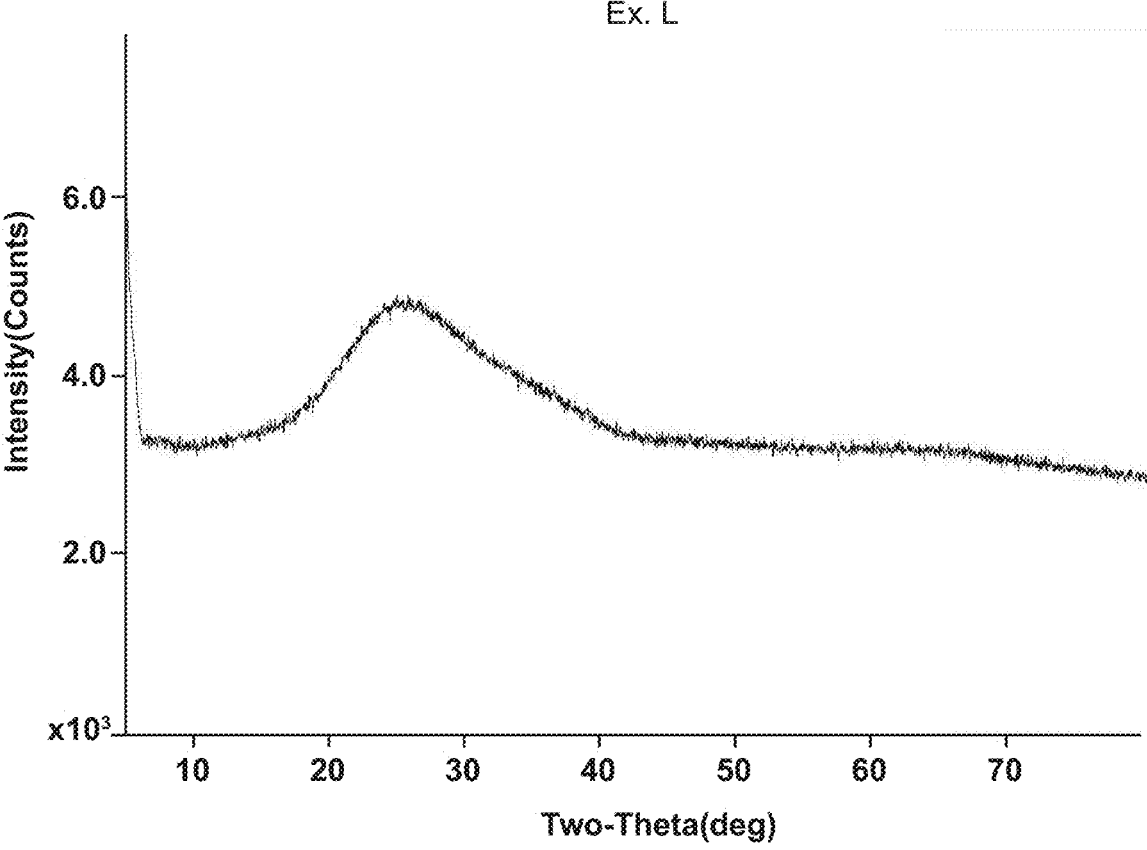
FIG. 17C is an x-ray diffraction diagram of the material of FIGS. 17A and 17B.

FIGS. 17A, 17B, and 17C show material of Example L, which was batched as 5 mol % $Al_2O_3$, 45 mol % $P_2O_5$, 50 mol % CuO. The digital image of FIG. 17A shows a uniformly colored sample, such as a black sample within the CIELab color ranges disclosed above. Further, the micro-graph of FIG. 17B and the x-ray diffraction information in FIG. 17C show the material of Example L can be formed as a single-phase amorphous glass.

Figure 18A:
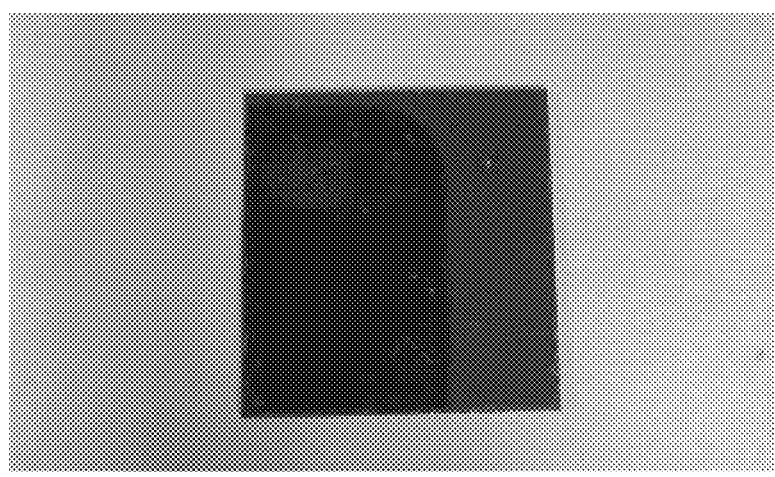
FIG. 18A is a digital image of a sample of material, corresponding to Sample M of Table 3 below, according to an exemplary aspect.
Figure 18B:
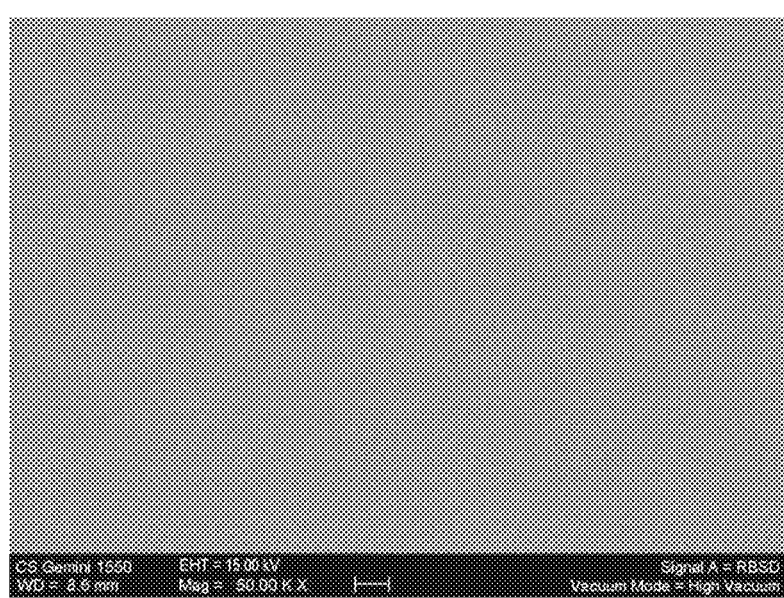
FIG. 18B is a scanning electron microscope micrograph of the sample of FIG. 18A.
Figure 18C:
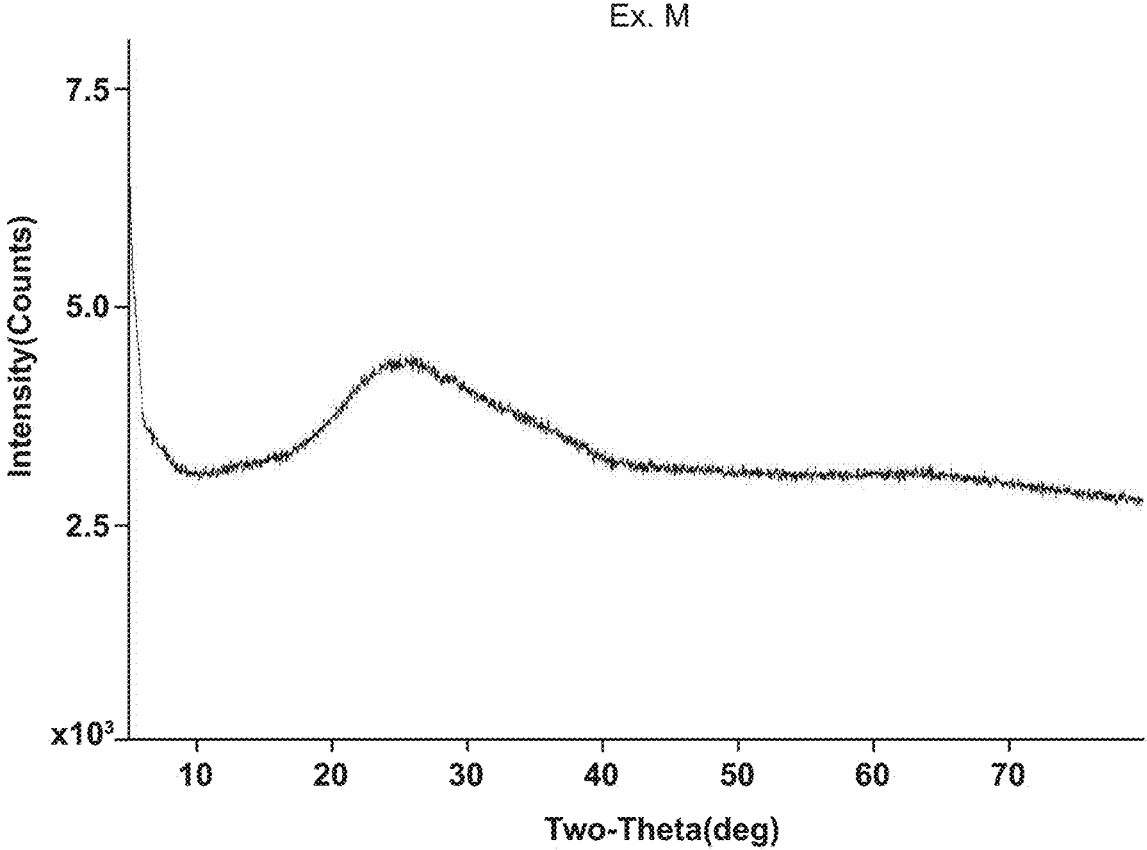
FIG. 18C is an x-ray diffraction diagram of the material of FIGS. 18A and 18B.

FIGS. 18A, 18B, and 18C show material of Example M, which was batched as 5 mol % NiO, 45 mol % $P_2O_5$, 50 mol % CuO. The digital image of FIG. 18A shows a uniformly colored sample, such as a black sample within the CIELab color ranges disclosed above. Further, the micrograph of FIG. 18B and the x-ray diffraction information in FIG. 18C show the material of Example M can be formed as a single-phase amorphous glass.

Figure 19A:
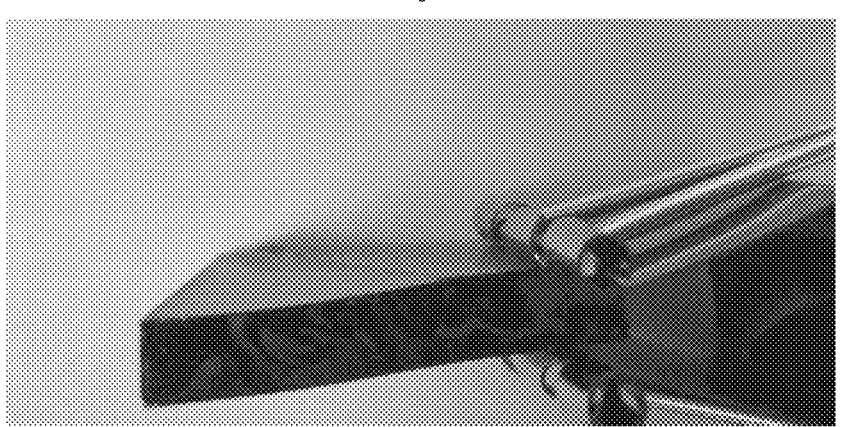
FIG. 19A is a digital image of a sample of material (fractured and supported by a clip), corresponding to Sample N of Table 3 below, according to an exemplary aspect.
Figure 19B:
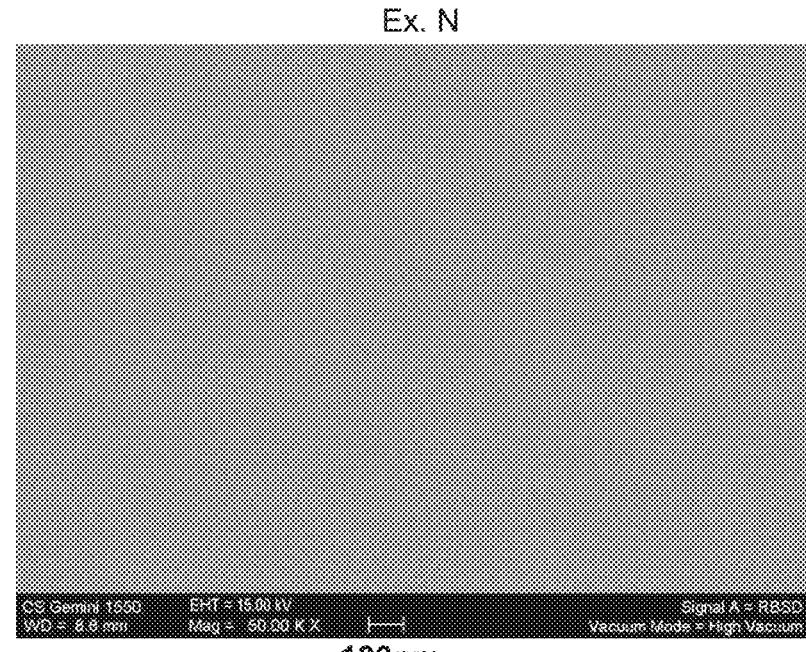
FIG. 19B is a scanning electron microscope micrograph of the sample of FIG. 19A.
Figure 19C:
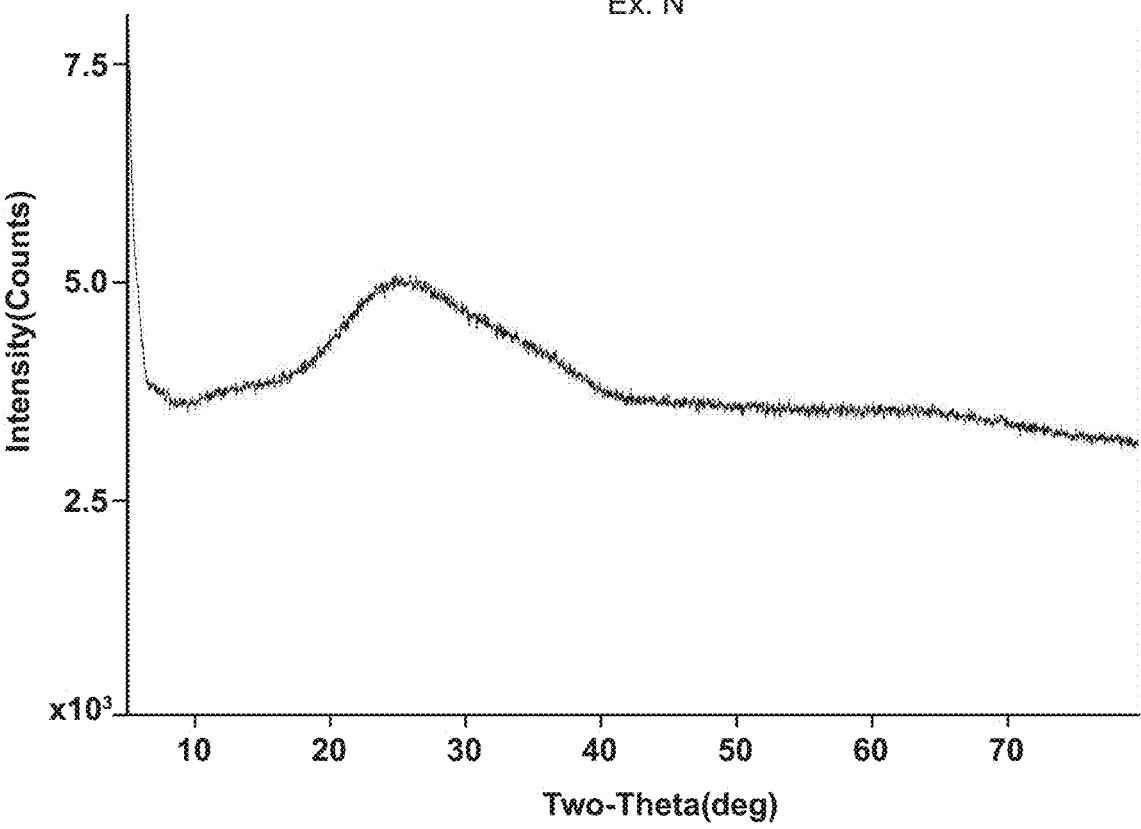
FIG. 19C is an x-ray diffraction diagram of the material of FIGS. 19A and 19B.

FIGS. 19A, 19B, and 19C show material of Example N, which was batched as 5 mol % $MnO_2$, 45 mol % $P_2O_5$, 50 mol % CuO. The digital image of FIG. 19A shows a uniformly colored sample, such as a black sample within the CIELab color ranges disclosed above. Further, the micrograph of FIG. 19B and the x-ray diffraction information in FIG. 19C show the material of Example N can be formed as a single-phase amorphous glass.

Examples I and J from Table 3 include $P_2O_5$ in amounts as disclosed above (e.g., >30 mol %) and CuO in amounts as disclosed above (e.g., >30%), but only further include silica ($SiO_2$) and not any other modifier or metal oxides. The log kill and % kill data in Table 3 shows that such materials are effective antimicrobial materials, but not as effective at killing or inhibiting microbes as other materials disclosed herein. Accordingly, in embodiments the material includes $P_2O_5$ and CuO in substantial amounts, as disclosed above, and further includes a modifier oxide other than or in addition to silica, such as a metal oxide, where that modifier oxide may be an oxide of iron, zinc, an alkaline earth metal, an alkali metal, titanium, aluminum, nickel, manganese, or other elements, oxides, or compounds, as may contribute other metals or constituents to improve the antimicrobial performance, color, strength, or other properties.

Applicants have found that certain modifiers in the composition, as disclosed herein, affect chemical dissolution behavior and staining that may be caused by normal wear (fingerprints, disinfectants, etc.) uses of the materials as cover glasses, antimicrobial plates, frit, etc., and that the compositional options disclosed herein exhibit full kill for various design needs. Further, as mentioned above, embodiments are phosphate glasses that may be formed and machined under normal atmospheric conditions, which allows for compatibility in various existing manufacturing and assembly processes.

For clarity, the copper constituent in embodiments is listed as "CuO" herein which is utilized herein as a representative or common-oxide constituent for a particular elemental component, such as, with respect to mol %, of all various oxides of copper (e.g., CuO, $CuO_2$) in materials disclosed herein, including amorphous, single-phase glass. Accordingly, any use of "CuO" herein refers to any oxide of copper, such as CuO, $CuO_2$, etc., unless specifically indicated otherwise. Similarly, oxides of iron are listed as "$Fe_2O_3$" herein by this convention, as well as other constitutes, but various oxidation states of iron may be present in the given molar percentages listed. Notably, many materials disclosed herein contain at least two multivalent elemental species, such as iron and copper, and oxidation-reduction (redox) of species may be difficult to breakdown at least because of different multivalent species. So, unless otherwise expressly specified in claims or elsewhere herein, this convention is used.

With that said, Applicants believe that a copper redox reaction may influence antimicrobial and/or antiviral effectiveness of the materials, where efficacy of copper ions decreases with increasing oxidation state such that $Cu^0$ performs better than $Cu^{1+}$ which performs better than $Cu^{2+}$. According to contemplated embodiments, at least 0.1% of copper of the material (generally listed as CuO or cupric oxide herein above) is at $Cu^{1+}$ and/or $Cu^0$ oxidation state, such as at least 1%, at least 2%, at least 4%, at least 7%, at least 10%, at least 20%, at least 30%, at least 40%, at least 50%, at least 60%, at least 70%, at least 80%, at least 90%, and/or no more than 99.999%, such as no more than 99.9%, no more than 99%, no more than 98%, no more than 95%, no more than 90%, no more than 80%, no more than 70%, no more than 60%, or no more than 50% percent of all molar copper in the material. According to contemplated embodiments, the ratio of $Cu^{+1}$ to $Cu^{+2}$ is at least 0.01, such as at least 0.02, at least 0.04, at least 0.075, at least 0.1, at least 0.15, at least 0.2, at least 0.3, at least 0.33, 0.5, 0.75, 1, 2, 5, 10, and/or no more than 200, such as no more than 100, no more than 70, no more than 20, no more than 10, no more than 6.6, no more than 5, no more than 3, no more than 2, no more than 1:1, no more than 0.9, no more than 0.7, or no more than 0.5 in contemplated embodiments. Applicants contemplate that the state of each species may be determined individually using Mossbauer spectroscopy.

Applicants have found that the process of annealing embodiments herein not only influences relaxation of internal stresses of the materials, but also internal microstructure. Annealing amorphous, single-phase glasses disclosed herein by conventional or standard annealing practices, such as returning the glasses to an oven and adding heat, and then lowering the temperature over time, may result in formation of crystals within the glass, converting the glass to a glass-ceramic. But, pre-heating a graphite mold or other receptacle with comparable thermodynamic properties and then adding newly formed amorphous or single-phase glass of the present disclosure to the receptacle (e.g., pouring in or placing on the receptacle) and allowing the glass to cool along with the pre-heated receptacle in open atmospheric conditions allows the glass to anneal, reducing residual stresses while still allowing the glass to remain amorphous and single-phase. As such, compositions disclosed herein as amorphous and single-phase, such as examples in Tables above, may also be annealed conventionally or purposely heat treated to grow a crystalline phase and convert the glass to a glass-ceramic, or may be annealed as disclosed and to be amorphous and single-phase glass, such as glass articles as disclosed.

Materials as disclosed above and further discussed below optionally balance weathering/crystallization, formability, and antimicrobial properties. These materials also balance color and microstructure of the glass. Such glass is a phosphate glass having an iron-containing oxide for durability and a copper-containing oxide for antimicrobial properties. Balancing each of these properties, the materials are advantageous for use in, for example, architectural applications that often utilize bulk materials. Such materials minimize a weathering effect on the glass article, have increased durability while allowing a release of copper to maintain antimicrobial properties, and have a black coloring.

Weathering is generally a corrosion effect on glass due to various environmental conditions. Therefore, an aspect of the compositions disclosed herein minimizes or prevents weathering to allow the glass to be used in architectural application in humid and/or hot conditions. Decreasing the weathering, therefore, results in increased longevity of the glass.

Some glass-ceramic compositions with antimicrobial properties may exhibit a burnt orange color, which can present challenges for utilizing the glass-ceramic for certain applications, such as architectural application. The orange or burnt-orange color is typically caused by cuprite crystals $(Cu^{2+})$, which give the glass-ceramic antimicrobial properties. In such circumstances, color mitigation may be achieved with additives. But, changing the color may be difficult for certain applications of the glass-ceramic that utilize bulk parts, such as many architectural applications. One aspect of glass technology disclosed herein includes a composition of $P_2O_5$, $F_2O_3$, and CuO, as batched, or $P_2O_5$, $F_2O_3$, CuO and $SiO_2$, as analyzed, and is a black (as disclosed above), single-phase glass, which has color and microstructure advantages. Accordingly, such glass disclosed herein is advantageous for architectural applications, such as push plates on doors and other high touch areas of places such as hospitals, schools, offices, etc.

Figure 20A:
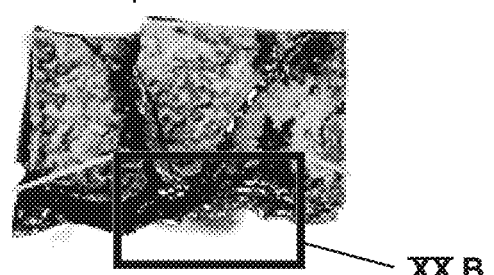
FIG. 20A is a digital image of a sample of material, corresponding to Comparative Example 1 after testing at select humidity and temperature, according to an exemplary aspect.
Figure 20B:
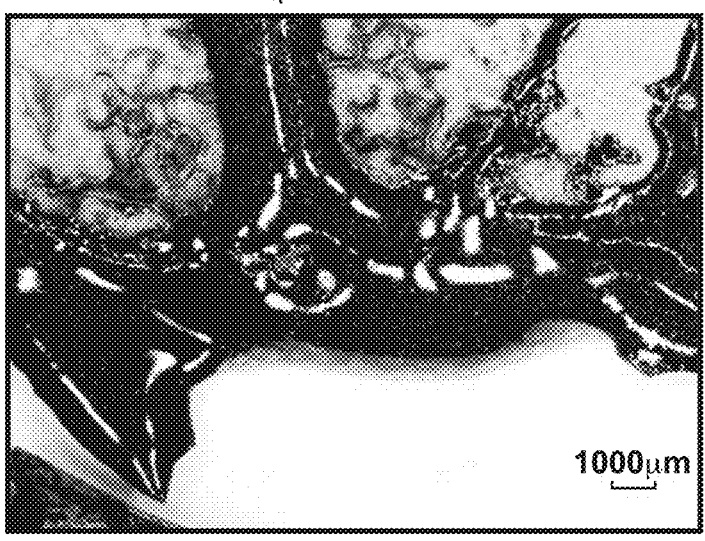
FIG. 20B is a partial enlarged view of the material of FIG. 20A.
Figure 20C:
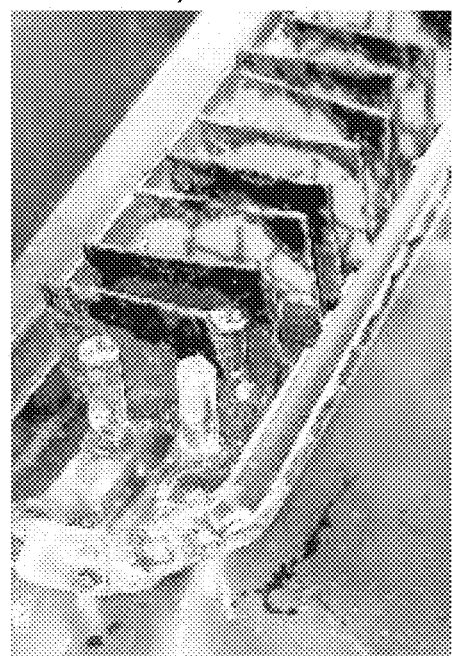
FIG. 20C is a digital image of a sample of material, corresponding to Comparative Example 2 after testing at select humidity and temperature, according to an exemplary aspect.

Referring to FIGS. 20A-20C, two Comparative Examples were tested to determine the effect of weathering on certain glass materials. Note that the examples are "comparative" with respect to other examples for particular applications or uses, but may still embody innovations disclosed herein. Each of the Comparative Example 1 and 2 included a batched composition of the BHE material, including 45 mol % $P_2O_5$, 5 mol % $Fe_2O_3$, and 50 mol % CuO. The testing to evaluate weathering of the Comparative Examples was conducted in 85% relative humidity (RH) chambers at various temperatures. Comparative Example 1 was tested at 85° C., while Comparative Example 2 was tested at 45° C. Each of Comparative Example 1 and 2 were exposed to the 85% RH and selected temperature for 24 hours.

As illustrated in FIGS. 20A and 20B, Comparative Example 1 exhibited weathering effects after testing. The glass surface crystallized or weathered and the article internally dissolved. This effect indicates a lack of durability under the testing condition.

As illustrated in FIG. 20C, Comparative Example 2 also exhibited weathering effects. The glass surface crystallized or weathered, but the glass did not internally dissolve. This effect indicates a lack of durability closer to potential real-world conditions. However, even at the lower temperature of 45° C., the glass crystallized and lacked durability. Accordingly, the Comparative Examples were less durable than desired for the hot and humid testing conditions.

Notably, as discussed above, lower durability may be a beneficial attribute in certain applications, such as to quickly dissolve glass powders in paints to provide antimicrobial performance. However, in other applications, as explained above, higher durability is an advantage. Accordingly, an ability to influence durability by changing certain constituents (e.g., iron content) is a useful aspect of the technology disclosed herein.

Utilizing this weathering test information from the Comparative Examples, glass compositions with greater durability were developed. To minimize or prevent the weathering that occurred in the Comparative Examples, the glass composition was changed to a higher durability composition utilizing the iron-containing oxide, such as $Fe_2O_3$. Put another way, Applicants found increased durability accomplished by increasing the $Fe_2O_3$ content. Adding $Fe_2O_3$ increased durability of the glasses such that the surface crystallization and weathering was reduced or prevented.

However, Applicants discovered that while increase in $Fe_2O_3$ increased durability of the glass composition, adding too much $Fe_2O_3$ decreased the antimicrobial properties of the glass composition. Applicants believe too much $Fe_2O_3$ creates glass that is too durable and does not release enough copper to be effective as an antimicrobial glass. For example, it was found that too much $Fe_2O_3$ may result in devitrification upon pouring of mixed molten glass, during manufacturing. For high phosphorus- and copper-oxides batch compositions (e.g., >40 mol % of each), as disclosed above, Applicants discovered a concentration of $Fe_2O_3$ greater than 12 mol % began to devitrify and a concentration greater than 15 mol % were mainly crystalline. As further discussed below, processing steps may be used with such glasses to control or limit crystal growth. Accordingly, the $Fe_2O_3$ concentration was increased enough to increase durability but maintained less than 15 mol % or less than 12 mol % to prevent the crystallization and/or devitrification for such applications benefitting from amorphous, antimicrobial glass of black color able to withstand use in open atmosphere without excessive weathering.

Certain higher durability compositions are illustrated in Table 5 below.

tion of CuO) to facilitate antimicrobial properties. The copper ions (e.g., $Cu^+$ and/or $Cu^{2+}$) may be released within the glass to provide the antimicrobial properties listed in Table 5. Applicants believe that the amorphous structure of the glass may be advantageous for allowing release of the copper. As batched and as analyzed, the composition includes a concentration of CuO greater than 15 mol %, greater than 30 mol %, greater than 40 mol %, greater than 45 mol %, or greater than 50 mol %; and/or no more than 80 mol %, such as no more than 60 mol %, such as no more than 50 mol %. In certain aspects, the concentration of CuO is from 42 mol % to 48 mol %.

In various examples, the glass composition primarily includes monovalent copper ($Cu^+$ or $Cu^{1+}$). The monovalent

TABLE 5

|  | BMS1 | BMS2 | BLF | BLN | BLT |
|---|---|---|---|---|---|
| Batched mol % |  |  |  |  |  |
| $P_2O_5$ | 45 | 45 | 45 | 45 | 47 |
| $Fe_2O_3$ | 11 | 11 | 10 | 12 | 10 |
| CuO | 44 | 44 | 45 | 43 | 43 |
| Analyzed (mol %) |  |  |  |  |  |
| $P_2O_5$ | 44.7 | 42.3 | 43.8 | 44.2 | 46.1 |
| $Fe_2O_3$ | 9.4 | 9.5 | 8.6 | 10.3 | 8.5 |
| CuO | 44.9 | 45.2 | 46.5 | 43.6 | 43.6 |
| $SiO_2$ | 1.0 | 3.0 | 1.1 | 1.9 | 1.7 |
| Log Kill | 3.5 | 5.4 | 4.49 | 3.52 | 4.51 |
| StDev | 0.0 | 0.0 | 0.2 | 0.08 | 0.34 |
| Durability in 85% RH |  |  |  |  |  |
| Temperature (° C.) | 45 | — | 45 | 45 | 45 |
| Time (h) | 144 | — | 144 | 144 | 144 |
| Sample type | ground & polished | — | ground & polished | as poured surface | as poured surface |
| Appearance | slight degradation | — | slight degradation | slight degradation | slight degradation |

The BMS1 and BLF samples were poured, ground, and polished into coupons that were generally 25 mm by 25 mm and 1 mm thick. The coupons were then weather tested. The BLN and BLT samples were poured into molds and then broken into pieces. The pieces were not polished or machined prior to being tested. The examples listed in Table 5 were tested in 85% RH at 45° C. for 144 hours.

As indicated in Table 5 above, the glass compositions, as batched, included $P_2O_5$, CuO, and $Fe_2O_3$. The glass compositions are phosphate glasses that utilize the copper-containing oxide(s), "CuO," to provide anti-microbial properties and the iron-containing oxide(s), "$Fe_2O_3$," to increase durability. As analyzed, each of the examples includes $P_2O_5$, CuO, $Fe_2O_3$, and $SiO_2$. The $SiO_2$ may be optionally incorporated, for example, to reduce costs and/or due to contamination during melting in a quartz crucible. Different processing equipment (e.g., platinum-lined) may be used to prevent contamination.

Each of the examples in Table 5 are phosphate glasses and therefore have a greater amount of $P_2O_5$ than $SiO_2$. The glass may include a concentration of $P_2O_5$ greater than 15 mol %, greater than 30 mol %, greater than 40 mol %, greater than 45 mol %, or greater than 50 mol % as batched and/or as analyzed; and/or no more than 80 mol %, such as no more than 60 mol %, such as no more than 50 mol %. In certain aspects, the concentration of $P_2O_5$ is from 45 mol % to 47 mol %, as batched and/or as analyzed.

Additionally, the examples of Table 5 include CuO (oxides of copper in amounts with equivalent copper contribucopper, compared to bivalent copper ($Cu^{2+}$), is generally more mobile within the glass article, which allows the copper to move to the surface of the glass article more easily to provide the antimicrobial properties. In comparison, bivalent copper may not be as freely movable within the glass and therefore glass with bivalent copper may exhibit less antimicrobial efficacy. Applicants have found antimicrobial efficacy of Cu ions decreases with efficacy, such that $Cu^0 > Cu^{1+} > Cu^{2+}$. Accordingly, when used for applications benefiting from antimicrobial performance, the glass includes a greater amount of monovalent copper than bivalent copper, or more preferably, the glass includes primarily (e.g., >80% of the copper, >90%, >95%) monovalent copper.

Applicants have discovered that the temperature at which the batch materials or constituents are melted may contribute to the amount of monovalent copper in the glass. For example, Applicants believe a higher temperature, such as melting the batch constituents at 1350° C., leads to a more reducing environment, which results in more copper being reduced to the monovalent state. When the glass is melted at lower temperatures, for example at 900° C., less copper is reduced to the monovalent state, which can cause the antimicrobial efficacy of the glass to be reduced. However, if a quartz crucible is used for melting the batch materials, higher temperature may result in more $SiO_2$ contamination. Therefore, melting at an intermediate temperature, such as between 1050° C. and 1150° C. may be advantageous for reducing copper to the monovalent state while having a lesser effect on the quartz crucible, if such a crucible is used. Without using quartz, innovative methods of producing the materials include heating the copper to a temperature of at least 1050° C., such as at least 1150° C., 1350° C. during melting of the constituents.

Further, glass compositions from Table 5 include "$Fe_2O_3$" (oxides of iron in amounts with equivalent iron contribution of $Fe_2O_3$), which may increase durability of the glass composition, as discussed. $Fe_2O_3$ concentration for such aspects is less than 20 mol %, less than 15 mol %, or less than 10 mol %, as batched and/or as analyzed; and/or at least 3 mol %, at least 5 mol %, at least 7 mol %, at least 8 mol %. In certain aspects, the concentration of $Fe_2O_3$ is from 7 mol % to 12 mol %, as batched and/or as analyzed. The amount of $Fe_2O_3$ facilitates the durability and the antimicrobial properties of the glass composition. For example, samples with concentration greater than 15 mol % led to crystallization, and those with concentration greater than 12 mol % led to devitrification as disclosed above. But when the $Fe_2O_3$ concentration is too high, not enough copper is released to be effective as antimicrobial glass.

Glass structure may influence the chemical durability, and greater chemical durability results in lower antimicrobial efficacy through less release of copper in certain applications. The increase in iron appears to be related (e.g., generally proportional, directly proportional) to resistance to weathering. The iron creates a stronger, more chemically resistant bond. Applicants believe P—Fe—O bonds may be more resistant to weathering than P—O—P bonds alone. An aspect of the innovation includes P—O—P bonds in the material replaced with P—O—Fe(II) and P—O—Fe(III) bonds to increase the chemical durability. The glass article may include a combination of $Fe^{2+}$ ions and $Fe^{3+}$ ions to form the desired bonds. In certain aspects, the primary iron ion(s) in the glass article are $Fe^{2+}$, $Fe^{3+}$, or a combination thereof. The composition of the glass article may optionally include more $Fe^{3+}$ ions than $Fe^{2+}$ ions.

Composition of the glass article may well include two multivalent species (e.g., Fe and Cu), which are balanced with one another to provide durability and antimicrobial efficacy. Applicants discovered a relationship between copper and iron content, where iron content is enough for toughness but low enough to release Cu for antimicrobial purposes, and accordingly various aspects include coordinating the amounts of copper and iron constituents. For example, in certain aspects, the glass composition as-batched and/or as analyzed includes the ranges disclosed above, but more specifically with $Fe_2O_3$>7.5 mol % and CuO<47.5 mol %. In another such non-limiting example, the glass composition as-batched and/or as-analyzed includes $Fe_2O_3$>8 mol % and CuO<48 mol %. The balance between the iron ions and the copper ions provides the desired combination of durability and antimicrobial properties.

Figure 21A:
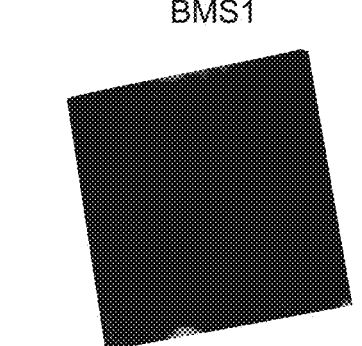
FIG. 21A is a digital image of a coupon of a sample material after being subject to select humidity and temperature, according to an exemplary aspect.
Figure 21B:
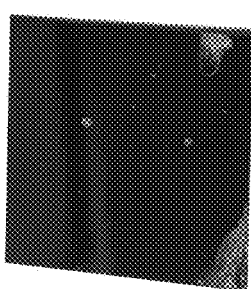
FIG. 21B is a digital image of a coupon of a sample material after being subject to select humidity and temperature, according to an exemplary aspect.

Referring to FIGS. 21A and 21B, samples of the BMS1 example from Table 5 are illustrated after testing at 85% RH at 45° C. for 144 hours. The BMS1 was batched at 45 mol % $P_2O_5$, 11 mol % $Fe_2O_3$, and 44 mol % CuO. As analyzed, BMS1 included 44.7 mol % $P_2O_5$, 9.4 mol % $Fe_2O_3$, 44.9 mol % CuO, and 1.0 mol % $SiO_2$. The $SiO_2$ was likely as result of contamination. The graphic images of FIGS. 21A and 21B show the coloring and degradation of the BMS1 example after testing. The BMS1 example showed slight degradation in appearance, which generally refers to the discoloration. In FIG. 21A, the BMS1 coupon showed discoloration, which was generally grey, along a bottom edge and a top edge. In FIG. 21B, the BMS1 coupon shows the grey discoloration along a bottom right corner, a top right corner, and several dots or areas within the middle of the coupon. Further, the BMS1 sample displayed a log kill of 3.5.

The BMS2 sample was batched at 45 mol % $P_2O_5$, 11 mol % $Fe_2O_3$, and 44 mol % CuO. As analyzed, BMS2 included 42.3 mol % $P_2O_5$, 9.5 mol % $Fe_2O_3$, 45.2 mol % CuO, and 3.0 mol % $SiO_2$. The $SiO_2$ was likely a result of contamination. Compared to the BMS1 example, the BMS2 example includes a greater amount (in mol %) of CuO and $SiO_2$. Notably, the BMS2 sample also displayed a greater log kill than BMS1, exhibiting a log kill of 5.4. The greater log kill, without being bound by theory, was likely a result of the increased CuO compared to BMS1. The BMS2 sample was not tested for durability, but without being bound by theory, would likely have similar durability as the BMS1 sample.

Figure 22A:
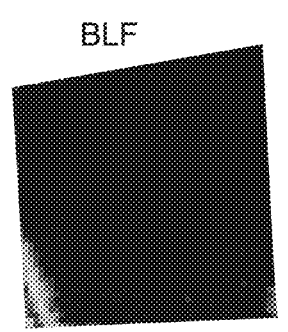
FIG. 22A is a digital image of a coupon of a sample material after being subject to select humidity and temperature, according to an exemplary aspect.
Figure 22B:
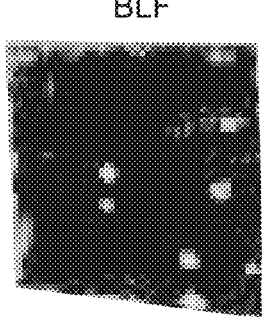
FIG. 22B is a digital image of a coupon of a sample material after being subject to select humidity and temperature, according to an exemplary aspect.

Referring to FIGS. 22A and 22B, samples of the BLF example from Table 5 after testing are illustrated. As batched, the BLF sample included 45 mol % $P_2O_5$, 10 mol % $Fe_2O_3$, and 45 mol % CuO. An analyzed, the BLF sample included 43.8 mol % $P_2O_5$, 8.6 mol % $Fe_2O_3$, 46.5 mol % CuO, and 1.1 mol % $SiO_2$. The $SiO_2$ was likely as result of contamination from the quartz crucible in which the batch materials were melted. The BLF example exhibited a log kill of 4.49. As illustrated in FIGS. 22A and 22B, the BLF example showed slight degradation in appearance after testing, which generally refers to the discoloration. In FIG. 22A, the coupon of BLF material had discoloration, which was generally grey in color, along a bottom left corner and, to a lesser extent, along a bottom right corner. In FIG. 22B, the BLF coupon had the grey discoloration along a top and left edge and in spots or areas in the middle.

Figure 23A:
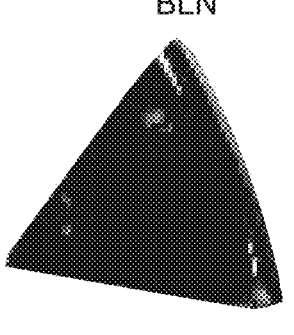
FIG. 23A is a digital image of a sample material as poured after being subject to select humidity and temperature, according to an exemplary aspect.
Figure 23B:
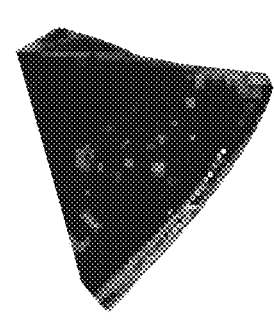
FIG. 23B is a digital image of a sample material as poured after being subject to select humidity and temperature, according to an exemplary aspect.

Referring to FIGS. 23A and 23B, samples of the BLN example from Table 5 after testing are illustrated. As batched, the BLN sample included 45 mol % $P_2O_5$, 12 mol % $Fe_2O_3$, and 43 mol % CuO. An analyzed, the BLN sample included 44.2 mol % $P_2O_5$, 10.3 mol % $Fe_2O_3$, 43.6 mol % CuO, and 1.9 mol % $SiO_2$. The $SiO_2$ was likely as result of contamination from the quartz crucible in which the batch materials were melted. The BLN example exhibited a log kill of 3.52. As illustrated in FIGS. 23A and 23B, the BLN example showed slight degradation in appearance after testing, which generally refers to a discoloration. The discoloration was brown in color. As illustrated in FIG. 23A, the poured piece of the BLN sample included discoloration proximate to each corner. In FIG. 23B, the poured piece of the BLN sample had discoloration along one edge.

Figure 24A:
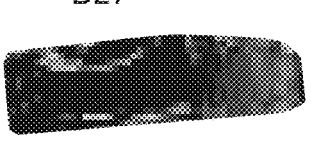
FIG. 24A is a digital image of a sample material as poured after being subject to select humidity and temperature, according to an exemplary aspect.
Figure 24B:
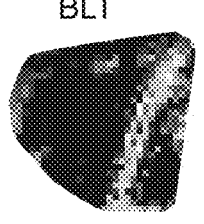
FIG. 24B is a digital image of a sample material as poured after being subject to select humidity and temperature, according to an exemplary aspect.

Referring to FIGS. 24A and 24B, samples of the BLT example from Table 5 after testing are illustrated. As batched, the BLT sample included 47 mol % $P_2O_5$, 10 mol % $Fe_2O_3$, and 43 mol % CuO. An analyzed, the BLT sample included 46.1 mol % $P_2O_5$, 8.5 mol % $Fe_2O_3$, 43.6 mol % CuO, and 1.7 mol % $SiO_2$. The $SiO_2$ was likely as result of contamination from the quartz crucible in which the batch materials were melted. The BLT example exhibited a log kill of 4.51. As illustrated in FIGS. 24A and 24B, the BLT example showed slight degradation in appearance after testing. As illustrated in FIG. 24A, the poured piece of the BLT sample included discoloration along opposing edges. In FIG. 24B, the poured piece of the BLN sample had discoloration along at least one edge.

Each of the samples BMS1, BLF, BLN, and BLT showed slight degradation in appearance or discoloration after testing at 85% RH at 45° C. for 144 hours. The tested glass samples exhibited high durability under aggressive testing circumstances. The glass compositions balanced the $Fe_2O_3$ to increase durability of the composition, while allowing the release of copper to provide the log kill values set forth in Table 5. Additionally, each of the samples listed in Table 5 had log kill performance of at least 3, such as greater than 3 or greater than 3.2. Log kill values of Table 5 correspond to the EPA characterization disclosed above. Moreover, each of the examples illustrated in FIGS. 21A-24B was black in color. Without being bound by theory, the samples in Table 5 may have CIELAB values similar to those listed in Table 1A.

Figure 25:
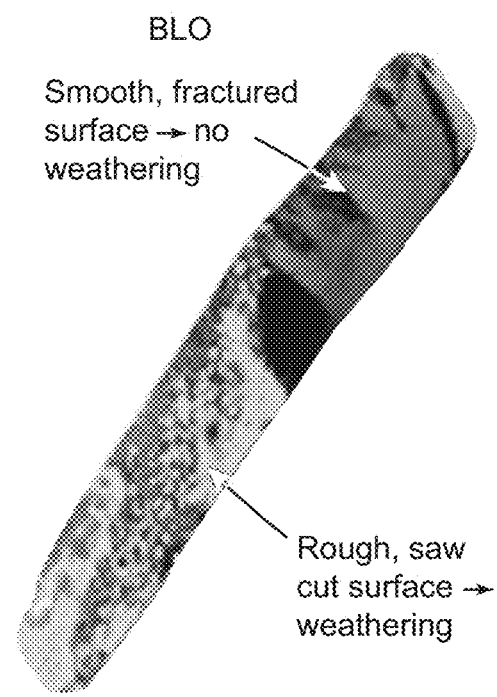
FIG. 25 is a digital image of a sample of material with one portion having a rough surface and a second portion having a smooth, fractured surface after testing at select humidity and temperature, according to an exemplary aspect.

Further, in addition to composition, it was found that the surface roughness of the glass article that is exposed to high humidity and high temperature affects the surface crystallization and weathering. As illustrated in FIG. 25, the surface weathering and crystallization is shown on a BLO sample, which, as batched, included 45 mol % $P_2O_5$, 14 mol % $Fe_2O_3$, and 41 mol % CuO. It is noted that concentration of $Fe_2O_3$ of the BLO sample is greater than the examples listed in Table 5. Without being bound by theory, the BLO sample may have increased durability but decreased antimicrobial properties relative to the samples listed in Table 5.

To test the effect of surface texture on weathering, one portion of the BLO glass article had a rough saw cut surface and a second portion had a smooth, fractured surface. The BLO glass was exposed to 85% RH at 45° C. for 6 days. The first portion having the rough saw cut surface showed weathering and crystallization, while the second portion having the smooth, fractured surface exhibited no or little weathering. Based on this testing, it was found that surface texture contributed to the weathering effect on the glass, including on highly-durable glass articles, including the BLO glass.

Figure 26A:
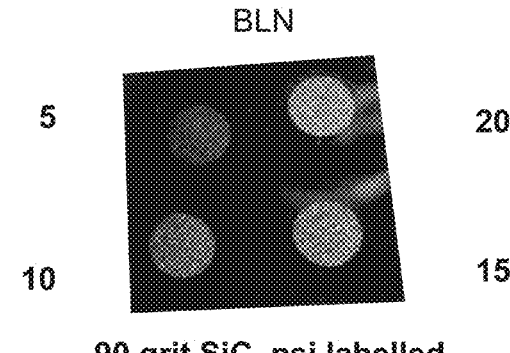
FIG. 26A is a digital image of a coupon with a sample of material treated under four pressures to abrade a surface, according to an exemplary aspect.
Figure 26B:
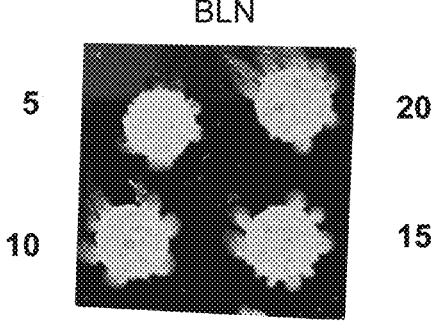
FIG. 26B is a digital image after the coupon of FIG. 22A has been exposed to select temperature and humidity.

Further, as illustrated in FIGS. 26A and 26B, abrasion testing was conducted to verify the effect of surface roughness on weathering. A coupon of the BLN example was abraded with 90 grit SiC at 5, 10, 15, and 20 psi. As set forth in Table 5, the BLN coupon included a batched composition of 45 mol % $P_2O_5$, 12 mol %, $Fe_2O_3$, and 43 mol % CuO. The BLN example, having the increased iron concentration, is considered a durable glass composition. The BLN coupon was then exposed to 85% RH at 45° C. for 6 days. After this testing, as illustrated in FIG. 26B, the results showed that the abraded locations were the locations where the weathering occurred. Accordingly, weathering occurs at locations or areas that have a higher surface roughness. Based on the results of the abrasion testing and without being bound by theory, there is a maximum roughness that can be tolerated by compositions even in compositions that are more durable than other easier-to-weather composition (such as Comparative Examples 1 and 2).

Surfaces of sheets or articles (e.g., buttons, containers, dead front, panel) having an area of at least 1 $cm^2$ comprising the innovations disclosed herein may be polished to have a root-mean-square surface roughness of less than 1 micrometer, such as less than 500 nanometers (nm), such as 200 nm, such as less than 100 nm, such as less than 50 nm, such as less than 20 nm, such as less than 10 nm, for example, which may improve color retention. Surfaces of sheets or articles having an area of at least 1 $cm^2$ comprising the innovations disclosed herein may be polished to have Ra (arithmetic average of the absolute values of the profile height deviations from the mean line) within 1 cm the evaluation length, of less than 50 nm, such as less than 20 nm, such as less than 10 nm, such as less than 5 nm, such as less than 1 nm, for example. Surfaces of such sheets or articles may have areas of at least 2 $cm^2$, such as at least 5 $cm^2$, such as at least 10 $cm^2$, such as at least 20 $cm^2$, such as at least 50 $cm^2$, for example.

Figure 27:
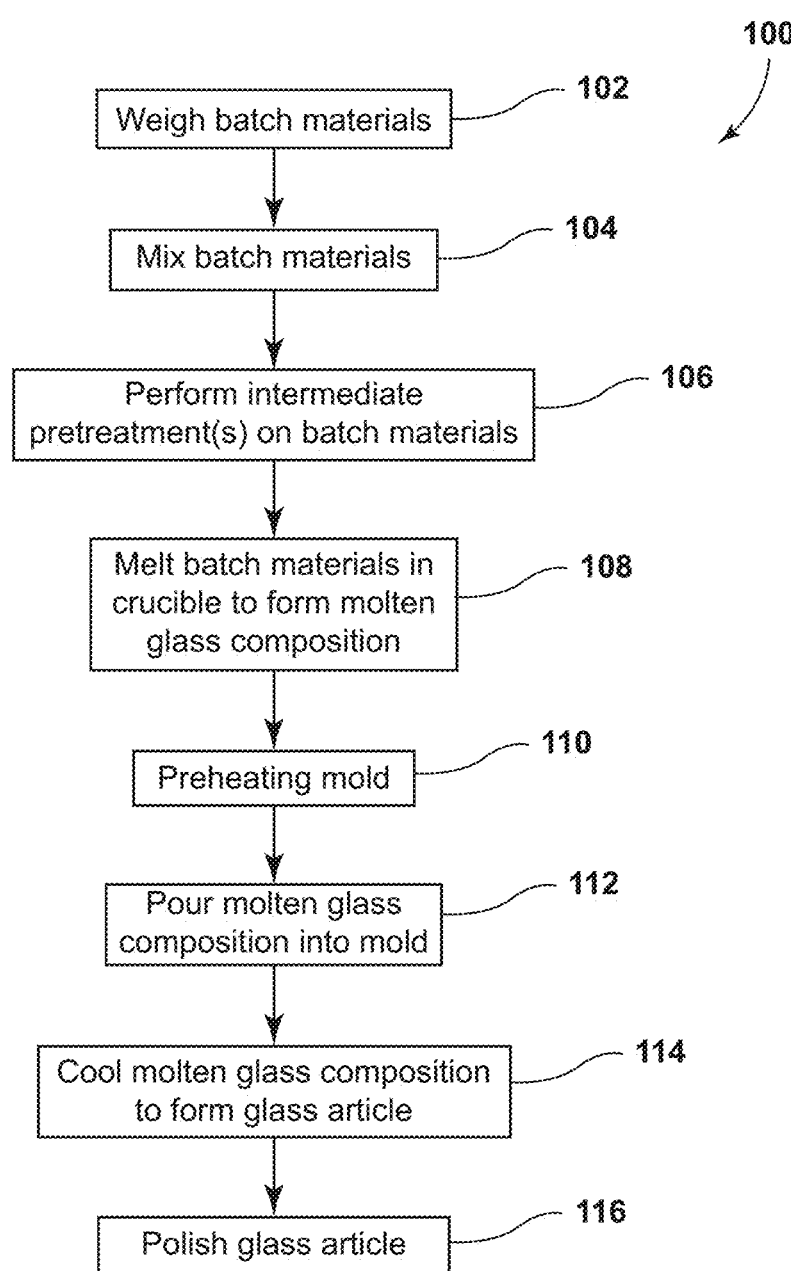
FIG. 27 is a flow chart of a method of manufacturing a glass article, according to an exemplary aspect.
Figure 28:
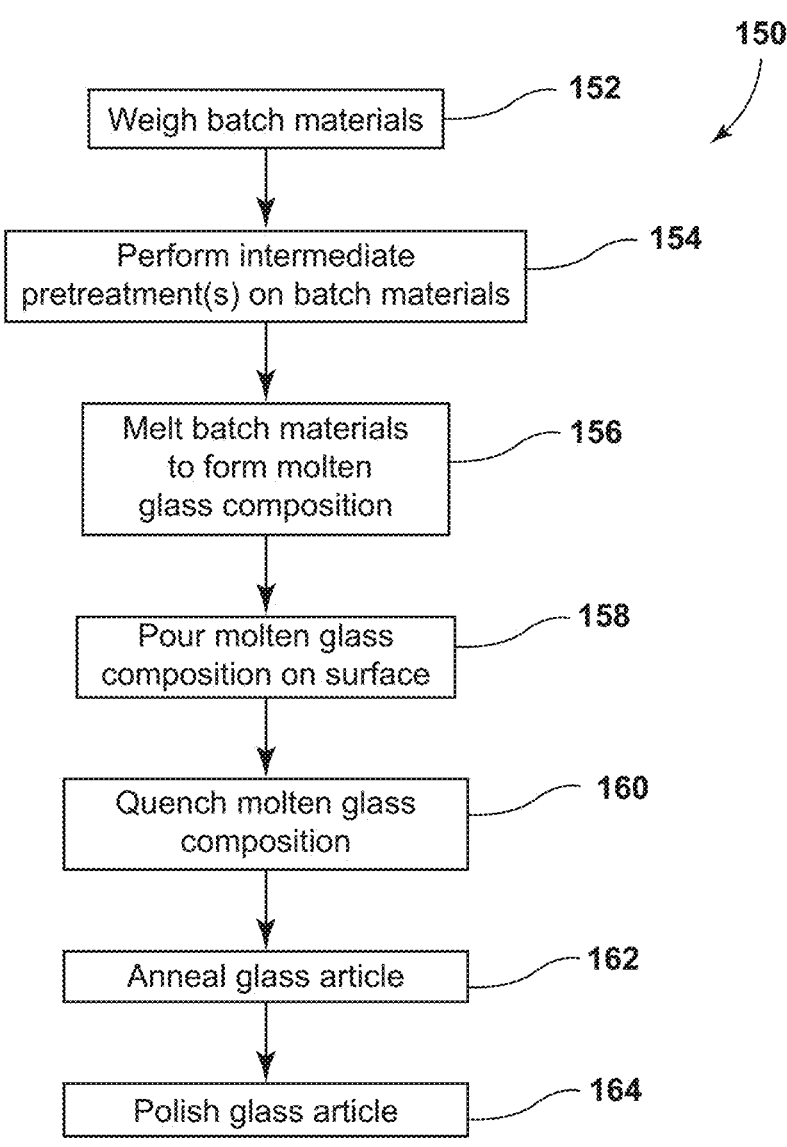
FIG. 28 is a flow chart of a method of manufacturing a glass article, according to an exemplary aspect.

With reference to FIGS. 27 and 28, and with further reference to FIGS. 1-26B, the glass article disclosed herein may be formed or manufactured in a manner that results in reduced weathering when the glass is exposed to hot and/or humid conditions. Each example or sample of the glass composition disclosed herein, including those in each of the Tables, can be manufactured as described herein.

During formation, the glass compositions described herein may form a thin, crystalline layer on the surface when poured in an oxygenated atmosphere. Therefore, if desired such as for color control or machinability, to prevent or minimize the formation of the crystalline layer, Applicants developed methods that prevent crystallization, as further discussed herein.

Referring to FIG. 27, a method 100 of manufacturing the glass article includes step 102 of weighing the batch materials (i.e. "batching"), such as at any of the as-batched amounts. In certain aspects described herein, the batch materials or constituents generally include 42 mol %≤$P_2O_5$≤47 mol %, 7 mol %≤$Fe_2O_3$≤12 mol %, and 42 mol %≤CuO≤48 mol %. Other compositions listed in any of the Tables or ranges disclosed herein may also be utilized. In step 104, the batch materials may be mixed such that the materials are homogenously mixed. The mixed batch constituents may then be disposed within the quartz crucible or other manufacturing equipment. Different refractory materials may be used.

In step 106, at least one intermediate pretreatment may be performed on the batch materials. In certain aspects, one such intermediate pretreatment may be a calcining treatment to assist in reducing or removing moisture from the batch materials. Further, batch materials may be heated to a first temperature, which is generally a temperature from 250° C. to 300° C. The batch materials may be maintained at the first temperature for a predefined period of time, such as at least 12 hours. Such pretreatment may improve quality of the resulting material, such as in terms of coloration, antimicrobial performance, flatness.

In step 106, another such intermediate pretreatment may be performed at a second higher temperature, which may be 850° C. The batch materials may be maintained at the second temperature for a predefined period of time, for example at least one hour. In the second intermediate pretreatment, ammonium phosphate may be used to reduce or remove ammonia. Additionally, these intermediate pretreatments may also be advantageous for preventing or minimizing boiling that may occur if the batch materials are brought directly to a melting temperature of the batch constituents. Accordingly, such pretreatment may improve quality of the resulting material.

In step 108, the batch materials may be heated to the melting temperature of the batch constituents and/or maintained at the melting temperature for a predefined period of time, which may be at least about 30 minutes. The batch materials are melted into a molten glass composition. The melting temperature may be in a range from about 900° C. to about 1550° C. In certain aspects, the melting temperature may be in the range from about 1050° C. to about 1150° C.

For smaller batches, melting may be performed in a quartz crucible. During the melting process, $SiO_2$ from the quartz crucible contaminates the molten glass composition, resulting in the glass, as analyzed, having $P_2O_5$, $Fe_2O_3$, CuO, and $SiO_2$. The glass composition has less than or equal to 5 mol % of $SiO_2$ as analyzed. Without being bound by theory, the higher the melting temperature, the greater the amount of $SiO_2$ in the glass composition as analyzed and the lower the melting temperature, the lower the amount of $SiO_2$.

Applicants discovered that cooling may influence crystallization of the materials disclosed herein. For example, in step 110, a mold for receiving the molten glass composition may be preheated. The mold may be a graphite mold. The mold may be preheated to a temperature from about 200° C. to about 300° C. The mold may be part of a stack of molds for the molten glass composition to be poured into. Preheating the mold may allow more gradual cooling of the material.

Applicants also discovered that environment may influence crystallization of the materials disclosed herein. For example, in step 112, the molten glass composition may be poured into the preheated mold in an inert environment. The inert environment may include at least one of Ar, $N_2$, or another non-$O_2$-containing environment. The mold generally has an inlet and an outlet for gasses, such as $N_2$, to be released from the mold during the pour process. Applicants note that benefits of the inert atmosphere may be independent of the mold, and inert atmosphere may be used with other (e.g., convention) forms of controlled cooling or anneal for example to achieve benefits in terms of crystallization.

In step 114, molten glass is cooled in the mold to room temperature, which is generally in a range from about 20° C. to about 25° C. After cooling, glass articles used for measurements above were generally disc-shaped having a diameter of about six inches and a thickness of about 0.5 inches. Other molds can be used.

During the cooling process, the glass composition self-anneals to remove residual stresses within the glass article. As the molten glass composition cools to the glass article, the residual stresses are removed or reduced generally concurrently with the cooling process. The heat and length of the cooling process is advantageous for removing the residual stress from the glass article. The cooling process within the preheated mold may be at a rate slower than a cooling rate of the glass composition in ambient air. Accordingly, this method 100 allows for slower, more isothermal quenching and annealing.

In step 116, the glass article may be polished. Generally, each surface, including edges, are polished. Applicants discovered polishing the article improves weathering performance as discussed above. It was found that polishing the article to an "optical finish" where the glass article appears "shiny" was most resistant to atmospheric degradation. Matte finishes may also assist in resistant weathering, but may not be as effective as the "optical finish."

To provide the smoother surface or surfaces, and consequently reduce weathering, the cooled glass article is polished or has a matte finish, particularly on the edges of the glass article. The nucleation and crystallization (e.g., the weathering) often begins at the rough surfaces as described herein. The weathering then grows from the rough surfaces to the polished surfaces. The edges of the glass article may generally be considered a rough surface without a polish or finish. If the rough surfaces and/or edges are not present, as there is polishing or finishing applied, these locations are not exposed to extreme conditions. Accordingly, the crystallization or weathering is then controlled.

The method 100 may be advantageous for generating less residual stress in the glass article. Less residual stress generally results in glass that is easier to machine. Further, method 100 may be more cost-effective as the cooling and the self-annealing generally occurs concurrently. It is contemplated that the steps of method 100 may be performed in any order, simultaneously, and/or omitted without departing from the teachings herein.

With reference now to FIG. 28, an additional or alternative method 150 for manufacturing the glass structure includes step 152 of weighing the batch materials or constituents, including, for example, 42 mol %≤$P_2O_5$≤47 mol %, 7 mol %≤$Fe_2O_3$≤12 mol %, and 42 mol %≤CuO≤48 mol %, or any other combination of constituents disclosed herein. Step 154 includes performing at least one intermediate pretreatment, such as the calcining step and/or the reduction in ammonia. In step 156 the batch materials are melted in the crucible. Each of steps 152-156 are conducted in a similar manner as steps 102-106 in method 100 set forth herein.

In step 158, the molten glass composition is poured onto a surface in the inert environment. The surface may be, for example, a steel table or graphite slab. The inert environment prevents interaction between the cooling glass article and oxygen, the interaction of which results in the crystallization. The inert environment may be, for example, Ar, $N_2$, or another non-$O_2$-containing environment.

In step 160, the molten glass composition is quenched to form the glass article. The quenching process quickly cools the glass from the molten composition to room temperature, forming the solid glass article. The quenching is performed in the inert environment to prevent the interaction with oxygen. In step 162, generally after the glass is fully cooled, the glass is annealed to reduce or remove residual stresses. The annealing is performed in a separate step from cooling the glass article. Generally, the glass article is placed in an oven and heated to remove the residual stresses. In this method 150, the residual stresses may be higher than those in method 100 due to the quicker cooling time. In step 164, the glass article is polished similar to step 116 in method 100 to reduce or remove rough surfaces that lead to greater weathering.

Method 150 may be advantageous for providing faster quenching rates, which may be advantageous for antimicrobial efficacy. It is contemplated that the steps of method 150 may be performed in any order, simultaneously, and/or omitted without departing from the teachings herein.

In methods 100, 150, the cooling of the molten glass composition to the glass article is performed in the inert environment. Each of these methods 100, 150 prevents, or at least minimizes, the surface reaction of the glass by preventing a reaction between the glass and oxygen during pour. If the glass article is partially cooled (e.g., has not reached room temperature), the glass article may react to oxygen if removed from the inert environment. Accordingly, the glass article is generally retained in the inert environment until the glass article has cooled to room temperature. Each method 100, 150 produces a glass that has little or no surface reaction to weathering. Additionally, these methods 100, 150 allow the phosphate glass described herein to be formed under normal atmospheric conditions and can be machined under normal conditions with regularly used solutions (e.g., diamond saw, laser cutting, controlled fracture after scribing, etc.). Further, these methods prevent the formation of crystals, thereby producing a glass rather than a glass-ceramic.

The glass composition disclosed herein is optionally an amorphous and/or single-phase glass. The single phase is generally a single glassy phase. In conventional glasses or glass-ceramics having multiple phases, each phase may have a different coefficient of thermal expansion (CTE). The difference in CTE creates additional residual stresses within the glass, which results in greater difficulty to machine the glass into solid surfaces. The single-phase, amorphous glass disclosed herein may be easier to cut, grind, machine, etc.

into solid surfaces due to the lower residual stress. Further, the single-phase glasses provides strong antimicrobial efficacy.

In certain aspects, the composition, as batched and/or as analyzed, includes a concentration of $P_2O_5$ from 42 mol % to 47 mol %, a concentration of $Fe_2O_3$ from 7 mol % to 12 mol %, and a concentration of CuO from 42 mol % to 48 mol %. In other words, the composition, as batched and/or as analyzed, includes 42 mol %≤$P_2O_5$≤47 mol %, 7 mol %≤$Fe_2O_3$≤12 mol %, and 42 mol %≤CuO≤48 mol %. Additionally, as analyzed, the composition includes a concentration of $P_2O_5$ from 42 mol % to 47 mol %, a concentration of $Fe_2O_3$ from 7 mol % to 12 mol %, a concentration of CuO from 42 mol % to 48 mol %, and $SiO_2$ less than or equal to 5 mol %. In other words, the composition, as analyzed, includes 42 mol %≤$P_2O_5$≤47 mol %, 7 mol %≤$Fe_2O_3$≤12 mol %, 42 mol %≤CuO≤48 mol %, and $SiO_2$≤5 mol %.

As described herein, the glass composition, with durability, color, and antimicrobial properties, may be advantageous for architectural applications. This glass composition described herein may also be used as an additive in paint, for example. If the glasses are being used in applications such as an additive in paint, then durability may not be as advantageous, and lower durability compositions may be utilized. The balance between color, antimicrobial properties, and minimizing crystallization are also advantageous when utilizing the compositions described herein for these additional applications.

Each of U.S. Application Nos. 63/023,518 filed May 12, 2020, Ser. No. 17/327,870 filed May 24, 2021, 63/088,525 filed Oct. 7, 2020, Ser. No. 17/068,272 filed Oct. 12, 2020, 63/136,381 filed Jan. 12, 2021, 63/151,210 filed Feb. 19, 2021, 63/177,536 filed Apr. 21, 2021, 63/209,489 filed May 11, 2021, 63/123,863 filed Dec. 10, 2020, 63/183,292 filed May 3, 2021, 63/183,271 filed May 3, 2021, and 63/222,462 filed Jul. 16, 2021, is incorporated by reference herein in its entirety. Each of U.S. Application Nos. 63/030,719 filed May 27, 2020, Ser. No. 17/331,050 filed May 26, 2021, 63/024,835 filed May 14, 2020, Ser. No. 17/319,538 filed May 13, 2021, and 63/009,102 filed Apr. 13, 2020, is incorporated by reference herein in its entirety. International application No. PCT/US21/24605 filed Mar. 29, 2021, is incorporated by reference herein in its entirety.

Each of U.S. Application Nos. 63/225,049 filed Jul. 23, 2021, and 63/226,868 filed Jul. 29, 2021, are incorporated by reference herein in its entirety.

Construction and arrangements of the compositions, structures, assemblies, and structures, as shown in the various aspects of the innovations, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Materials disclosed herein may be useful for purposes other than controlling microbes, such as forming substrates, packaging, containers, covers, etc. The order or sequence of any process, logical algorithm, or method steps may be varied or re-sequenced according to an exemplary aspect. Other substitutions, modifications, changes, and omissions may also be made in the design, operating conditions, and arrangement of the various exemplary aspects without departing from the scope of the present inventive technology.

What is claimed is:

1. A glass, in terms of as-analyzed constituent components, comprising:

42 mol %≤$P_2O_5$≤47 mol %;

42 mol %≤CuO≤48 mol %; and

0<$Fe_2O_3$≤15 mol %, wherein the glass is an amorphous, single-phase glass; and wherein the glass has a greater amount of $Cu^-$ ions than $Cu^{2+}$ ions.

2. The glass of claim 1, wherein $SiO_2$≤5 mol %.

3. The glass of claim 1, wherein 7 mol %≤$Fe_2O_3$≤12 mol %.

4. The glass of claim 3, wherein 7.5 mol %≤$Fe_2O_3$≤12 mol %, and 42 mol %≤CuO≤47.5 mol %.

5. The glass of claim 4, wherein 8 mol %≤$Fe_2O_3$≤12 mol %, and 42 mol %≤CuO≤47 mol %.

6. The glass of claim 1, wherein the glass has a CIELAB L* value less than 35, a CIELAB a* value from −5 to 5, and a CIELAB b* value from −5 to 5.

7. The glass of claim 1, wherein the glass exhibits a positive percent kill as measured by United States EPA Test Method for Efficacy of Copper Alloy Surfaces as a Sanitizer.

8. The glass of claim 7, wherein $P_2O_5$, $Fe_2O_3$, and CuO constituents in combination with one another make up over 90 mol % of the phosphate glass.

9. The glass of claim 1, wherein the $Fe_2O_3$ is at least 3 mol % or the glass of claim 1 further comprising 3 mol %≤X≤15 mol %, where X is one or more constituents selected from the group consisting of MgO, ZnO, CaO, SrO, BaO, $Li_2O$, $Na_2O$, $K_2O$, $TiO_2$, NiO, $MnO_2$, and $Al_2O_3$.

* * * * *